United States Patent
Ishikawa et al.

(10) Patent No.: US 7,345,135 B2
(45) Date of Patent: Mar. 18, 2008

(54) CROSSLINKABLE AROMATIC RESIN HAVING PROTONIC ACID GROUP, AND ION CONDUCTIVE POLYMER MEMBRANE, BINDER AND FUEL CELL USING THE RESIN

(75) Inventors: Junichi Ishikawa, Sodegaura (JP); Takashi Kuroki, Sodegaura (JP); Satoko Fujiyama, Sodegaura (JP); Takehiko Omi, Sodegaura (JP); Tomoyuki Nakata, Sodegaura (JP); Yuichi Okawa, Sodegaura (JP); Kazuhisa Miyazaki, Sodegaura (JP); Shigeharu Fujii, Sodegaura (JP); Shoji Tamai, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 741 days.

(21) Appl. No.: 10/820,842

(22) Filed: Apr. 9, 2004

(65) Prior Publication Data
US 2004/0191602 A1 Sep. 30, 2004

Related U.S. Application Data

(63) Continuation-in-part of application No. PCT/JP02/10536, filed on Oct. 10, 2002.

(30) Foreign Application Priority Data

Oct. 10, 2001 (JP) ............................ 2001-312799
Jun. 21, 2002 (JP) ............................ 2002-182252

(51) Int. Cl.
*C08G 2/18* (2006.01)
*C08G 6/00* (2006.01)

(52) U.S. Cl. ............... 528/220; 525/330.9; 525/331.2; 525/328.6; 429/30; 429/34; 429/42; 429/310; 429/316; 429/317

(58) Field of Classification Search ................. 528/220; 525/330.9, 331.2, 328.6; 429/30, 34, 42, 429/310, 316, 317
See application file for complete search history.

(56) References Cited

U.S. PATENT DOCUMENTS
5,438,082 A 8/1995 Helmer-Metzmann et al.
(Continued)

FOREIGN PATENT DOCUMENTS
JP 52-091788 A 8/1977
(Continued)

OTHER PUBLICATIONS
F. Wang et al., "Sodium sulfonated-functionalized poly(ether ether ketone)s," *Macromol. Chem. Phys.*, 1998, pp. 1421-1426, vol. 199, Huthig & Wepf Verlag, Zug, Switzerland.
(Continued)

*Primary Examiner*—Duc Truong
(74) *Attorney, Agent, or Firm*—Buchanan Ingersoll & Rooney PC

(57) ABSTRACT

The invention provides a crosslinkable aromatic resin having a protonic acid group and a crosslinkable group, suitable for electrolytic membranes and binders used in fuel cells, etc., and electrolytic polymer membranes, binders and fuel cells using the resin. The crosslinkable aromatic resin has a crosslinkable group, which is not derived from the protonic acid group and can form a polymer network without any elimination component. This resin exhibits excellent ion conductivity, heat resistance, water resistance, adhesion property and low methanol permeability. Preferably, the crosslinkable group is composed of a $C_1$ to $C_{10}$ alkyl group directly bonded to the aromatic ring and/or an alkylene group having 1 to 3 carbon atoms in the main chain in which at least one carbon atom directly bonded to the aromatic ring bonds to hydrogen, and a carbonyl group, or a carbon-carbon double bond or triple bond. The aromatic resins such as aromatic polyethers, aromatic polyamides, aromatic polyimides, aromatic polyamideimides, aromatic polyazoles, etc., which contain such a crosslinkable group, are preferred as the crosslinkable aromatic resins having a protonic acid group and a crosslinkable group.

34 Claims, 2 Drawing Sheets

U.S. PATENT DOCUMENTS

| | | | |
|---|---|---|---|
| 5,561,202 | A | 10/1996 | Helmer-Metzmann et al. |
| 5,741,408 | A | 4/1998 | Helmer-Metzmann et al. |
| 5,795,496 | A | 8/1998 | Yen et al. |
| 6,087,031 | A | 7/2000 | Iwasaki et al. |
| 6,090,895 | A | 7/2000 | Mao et al. |
| 6,180,559 | B1 | 1/2001 | Roberts et al. |
| 6,214,488 | B1 | 4/2001 | Helmer-Metzmann et al. |
| 6,221,923 | B1 | 4/2001 | Schnurnberger et al. |
| 2001/0020082 | A1 | 9/2001 | Faure et al. |
| 2002/0091225 | A1 | 7/2002 | McGrath et al. |
| 2002/0103306 | A1 | 8/2002 | Kerres et al. |

FOREIGN PATENT DOCUMENTS

| | | |
|---|---|---|
| JP | 52-099982 | 8/1977 |
| JP | 63-305904 A | 12/1988 |
| JP | 02-248434 A | 10/1990 |
| JP | 04-130140 A | 5/1992 |
| JP | 04-144062 A | 5/1992 |
| JP | 06-093114 A | 4/1994 |
| JP | 10-045913 A | 2/1998 |
| JP | 11-067224 A | 3/1999 |
| JP | 2000-501223 A | 2/2000 |
| JP | 2000-299117 A | 10/2000 |
| JP | 2003-012795 A | 1/2003 |
| JP | 2003-068327 A | 3/2003 |
| JP | 2003-147075 A | 5/2003 |
| JP | 2003-217342 A | 7/2003 |
| JP | 2003-217343 A | 7/2003 |
| JP | 2004-047244 A | 2/2004 |
| WO | 96/29359 | 9/1996 |
| WO | 00/15691 | 3/2000 |
| WO | 00/66254 A1 | 11/2000 |
| WO | 01/25312 | 4/2001 |

OTHER PUBLICATIONS

F. Wang et al., "Synthesis of poly(ether ether ketone) with high content of sodium sulfonated groups, and its membrane characteristics," *Polymer*, 1999, pp. 795-799, 40, Elsevier Science Ltd.

S. Liu et al., "Novel sodium sulfonated-functionalized poly(ether ether ketone)s derived from 4,4'-thiodiphenol," *Polymer*, 2001, pp. 3293-3296, 42, Elsevier Science Ltd.

I. Honma, "Organic-inorganic Hybrid Membrane—Application to Proton Conductive Solid Polymer Electrolyte Membrane," *The Third Separations Science & Technology Study Meeting*, 1999, pp. 17-20, The Society of Polymer Science, Japan (English translation).

English translation of Abstract and claims of JP 2002-358978, published Dec. 13, 2002.

English translation of Abstract and claims of JP 2002-367627, published Dec. 20, 2002.

English translation of Abstract and claims of JP 2002-121281, published Apr. 23, 2002.

English translation of Abstract and claims of JP 2002-105199, published Apr. 10, 2002.

Japanese Published Application No. 2002-105199, Apr. 10, 2002, Abstract only.

Japanese Published Application No. 2002-121281, Apr. 23, 2002, Abstract only.

Japanese Published Application No. 2002-358978, Dec. 13, 2002, Abstract only.

Japanese Published Application No. 2002-367627, Dec. 20, 2002, Abstract only.

CROSSLINKABLE AROMATIC RESIN HAVING PROTONIC ACID GROUP, AND ION CONDUCTIVE POLYMER MEMBRANE, BINDER AND FUEL CELL USING THE RESIN

This application is a continuation-in-part of international patent application No. PCT/JP02/10536 with an international filing date of Oct. 10, 2002, designating the United States, claiming the priority of Japanese application Nos. 2001-312799 and 2002-182252, filed on Oct. 10, 2001 and Jun. 21, 2002, respectively. Priority of above-mentioned applications is claimed and each of the above-mentioned applications is hereby incorporated by reference in its entirety.

TECHNICAL FIELD

The present invention relates to a crosslinkable aromatic resin having a protonic acid group, which is ion conductive and suitably used for fuel cells, etc. utilizing hydrogen or alcohols as fuels, polymer membranes, binders and fuel cells using the resin.

TECHNICAL BACKGROUND

[Polymer Fuel Cell]

In recent years, new energy storage or generation devices have been strongly demanded from the viewpoint of environmental problems. Fuel cells are receiving great attention as one of those devices and are the most prospective generation devices also in view of the characteristics of low-polluting emission and high-energy efficiency. Fuel cells are devices to electrochemically oxidize a fuel such as hydrogen, methanol, etc. using oxygen or air thereby to convert the chemical energy of the fuel into electrical energy and to take the energy out.

Such a fuel cell is classified by the type of electrolyte used in the cells into phosphoric acid type, molten carbonate type, solid oxide type and polymer electrolyte type. Phosphoric acid type fuel cells are already in practical use for electric power. However, phosphoric acid fuel cells are required to operate at high temperature (approximately 200° C.), and for this reason, has involved drawbacks that start-up time is long, downsizing the system is difficulty and a large current can not be taken out due to poor ion conductivity of phosphoric acid.

By contrast, polymer electrolyte type fuel cells operate at temperature of approximately 80 to 100° C. at maximum. Also, since an internal resistance in fuel cells can be lowered by reducing the thickness of electrolyte membrane used, the polymer electrolyte type fuel cells can be operated at a high current, which makes downsizing possible. From these advantages, polymer electrolyte type fuel cells have been actively pursue.

Polymer electrolyte type fuel cells include a type using as fuel pure hydrogen fed from a cylinder, piping, etc., a type using hydrogen generated from gasoline or methanol through a reformer, and the like. Furthermore, direct methanol fuel cells (DMFC) which generate electricity directly from an aqueous methanol solution as fuel have been developed. This DMFC need not a reformer for generating hydrogen, enables to make up a simple and compact system, and is expected especially as power sources devices. A polymer electrolyte type fuel cell consists of a polymer electrolyte membrane having ion conductivity arranged in contact with a cathode and anode on both sides of the membrane. Fuel hydrogen or methanol is oxidized electrochemically at the anode, producing protons and electrons. The protons migrate through the polymer electrolyte membrane into the cathode where oxygen is supplied. On the other hand, the electrons produced at the anode pass through the load connected to the cell, flow into the cathode, at which the protons react with the electrons to produce water.

The electrodes such as cathode and anode used in polymer electrolyte type fuel cells are composed of conductive materials having electric conductivity, electrode materials such as catalysts for promoting the oxidation of hydrogen and the reduction of oxygen, and binders for fixing these materials.

[Polymer Electrolyte Membrane Using Fluorinated Polymer Having a Protonic Acid Group]

In a polymer electrolyte membrane used for this polymer electrolyte type fuel cell, high ion conductivity is required for protons that take part in an electrode reaction of the fuel cell. Fluorinated polymers having a protonic acid group are employed as materials for such ion conductive polymer electrolyte membranes.

However, this fluorinated polymer electrolyte membrane having a protonic acid group is known to cause a drastic decrease in ion conductivity under higher temperature and lower humidity. In the polymer electrolyte membrane using fluorinated polymer having a protonic acid group, the hydrophobic parts on the main chain and the hydrophilic parts on the side chain form a micro-domain structure, and the hydrophilic parts are interconnected in a highly hydrated state to form ion conduction pathways due to the formation of water clusters. Thus, there has been a problem that ion conductivity decreases rapidly, since the conduction pathways is blockaded with evaporation of water under high temperature and low humidity. Moreover, the conduction pathways by water clusters permit methanol to permeate therethrough. For this reason, DMFC using the polymer electrolyte membrane using fluorinated polymer having a protonic acid group has involved problems with a reduced voltage and poor power generation efficiency due to the methanol crossover. Besides, the fluorinated polymer having a protonic acid group has involved additional problems that this polymer has as poor adhesion property as other fluorinated resins that makes it difficult to adhere to electrodes or membranes, is very expensive, and generates hydrofluoric acid gas during incineration in discarding.

[Polymer Electrolyte Membrane Using Hydrocarbon-Based Polymer Having a Protonic Acid Group]

On the other hand, non-fluorinated electrolyte membranes using hydrocarbon-based polymers having a protonic acid group have also been developed. In a hydrocarbon-based polymer electrolyte membrane, the formation of water clusters or ionic conduction pathways is not observed, and in its structure the entire electrolyte membrane is uniformly hydrated. Thus, it is known that in the hydrocarbon-based polymer electrolyte membrane, the polymer is highly interactive with water molecules, and the reduction in ion conductivity under high temperature and low humidity is diminished.

However, hydrocarbon-based polymers having a protonic acid group whose main chain consists of aliphatic chains have involved a problem that since these polymers provide poor heat resistance and chemical durability, the cell performance is deteriorated with passage of time when the polymers are used as polymer electrolytes for polymer electrolyte type fuel cells. For example, sulfonated polystyrene has involved a problem that since a glass transition temperature of the polymer is about 125° C., the membrane is softened and deformed by heat developed during power generation. There has been another problem that a tertiary carbon in the main chain is liable to be attacked by radicals and hydrogen at the α-position is easily released in the cell.

Thus, many aromatic hydrocarbon-based polymers having a protonic acid group have been developed, which do not have aliphatic chains in the main chains. (Macromol. Chem. Phys., 199, 1421-1426 (1998), Polymer, 40, 795-799 (1999), Polymer, 42, 3293-3296 (2001), etc.). Among them, membranes formed of sulfonated polyetheretherketone are reported to provide excellent heat resistance and chemical durability to be tolerant of long hour-operation as a polymer electrolyte (Itaru Honma, The 3rd. Separations Sciences & Technology Workshop Session, Lecture Brief, "Basis & Application of Polymer Membrane Fuel Cell," p. 17 (1999)).

In order to improve ion conductivity of these aromatic hydrocarbon polymers having a protonic acid group, it is necessary to increase the content of protonic acid groups to be introduced, i.e., to reduce the ion-exchange equivalent weight. However, it is known that when the content of protonic acid group to be introduced increases, hydrophilicity increases, water absorption increases or the polymers become water-soluble (Japanese Patent Laid-Open Application Hei 10-45813, etc.). Since fuel cells produce water as by-product by the reaction of fuel and oxygen, water-soluble resin cannot be used as a polymer electrolyte membrane for fuel cells. Even if polymers do not become water-soluble, high water absorption causes problems such as swelling or reduced strength of membranes, permeation of methanol from the anode to the cathode mediated by the absorbed water, etc. In order to obtain polymer electrolytes having a high ion conductivity, it was thus required to reduce water solubility and water absorption of membranes.

International publication WO 00/066254, Japanese Laid-Open Patent Application SHO 63-305904, etc. disclose a method of reducing the water solubility and water absorption by blending a sulfonated resin having water solubility or water absorption with a basic polymer having neither water solubility nor water absorption to form a salt. However, since this method requires for incorporating basic polymer having neither water solubility nor water absorption in large quantities, the resulting polymer has a problem that the proportion of resin having protonic acid group resin is low and the ion conductivity is low. Moreover, there is further problem that since the salt formation is an equilibrium reaction and thus, for example, dissociation and recombination are repeated by a protonic acid that migrates through the membrane during power generation, the sulfonated resin is gradually dissolved out.

[Crosslinked Resin Membrane Having a Protonic Acid Group]

On the other hand, across linked structure through a covalent bond is attracting interest as a method for reducing water solubility without introducing water-insoluble components, which can also diminished the resin to dissolve out.

For example, Japanese Laid-Open Patent Application SHO 52-91788 reports a crosslinked resin membrane having a protonic acid group obtained by sulfonating the polyphenylene oxide membrane crosslinked through a Friedel-Crafts reaction using fuming sulfuric acid. However, sulfonation of the crosslinked resin membrane involves a problem that crosslinking density or sulfonation degree of the membrane surface is different from that of the inside or back surface of membrane, and membrane thickening is difficult. Furthermore, in this method, when producing a fuel cell electrode which is dispersed with a conductive material having electric conductivity or with a catalyst for promoting oxidation of hydrogen and reduction of oxygen, the conductive material or catalyst should first be dispersed in resin to form membrane and then sulfonation must follow, by which the conductive material or catalyst was unavoidably degenerated or deteriorated.

Though a method for crosslinking sulfonated resins during or after membrane formation is disclosed in Japanese Laid-Open Patent Application HEI 2-248434 and 4-130140, etc., this crosslinking mechanism that uses a Friedel-Crafts reaction of an aromatic ring and a chloroalkyl group is accompanied by eliminated hydrochloric acid as by-product. Thus, the method involves a problem that the crosslinking density is different between the membrane surface and the inside or back surface of membrane with a different efficiency of removing the by-product, membrane thickening is difficult, voids are formed on the membrane, and manufacturing equipments corrode due to the eliminated hydrochloric acid.

Another crosslinking mechanism is reported in, e.g., Japanese translation of PCT Publication 2000-501223, U.S. Pat. No. 6,221,923, etc., in which sulfonic acids in a sulfonated polyetheretherketone membrane are condensed by desulfuric acid each other to form sulfonate bonds. In Japanese Patent Laid-Open Application SHO 52-99982, a method which comprises thermally decomposing a part of chlorosulfonic acid of a membrane formed of chlorosulfonated polydiphenylmethane to form the crosslinkage through sulfonate bond and then hydrolyzing the remaining chlorosulfonic acid to sulfonic acid is reported. In International publication WO 99/61141, a method for crosslinking through sulfonamide bonds using chlorosulfonated polyetheretherketone and diamine is reported. However, these methods are also based on the crosslinking mechanism involving elimination of sulfuric acid, hydrochloric acid, chlorine, etc., and have a problem that the crosslinking density of the membrane surface is different from that of the inside or back surface of membrane, membrane thickening is difficult, voids are formed on the membrane, and manufacturing equipments corrode due to the elimination of acidic gas. In addition, the membranes prepared through the crosslinking mechanism using these protonic acid groups involves a further problem that increased crosslinking density invites reduced protonic acid groups (increased ion-exchange equivalent weight) to cause reduced ion conductivity. An additional problem was that the sulfonamide bonds were liable to hydrolysis.

For a crosslinking mechanism which is not accompanied by eliminated sulfuric acid, hydrochloric acid, etc. off, Japanese Laid-Open Patent Application HEI 6-93114 reports a mechanism that the chlorosulfonic acid group in chlorosulfonated polyetherketone reacts with an allyl amine to form an allyl group bonded through a sulfonamide group and the resulting polyetherketone is crosslinked through an addition reaction after forming the membrane. According to this mechanism, the degree of sulfonation or crosslinking density in a thickness direction can be made uniform. However, this method requires to reduce protonic acid groups (increase the ion-exchange equivalent weight) as well, in order to increase the crosslinking density. Moreover, the method also involves that the sulfonamide bond for binding crosslinkable groups is liable to hydrolysis.

Though a variety of crosslinking mechanisms have been proposed to crosslinked resin not having a protonic acid group, there are hardly found that crosslinking would take place even under conditions that protonic acid groups are present in large quantities, no reaction with protonic acid groups would occur, groups or chains produced by crosslinking would be stable in fuel cells, etc. For example, the curing system for epoxy resin or bismaleimide resin encounters problems that the epoxy or amine reacts with protonic acid groups to reduce the protonic acid groups, the chains produced are liable to hydrolysis or electric degradation, etc. Thus, the curing system cannot be used as a crosslinking mechanism for resins having protonic acid groups or as a polymer electrolyte membrane for fuel cells. For this reason, notwithstanding that various crosslinking mechanisms have been applied to conventional crosslinked resins, only a very few types of the crosslinking mechanisms described above are used for resins having protonic acid groups.

In view of the foregoing, crosslinkable aromatic resin having a protonic acid group as a polymer electrolyte membrane material for fuel cells, which has a crosslinking mechanism that can be crosslinked during or after membrane formation, that is not derived from the protonic acid group, and that does not forming any elimination component, has been required.

[Binder Having a Protonic Acid Group for Fuel Cell]

In the polymer electrolyte type fuel cells, very few reports are found on binders used to fix electrode materials or adhere the electrodes to a membrane, and only a fluorinated polymer having a protonic acid group is employed. However, while this fluorinated polymer having a protonic acid group adheres to a polymer electrolyte membrane formed of the fluorinated polymer having a protonic acid group, the polymer provides poor adhesion property to an aromatic hydrocarbon-based polymer electrolyte membrane having a protonic acid group.

Also, since binders are used for blending with electrode materials or adhering electrode materials and membranes, solvent solubility or melt flowability is required for binders. Therefore resins that have already been crosslinked to become insoluble or non-fusible can not be used as binders.

Therefore, ion conductive binders for fuel cells, which can be crosslinked during or after adhesion, and after the crosslinking, exhibit excellent ion conductivity, heat resistance, water resistance and adhesion property, have also been demanded.

DISCLOSURE OF THE INVENTION

As a result of extensive studies, the present inventors have found that a novel crosslinkable aromatic resin having a protonic acid group and containing a crosslinkable group which is not derived from the protonic acid group and can form a polymer network without forming any elimination component, exhibits excellent ion conductivity, heat resistance, water resistance and adhesion property as well as low methanol permeability by crosslinking, and is suitable for ion conductive polymer membranes and binders for fuel cells. The present invention has thus come to be accomplished.

An object of the present invention is to provide a crosslinkable aromatic resin having a protonic acid group and containing a crosslinkable group which is not derived from the protonic acid group and can form a polymer network without forming any elimination component, and ion conductive polymer membranes, binders and electrodes for fuel cells using the resin, as well as the fuel cells, which have high ion conductivity and are excellent in heat resistance, water resistance and adhesion property.

The invention provides, in a crosslinkable aromatic resin having a protonic acid group, the crosslinkable aromatic resin having a protonic acid group, that comprises containing a crosslinkable group which is not derived from the protonic acid group and can form a polymer network without forming any elimination component.

As a specific embodiment of the crosslinkable aromatic resin having a protonic acid group and containing a crosslinkable group, which is not derived from the protonic acid group, and can form a polymer network without forming any elimination component, the invention provides a crosslinkable aromatic resin having a protonic acid group wherein the crosslinkable group is composed of an alkyl group having 1 to 10 carbon atoms directly bonded to the aromatic ring and/or an alkylene group having 1 to 3 carbon atoms in the main chain in which at least one carbon atom directly bonded to the aromatic ring bonds to hydrogen, and a carbonyl group.

As a further specific embodiment of the crosslinkable aromatic resin having a protonic acid group wherein the crosslinkable group is composed of an alkyl group having 1 to 10 carbon atoms directly bonded to the aromatic ring and/or an alkylene group having 1 to 3 carbon atoms in the main chain in which at least one carbon atom directly bonded to the aromatic ring bonds to hydrogen, and a carbonyl group, the invention provides an aromatic resin selected from the group consisting of aromatic polyethers, aromatic polyamides, aromatic polyimides, aromatic polyamideimides and aromatic polyazoles, which contain such a crosslinkable group.

The invention provides a crosslinkable aromatic resin having a protonic acid group, which has an alkyl group having 1 to 10 carbon atoms directly bonded to the aromatic ring and/or an alkylene group having 1 to 3 carbon atoms in the main chain in which at least one carbon atom directly bonded to the aromatic ring bonds to hydrogen, and a carbonyl group as the crosslinkable group which is not derived from the protonic acid group and can form a polymer network without forming any elimination component, and which can be crosslinked by light, heat and/or electron rays.

As other specific embodiment of the crosslinkable aromatic resin having a protonic acid group and containing a crosslinkable group which is not derived from the protonic acid group and can form a polymer network without forming any elimination component, the invention provides a crosslinkable aromatic resin having a protonic acid group wherein the crosslinkable group is a carbon-carbon double bond or a carbon-carbon triple bond.

As a still further specific embodiment of the crosslinkable aromatic resin having a protonic acid group and containing a carbon-carbon double bond or a carbon-carbon triple bond, the invention provides an aromatic resin selected from the group consisting of aromatic polyethers, aromatic polyamides, aromatic polyimides, aromatic polyamideimides and aromatic polyazoles, which contain a carbon-carbon double bond or triple bond.

The invention provides crosslinked products, polymer membranes and binders prepared from the crosslinkable aromatic resin having a protonic acid group described above.

The invention further provides electrodes and fuel cells prepared using the polymer membranes and binders described above.

Further detailed embodiments of the invention will be apparent from the following description.

[Advantages of the Crosslinkable Aromatic Resin Having a Protonic Acid Group of the Invention]

The crosslinkable aromatic resin having a protonic acid group of the invention has the following advantages.

(1) Since the main chain structure is formed of aromatic rings, the resin of the invention provides excellent heat resistance and low deterioration of resin in the fuel cell. Also, since the resin is non-fluorinated, a decrease in ion conductivity under high temperature and low humidity is minimized, and adhesion property is excellent.

(2) Since the resin of the invention in an uncrosslinked state is a linear polymer, it has excellent solvent solubility and thermoplasticity, and is easy for handling as a varnish, blending to electrode materials, and forming membranes, etc.

(3) Since the formation of crosslinking by a heat treatment, exposure to light, etc. can be achieved during or after membrane formation without forming any elimination component, the crosslinking reaction is not accompanied by degeneration or deterioration of electrode materials, etc., crosslinking density is uniform in a thickness direction of membrane, membrane thickening is readily attained and no gas corrosive to manufacturing equipments generates.

(4) Since the structure after cross linking is formed through covalent bond and is hardly hydrolyzed, when resulting resin is used in fuel cells, a decrease in crosslinkage can be minimized.

(5) Since the crosslinkable group is not derived from the protonic acid group, the crosslinking density can be controlled without decreasing the content of protonic acid group (increasing the ion-exchange equivalent weight).

(6) Since dissolution in water or methanol, water absorption, methanol absorption, fuel crossover, etc. are suppressed by crosslinking, the increase of content of the protonic acid group incorporated becomes possible.

[Advantages of the Crosslinked Products, Polymer Membranes and Binders of the Invention]

The crosslinked products, polymer membranes and binders prepared from the crosslinkable aromatic resin having a protonic acid group of the invention have the following advantages.

(1) The dissolution in water or methanol, water absorption, methanol absorption and fuel crossover are suppressed, as compared to membranes and binders in uncrosslinked state.

(2) They have a higher ion conductivity, because the content of protonic acid groups incorporated can be increased as compared to membranes and binders in uncrosslinked state.

(3) Since water clusters or proton conduction pathways are not formed, reduction in ion conductivity even under high temperature and low humidity can be minimized.

(4) When compared to fluorinated. resins, higher adhesion is shown and less decrease in cell performance due to detachment of membranes, electrode materials, etc. are achieved when they are used as binders for fuel cells.

(5) Because a dimensional change caused by absorption of water or methanol is small, low degree of detachment of the resin caused by a dimensional change at the change of composition of fuel or its amount supplied, and low degree of reduction in cell performance caused by the detachment are shown.

[Advantages of the Fuel Cells of the Invention]

The fuel cells using the aforesaid polymer membranes and binders of the invention can achieve a high output owing to the ion conductivity of membranes and binders, and at the same time, hardly cause drop in an output due to dissolution or elution of the resin, fuel crossover, detachment of the membranes and electrode materials forming cells, etc., and are excellent in power generation efficiency and reliability.

BRIEF EXPLANATION OF THE DRAWINGS

In FIGS. 1 through 3, symbols represent the following:
1 . . . electrolyte membrane, 2,2' . . . electrode with catalyst, 3 . . . gasket, 4 . . . separator, 5 . . . pressure plate, 6 . . . gas flow channel, 7 . . . clamp bolt, 8 . . . fuel cell, 9 . . . bubbling tank for humidification, 10 . . . electron loading, 11 . . . mass flow controller, 12 . . . feeding pump

PREFERRED EMBODIMENT OF THE INVENTION

Figure 1:
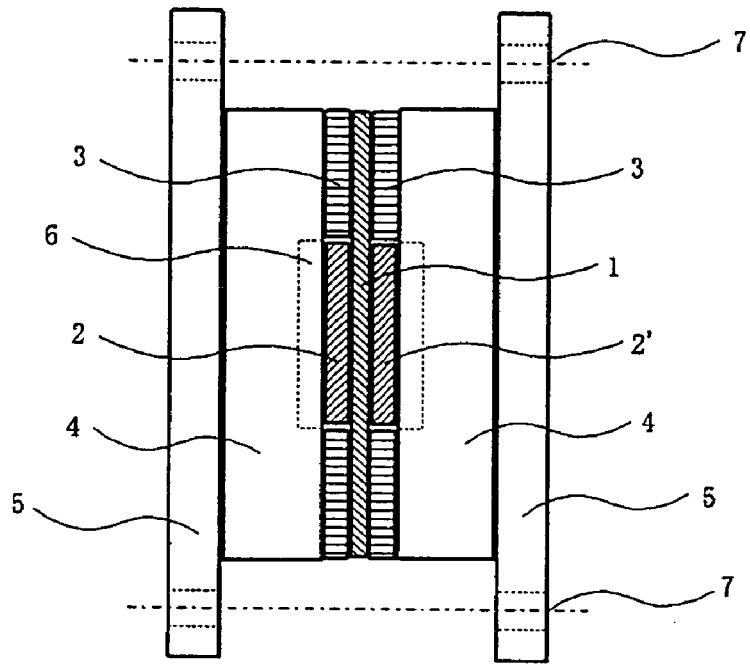
FIG. 1 is a sketch showing the cross-sectional structure of a fuel cell used in EXAMPLES of the invention.

Hereinafter the invention will be described specifically.

A crosslinkable aromatic resin having a protonic acid group of the present invention is an aromatic resin having a protonic acid group and containing a crosslinkable group, wherein the crosslinkable group is not derived from the protonic acid group and can form a polymer network without forming any elimination component.

[Aromatic Resin Having a Protonic Acid Group which Contains a Crosslinkable Group]

As the aromatic resin having a protonic acid group and containing a crosslinkable group of the present invention, preferred is an aromatic resin wherein the an main chain of the aromatic resin is formed of aromatic rings and their connecting groups and does not contain an aliphatic chain having 4 or more carbon atoms in the main chain, and wherein all or a part of structural units has a protonic acid group, and a crosslinkable group is contained in the main chain, side chains or terminal ends. In the present invention, the resin includes not only a single resin formed of 1 or more repeating structural units, but also a resin composition obtained by blending at least two resins having different repeating structural units.

Since the resin of the invention is a linear polymer, the resin provides excellent solvent solubility and thermoplasticity, and is easy for handling as a varnish, blending with electrode materials, and forming membrane, etc. The resin of the invention may additionally contain a branched structure to the extent that the above characteristics are not impaired.

Since the resin of the invention contains a crosslinkable group, and exhibits high water resistance and methanol resistance and low fuel permeability after the crosslinking, the content of the protonic acid group incorporated can be increased, as compared to a resin having no crosslinking mechanism.

[Protonic Acid Group]

As the protonic acid group in the invention, specifically preferred include a sulfonic acid group, a carboxylic acid group, a phosphonic acid group represented by the following formula (1) through (3) below. Among them, the sulfonic acid group represented by the formula (1) is preferred, and the sulfonic acid of formula (1) below wherein n is 0 is particularly preferred.

(1) —$C_nH_{2n}$—$SO_3Y$ (wherein n is an integer of 0 to 10; and Y is H, Na or K)

(2) —$C_nH_{2n}$—COOY (wherein n is an integer of 0 to 10; and Y is H, Na or K)

(3) —$C_nH_{2n}$—$PO_3Y_2$ (wherein n is an integer of 0 to 10; and Y is H, Na or K)

The content of the protonic acid group in the resin having a protonic acid group of the invention is not particularly limited but is preferably from 200 to 5000 g/mol, more preferably 200 to 1000 g/mol, in terms of the ion-exchange equivalent weight. Herein, the ion-exchange equivalent weight is defined by a resin weight per mole of the protonic acid group and means a reciprocal number of the mole number of the protonic acid group per unit weight of the resin. In other words, the smaller the ion-exchange equivalent weight, the larger the amount of the protonic acid group per unit weight of the resin.

Where the ion-exchange equivalent weight is too low, the solubility of resin in an uncrosslinked state in water is extremely high, which makes the resin difficult to be produced or purified (removed inorganic acids or inorganic salts in the resin). When the ion-exchange equivalent weight is too high, even the uncrosslinked resin shows high water resistance and methanol resistance, which decreases the necessity of crosslinking. However, when the ion-exchange equivalent weight is too high, the ion conductivity becomes poor, and fuel cells of high output cannot be obtained.

[Examples of the Aromatic Resin]

In the present invention, specific examples of the aromatic resin formed of aromatic rings and their connecting groups, which does not contain an aliphatic chain having 4 or more carbon atoms in the main chain, include the resin wherein the main chain is formed of at least one selected from structures represented below.

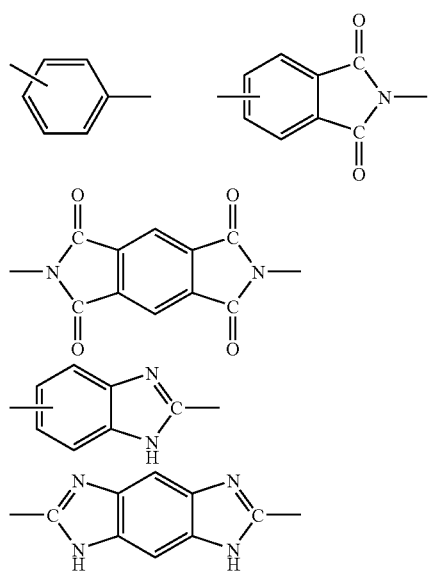

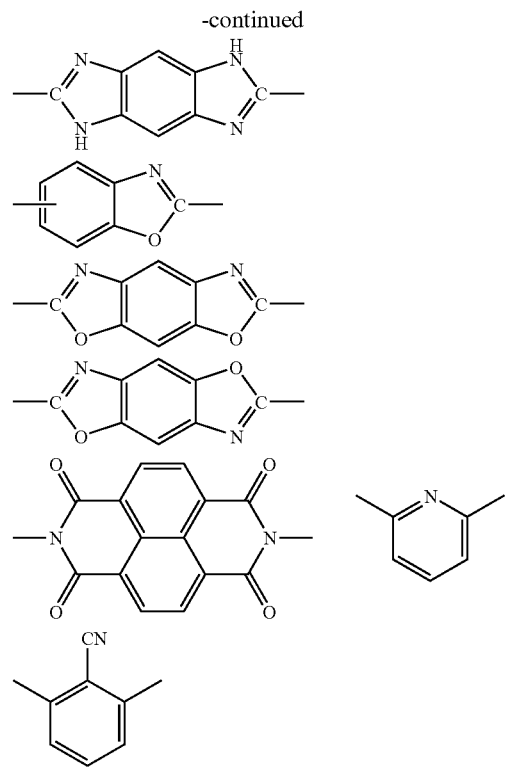

As examples of the connecting groups, a direct bond, —CO—, —$SO_2$—, —S—, —$CH_2$—, —$CF_2$—, —$C(CH_3)_2$—, —$C(CF_3)_2$—, —O—, —NH—CO—, —CO—O—, —O—CO—O—, 9,9-fluorene group, —CH($CH_3$)—, —CH($C_2H_5$)—, —CH($C_3H_7$)—, —CH($C_4H_9$)—, —$(CH_2)_2$—, —$CH_2$CH($CH_3$)—, —CH($C_2H_5$)CH($C_2H_5$)—, —$(CH_2)_3$—, —CH($C_2H_5$)CH($C_2H_5$)CH($CH_3$)—, etc. are cited.

The aromatic group includes an aromatic ring wherein a part or all of the hydrogen atoms is substituted with the following substituent:

—$C_nH_{2n}$—$SO_3Y$, —$C_nH_{2n}$—COOY, —$C_nH_{2n}$—$PO_3Y_2$ (wherein all the symbols have the same significance as defined in the protonic acid groups (1) to (3) described above);

—$C_nH_{2n+1}$, —$C_nH_{2n}$—CH=CH—R, —$C_nH_{2n}$—C≡C—R (wherein n is an integer of 0 to 10, Y is H, Na or K, and R is H or phenyl);

—F, —Cl, Br, $CF_3$,

-continued

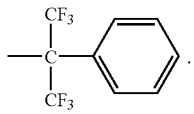

The aromatic resin of the invention has excellent heat resistance and radical tolerance, because its main chain is formed of aromatic rings and their connecting groups. In addition, since aromatic rings or connecting groups of the resin have polarity, the aromatic resin of the invention has excellent adhesion property as compared to fluorinated resins.

The aromatic resin containing no tertiary carbon in the main chain is a preferred example of the aromatic resin of the invention since it is hardly oxidized.

Resins having aliphatic chain in the main chain, for example, polyolefins such as polyethylene, polystyrene, etc., nylons or semi-aromatic polyamides using aliphatic diamines, aliphatic polyethers such as polyethylene oxide, etc. are not preferred because these resins have disadvantages that they are softened and deformed in the cell due to poor heat resistance, and the tertiary carbon in the main chain is attacked by radicals in the cell to release the hydrogen at the α-position leading to deterioration of resins, and the like. Although resins such as Teflon (registered trademark), etc., having the main chain formed of fluorinated aliphatic chains and containing no tertiary carbon are excellent in radical tolerance, however the resins are not preferable because the main chain is hydrophobic and thereby the resins tend to cause phase separation from protonic acid groups and are liable to formation of water clusters as the result.

Examples of the aromatic resin in the present invention include aromatic polyethers, aromatic polyamides, aromatic polyimides, aromatic polyamideimides, aromatic polyazoles, aromatic polyesters, aromatic polycarbonates, etc. Preferred examples include aromatic polyethers, aromatic polyamides, aromatic polyimides, aromatic polyamideimides and aromatic polyazoles. Among them, aromatic polyethers and aromatic polyamides are preferred because of excellent solvent solubility in an uncrosslinked state and easy processing such as membrane formation, etc., and aromatic polyethers are particularly preferred since they are not subject to hydrolysis by hot water, acids, alkaline water, alcohols, etc. In the case of resins like aromatic polyesters or aromatic polycarbonates with the main chain liable to hydrolysis by hot water, acids, alkaline water, alcohols, etc., these resins are degraded into lower molecular weight polymers due to gradual decomposition of the main chain under the use condition of fuel cell, which might cause reduced strength or adhesion, or dissolving out of the resins.

Herein, the aromatic polyethers in the present invention include not only aromatic polyethers having a connecting group of the aromatic ring comprising ether group alone such as polyphenylene oxide, but also polyetherketones having the connecting group comprising ether group and carbonyl group, polyethersulfones having the connecting groups comprising ether group and sulfone group, polysulfones, polyethernitriles and polyetherpyridines.

[Crosslinkable Group]

The crosslinkable group of the invention is the crosslinkable group that is not derived from the protonic acid group and can form a polymer network without forming any elimination component. Herein, the crosslinking in the present invention is used to mean that polymer chains are bonded to each other through covalent bond, and does not include the interaction between polymer chains through ionic bond, hydrogen bond or the like that repeats dissociation or recombination.

In the present invention, the crosslinking without being derived from the protonic acid group refers to crosslinking that uses no protonic acid group, in order to bind polymer chains to one another. In other words, the crosslinking means that the group or chain binding polymer chains to each other after being crosslinked is not a group or chain derived from the protonic acid group. That is, the crosslinking without being derived from the protonic acid group not only excludes the crosslinking, during which the protonic acid group chemically reacts, but also excludes the crosslinking that crosslinkable groups are previously introduced through the protonic acid group and then crosslinked.

The crosslinking of the invention without being derived from the protonic acid group is preferred, since the crosslinking density of resin can be controlled without reducing the content of the protonic acid group (increasing the ion-exchange equivalent weight) in the resin.

In contrast, for the crosslinking with being derived from the protonic acid group, a larger number of protonic acid groups should be used in order to increase the crosslinking density, which undesirably results in reduced ion conductivity of the crosslinked resin obtained. The crosslinking with being derived from the protonic acid group includes crosslinking for binding polymer chains to one another through a Friedel-Crafts reaction between the aromatic ring and a chloroalkyl group, crosslinking in which polymer chains are bound to one another by condensation between sulfonic acids while removing sulfuric acid, crosslinking in which chlorosulfonic acids are reacted with each other to bind polymer chains, crosslinking in which chlorosulfonic acids of polymer chain are bound to one another through sulfonamide groups, crosslinking which involves reacting chlorosulfonic acid group and allylamine to introduce the allyl groups in the side chain of a polymer and then addition-reacting the allyl groups to each other to bind polymer chains, etc.

In the present invention, the crosslinking that does not form any elimination component means a crosslinking mechanism in which polymer chains are bound to one another by a reaction without any elimination component. Herein, the elimination component means by-products that are produced during the reaction and not bound to the resin chains, for example, a halogenated hydrocarbon or a salt in the Friedel-Crafts reaction, water, a hydrogen halide or a salt in the condensation, etc.

The crosslinking without forming any elimination component is preferred, since the crosslinking is free from degeneration or deterioration of electrode materials caused by the elimination component, provides a uniform crosslinking density in a thickness direction, enables to form thick membrane easily and does not generate gas corrosive to manufacturing equipments.

In contrast, the crosslinking that forms elimination components is not preferred, because of problems that additional procedures to remove the elimination components are necessary, the crosslinking density is different between the membrane surface and the inside or back surface of membrane with different efficiencies of removing the elimination components, membrane thickening is achieved only with difficulty, voids are formed on the membrane, manufacturing equipments corrode due to the generated acidic gas, etc. The crosslinking that forms elimination components includes crosslinking in which halogenated hydrocarbon is produced as by-product by the Friedel-Crafts reaction between aromatic rings and halogen, crosslinking in which sulfuric acid is produced as by-product by the condensation between sulfonic acids while removing sulfuric acid, crosslinking in which chlorine is produced as by-product by the reaction between chlorosulfonic acids, crosslinking in which hydrochloric acid is produced as by-product by the reaction of chlorosulfonic acid with amine, etc.

[Examples of the Crosslinkable Group]

Specifically, the crosslinkable group in the present invention that is not derived from the protonic acid group and can form a polymer network without forming any elimination component includes a crosslinkable group composed of a $C_1$ to $C_{10}$ alkyl group, preferably a $C_1$ to $C_4$ alkyl group, more preferably methyl group, directly bonded to the aromatic ring, and a carbonyl group; a crosslinkable group composed of an alkylene group having 1 to 3 carbon atoms in the main chain in which at least one carbon atom directly bonded to the aromatic ring bonds to hydrogen, and a carbonyl group; a crosslinkable group composed of a carbon atom which is directly bonded to carbon-carbon double bond, nitrogen atom or oxygen atom and also bonded to hydrogen atom, and a carbonyl group; a crosslinkable group which is a carbon-carbon double bond or a carbon-carbon triple bond; and the like.

The aforementioned alkylene group having 1 to 3 carbon atoms in the main chain may have a side chain. The alkylene group has preferably 1 to 10 carbon atoms in total, more preferably 1 to 4 carbon atoms and is further preferably methylene group Among them, the crosslinkable group composed of a $C_1$ to $C_{10}$ alkyl group directly bonded to the aromatic ring and/or an alkylene group having 1 to 3 carbon atoms in the main chain in which at least one carbon atom directly bonded to the aromatic ring bonds to hydrogen, and a carbonyl group is particularly preferred because the group can contain one or more protonic acid groups, carbonyl groups, and alkyl groups or alkylene groups in each unit of the repeating units that constitute the resin, whereby a markedly high crosslinking density can be obtained. When the crosslinking mechanism does not involve hydrogen at the α-position of the tertiary carbon in the linkage formed by crosslinking, such a crosslinking mechanism is a preferred embodiment of the present invention because it is hardly oxidized.

[Crosslinkable Group Composed of a $C_1$ to $C_{10}$ Alkyl Group Directly Bonded to the Aromatic Ring and/or an Alkylene Group Having 1 to 3 Carbon Atoms in the Main Chain in which at least One Carbon Atom Directly Bonded to the Aromatic Ring Bonds to Hydrogen, and a Carbonyl Group]

A crosslinking mechanism will be explained for the crosslinkable aromatic resin having a protonic acid group wherein the crosslinkable group of the invention is a crosslinkable group composed of a $C_1$ to $C_{10}$ alkyl group directly bonded to the aromatic ring and/or an alkylene group having 1 to 3 carbon atoms in the main chain in which at least one carbon atom directly bonded to the aromatic ring bonds to hydrogen, and a carbonyl group. It is assumed that the carbonyl group in the polymer and the an alkyl group having 1 to 10 carbon atoms directly bonded to the aromatic ring in the polymer would take part in the crosslinking reaction as follows.

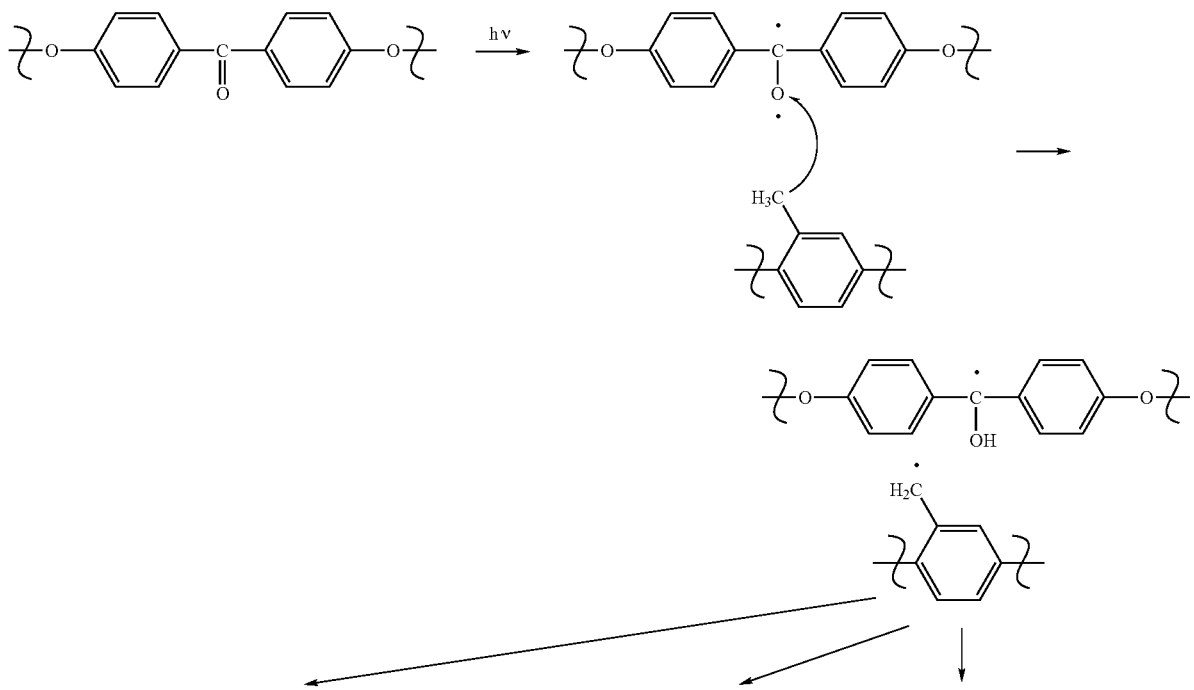

-continued

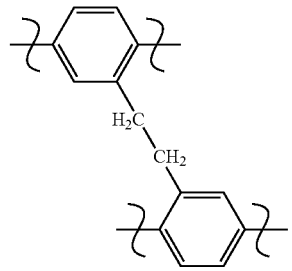 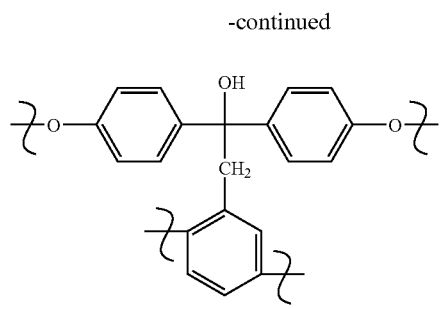 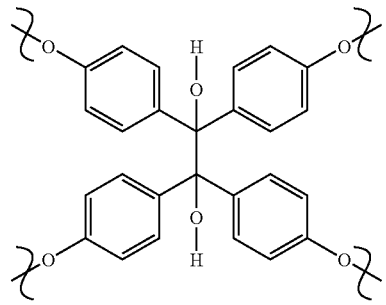

As shown by the reaction scheme above, energy supply through UV irradiation or a heat treatment causes to generate radicals on the benzophenone and the radicals draw hydrogen out of the methyl group. It is supposed that subsequent reactions such as dimerization of the benzyl radicals, coupling between the benzyl radicals and alcoholic carbon radicals, dimerization of alcoholic carbon radicals, and the like, would take place to cause crosslinking between the polymers.

[Crosslinkable Group which is a Carbon-Carbon Double Bond or Triple Bond]

Preferably, the crosslinkable group in the present invention which is a carbon-carbon double bond or triple bond includes a group represented by —$C_mH_{2m}$—CH=CH—R or —$C_mH_{2m}$—C≡C—R (wherein m is an integer of 0 to 10, and R is H or phenyl) which is in the side chain of the resin so that the resin has at least one double or triple bond at the side chain, a group represented by —$R^a$—CH=CH—$R^b$ or —$R^a$—C≡C—$R^b$ (wherein $R^a$ is phenylene and $R^b$ is H or phenyl) which is at the molecular end of the resin so that the resin has at least one double or triple bond at the molecular end, a group represented by the following formula (4) or (5), which is at the molecular end of the resin so that the resin has at least one double or triple bond at the molecular end; etc.

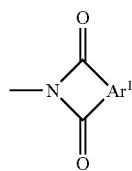  (4)

[In the formula (4), $Ar^1$ represents,

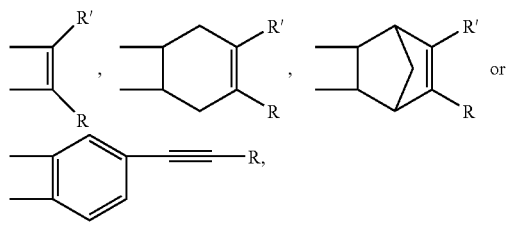

wherein R and R', which may be same or different, independently represent hydrogen, methyl, ethyl or phenyl.]

—NHCO—$Ar^2$  (5)

[In the formula (5), $Ar^2$ represents,

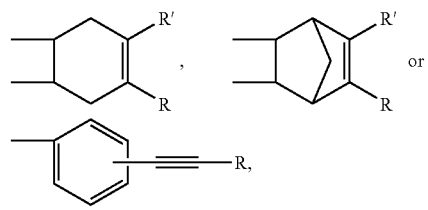

wherein R and R' have the same significance as defined for formula (4) and may be same or different.]

The crosslinkable aromatic resin of the invention having a protonic acid group can be crosslinked mainly by heat in the presence of the crosslinkable group of the carbon-carbon double bond or triple bond to improve solvent resistance and heat resistance of the resin.

[Example 1 of the Crosslinkable Aromatic Resin Having a Protonic Acid Group]

The crosslinkable aromatic resin having a protonic acid group and containing an alkyl group having 1 to 10 carbon atoms directly bonded to the aromatic ring and/or an alkylene group having 1 to 3 carbon atoms in the main chain in which at least one carbon atom directly bonded to the aromatic ring bonds to hydrogen, and having a carbonyl group as the crosslinkable group is a more preferred embodiment of the crosslinkable aromatic resin having a protonic acid group of the invention. Examples of such aromatic resin include aromatic polyethers, aromatic polyamides, aromatic polyimides, aromatic polyamideimides, aromatic polyazoles, etc. Among them, aromatic polyethers and aromatic polyamides are preferred because of excellent solvent solubility in an uncrosslinked state and easy processability to form a membrane, etc., and aromatic polyethers are particularly preferred since they are not subject to hydrolysis by hot water, acids, alkaline water, alcohol, etc. That is, the crosslinkable aromatic polyethers having a protonic acid group and containing an alkyl group having 1 to 10 carbon atoms directly bonded to the aromatic ring and/or an alkylene group having 1 to 3 carbon atoms in the main chain in which at least one carbon atom directly bonded to the aromatic ring bonds to hydrogen, and a carbonyl group are particularly preferred.

The crosslinkable aromatic resin having a protonic acid group and containing an alkyl group having 1 to 10 carbon atoms directly bonded to the aromatic ring and/or an alkylene group having 1 to 3 carbon atoms in the main chain in which at least one carbon atom directly bonded to the aromatic ring bonds to hydrogen, and a carbonyl group is specifically described below.

In the formulas in the invention, the same symbols are used to have the same significance, and they may be the same as or different from each other.

[Crosslinkable Aromatic Polyether 1 Having a Protonic Acid Group]

As specific examples of the crosslinkable aromatic polyether having a protonic acid group of the invention, which contains an alkyl group having 1 to 10 carbon atoms directly bonded to the aromatic ring and a carbonyl group as the crosslinkable group, include an aromatic polyether ketone comprising, based on the total repeating structural units, 10 to 100% by mol of the repeating structural unit represented by the following formula (6), and 0 to 90% by mol of the repeating structural unit represented by the following formula (7), wherein at least one of $R^1$ to $R^{10}$ is $-C_mH_{2m+1}$ (wherein m is an integer of 1 to 10), and at least one of $X^1$ to $X^{10}$ is a protonic acid group.

represents a direct bond, $-CH_2-$, $-C(CH_3)_2-$, $-C(CF_3)_2-$, $-O-$, $-SO_2-$ or $-CO-$; and each of i, j, k and l independently represents 0 or 1. The hydrogen atom bonded to the aromatic rings in the formulas (6) and (7) may be substituted with $-C_mH_{2m+1}$ (wherein m is an integer of 1 to 10), a protonic acid group, Cl, F or $CF_3$.

The repeating structural units represented by formulas (6) and (7) may take an optional conformation which includes the unit containing both an alkyl group and a protonic acid group, the unit containing either one of these groups, and the unit containing none of these groups. Each of the formulas (6) and (7) may be in a plurality of conformations above.

The crosslinkable aromatic polyether ketone having a protonic acid group of the invention may further contain a structural unit different from those of the formulas (6) and (7), so long as the resin contains 10 to 100% by mol of the repeating structural unit represented by the formula (6) and 0 to 90% by mol of the repeating structural unit represented by the formula (7).

Among the crosslinkable aromatic polyether ketones having a protonic acid group of the invention, preferred are the aromatic polyether ketone comprising 10 to 100% by mol of the repeating structural unit represented by the following formula (8) and 0 to 90% by mol of the repeating structural

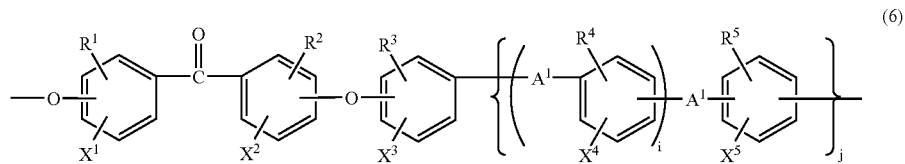

(6)

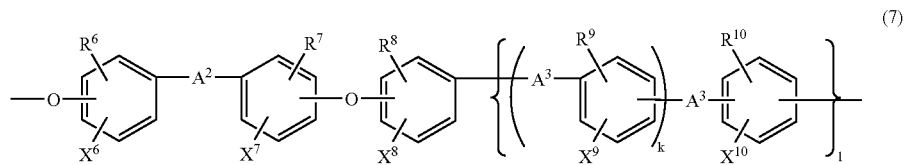

(7)

In the formulas (6) and (7), each of $R^1$ to $R^{10}$ independently represents H or $-C_mH_{2m+1}$ (wherein m is an integer of 1 to 10), each of $X^1$ to $X^{10}$ independently represents H or a protonic acid group; each of $A^1$ to $A^3$ independently unit represented by the following formula (9), wherein at least one of $R^3$ to $R^5$ and $R^8$ to $R^{10}$ is $-C_mH_{2m+1}$ (wherein m is an integer of 1 to 10), at least one of $X^1$, $X^2$, $X^6$ and $X^7$ is a protonic acid group, and $A^2$ is $-SO_2-$ or $-CO-$.

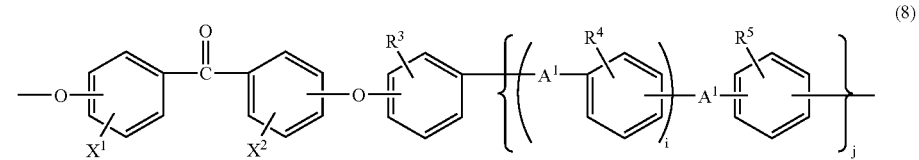

(8)

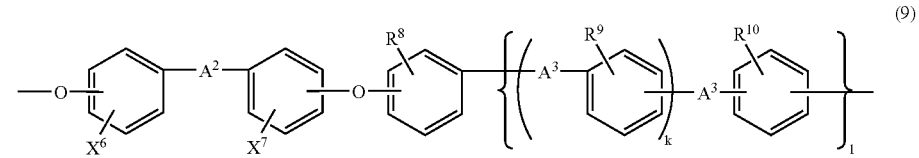

(9)

In the formulas (8) and (9), each of $R^3$ to $R^5$ and $R^8$ to $R^{10}$ independently represents H or $-C_mH_{2m+1}$ (wherein m is an integer of 1 to 10), each of $X^1$, $X^2$, $X^6$ and $X^7$ independently represents H or a protonic acid group, and each of $A^1$ to $A^3$ independently represents a direct bond, $-CH_2-$, $-C(CH_3)_2-$, $-C(CF_3)_2-$, $-O-$, $-SO_2-$ or $-CO-$; and each of i, j, k and l independently represents 0 or 1. The hydrogen atom on the aromatic rings in the formulas (8) and (9) may be substituted with $-C_mH_{2m+1}$ (wherein m is an integer of 1 to 10), a protonic acid group, Cl, F or $CF_3$.

Since the protonic acid group in the aromatic polyether ketone is bound to the aromatic ring directly bonded to $-SO_2-$ or $-CO-$ that is an electron attractive group, the protonic acid group has a strong binding force as compared to a protonic acid group bonded to other aromatic rings and is not liable to resolution or dissociation. When known aromatic polyether ketones are sulfonated by fuming sulfuric acid, etc., it is known that the sulfonic acid group is introduced into an aromatic ring which is not bonded directly to the electron attractive group of $-SO_2-$ or $-CO-$.

Among the crosslinkable aromatic polyether ketones having a protonic acid group of the invention, the aromatic polyether ketone comprising 10 to 100% by mol of the repeating structural unit represented by the following formula (10) and 0 to 90% by mol of the repeating structural unit represented by the following formula (11) is particularly preferable.

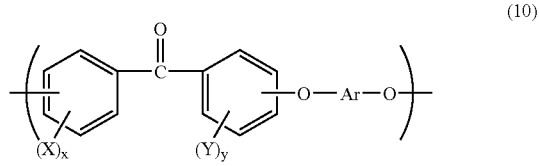

(10)

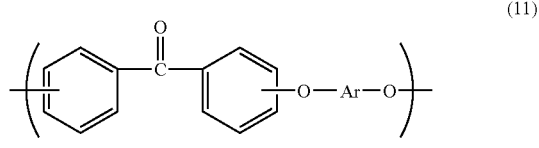

(11)

(In the formulas (10) and (11), Ar represents a group represented by formulas (12) or (13), wherein hydrogen bonded to the aromatic ring may be substituted with an alkyl group, a halogenated hydrocarbon group or a halogen; X and Y each represents a protonic acid group; x and y are an integer of 0 or more; and at least x+y is not smaller than 1.)

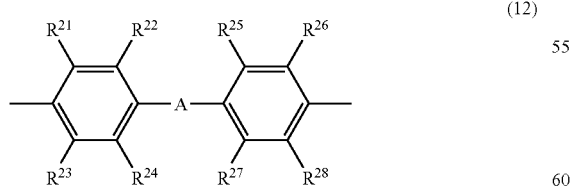

(12)

(In the formula (12), each of $R^{21}$ to $R^{28}$ independently represents H or $-C_mH_{2m+1}$ (wherein m is an integer of 1 to 10) and at least one of them represents $-C_mH_{2m+1}$; A represents a direct bond, $-CH_2-$, $-C(CH_3)_2-$, $-O-$, $-S-$, $-SO_2-$ or

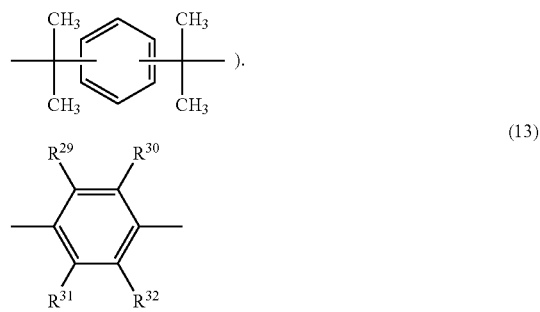

).

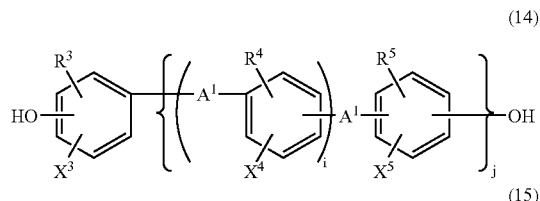

(13)

(In the formula (13), each of $R^{29}$ to $R^{32}$ independently represents H or $-C_mH_{2m+1}$ (wherein m is an integer of 1 to 10) and at least one of them is $-C_mH_{2m+1}$.)

Since the aromatic polyether ketone contains a group having carbonyl group and an alkyl group directly bonded to the aromatic ring in all of the repeating structural units, it can be crosslinked to a higher density.

[Example of the Method for Producing the Crosslinkable Aromatic Polyether 1 Having a Protonic Acid Group]

The crosslinkable aromatic polyether ketone having a protonic acid group containing the repeating structural unit represented by formula (6), can be produced by the following method described below.

The method includes a process comprising condensation-polymerization of aromatic dihydroxyl compounds represented by the following formulas (14) and (15) and aromatic dihalide compounds represented by the following formulas (16) and (17).

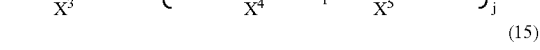

(14)

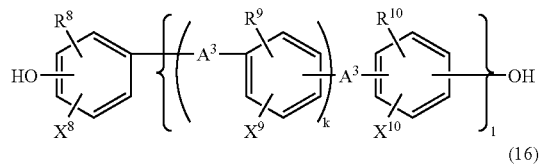

(15)

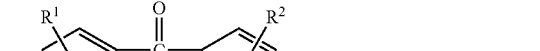

(16)

(17)

In the formulas (14) through (17), $R^1$ to $R^{10}$, $X^1$ to $X^{10}$ and $A^1$ to $A^3$ have the same significance as defined in the formulas (6) and (7), and Y represents a halogen or a nitro group.

By using the aromatic dihydroxyl compound and the aromatic dihalide compound containing the protonic acid group and/or the alkyl group in combination with those not containing such groups in appropriate amounts, the aromatic polyether ketone having desired amounts of the protonic acid group and the alkyl group can be produced. The same applies to the case described hereafter, in which the aromatic resin is prepared through polycondensation.

In this connection, polycondensation of the compounds represented by formulas (14) through (17) in 1 mol each gives aromatic polyether ketones having 25% by mol of each of 4 repeating structural units, that is, 0.5 mol of the repeating structural unit represented by formula (6), 0.5 mol of the repeating structural unit represented by formula (7), 0.5 mol of the repeating structural unit derived from the compounds represented by formulas (14) and (17), and 0.5 mol of the repeating structural unit derived from the compounds represented by formulas (15) and (16), based on the total repeating structural units.

As one of other preferred methods for obtaining the crosslinkable aromatic polyether ketone having a protonic acid group, which contains the repeating structural unit represented by formula (6), there can be cited a method for introducing a desired amount of the protonic acid group into aromatic polyether ketones such as aromatic polyether ketones or polyetheretherketone, etc., by a known sulfonation or alkyl sulfonation method, etc.

[Crosslinkable Aromatic Polyether 2 Having a Protonic Acid Group]

As specific examples of the crosslinkable aromatic polyether having a protonic acid group of the invention, which contains an alkylene group having 1 to 3 carbon atom in the main chain in which at least one carbon atom directly bonded to the aromatic ring bonds to hydrogen, and a carbonyl group as the crosslinkable group, include an aromatic polyether ketone comprising, based on the total repeating structural units, 10 to 100% by mol of the repeating structural unit represented by the following formula (6'), and 0 to 90% by mol of the repeating structural unit represented by the following formula (7'), wherein at least one of $B^1$ to $B^3$ is a group represented by the formula: $-CH(C_xH_{x+1})\{C(C_yH_{y+1})(C_{y'}H_{y'+1})\}_\alpha\{C(C_zH_{z+1})(C_{z'}H_{z'+1})\}_\beta-$, wherein x is an integer of 0 to 9, each of y, y', z and z' is independently an integer of 0 to 8, each of $\alpha$ and $\beta$ is independently of 0 or 1 and $x+y+y'+z+z'+\alpha+\beta \leq 9$, and at least one of $X^1$ to $X^{10}$ is a protonic acid group.

In the formulas (6') and (7'), each of $X^1$ to $X^{10}$ independently represents H or a protonic acid group; each of $B^1$ to $B^3$ independently represents a direct bond, $-C(CF_3)_2-$, $-O-$, $-SO_2-$, $-CO-$, 9,9-fluorene group or a group represented by the formula: $-CH(C_xH_{x+1})\{C(C_yH_{y+1})(C_{y'}H_{y'+1})\}_\alpha\{C(C_zH_{z+1})(C_{z'}H_{z'+1})\}_\beta-$, wherein x is an integer of 0 to 9, each of y, y', z and z' is independently an integer of 0 to 8, each of $\alpha$ and $\beta$ is independently of 0 or 1 and $x+y+y'+z+z'+\alpha+\beta \leq 9$, and each of i, j, k and l independently represents 0 or 1. The hydrogen atom bonded to the aromatic rings in the formulas (6') and (7') maybe substituted with $-C_mH_{2m+1}$ wherein m is an integer of 1 to 10, a protonic acid group, Cl, F or $CF_3$. As a specific example of each of the alkylene group represented by the above formula, there can be cited $-CH_2-$, $-CH(CH_3)-$, $-CH(C_2H_5)-$, $-CH(C_3H_7)-$, $-CH(C_4H_9)-$, $-(CH_2)_2-$, $-CH_2CH(CH_3)-$, $-CH(C_2H_5)CH(C_2H_5)-$, $-(CH_2)_3-$, $-CH(C_2H_5)CH(C_2H_5)CH(CH_3)-$ and $-C(CH_3)_2-$.

The repeating structural units represented by formulas (6') and (7') may take an optional conformation which includes the unit containing both an alkylene group and a protonic acid group, the unit containing either one of these groups, and the unit containing none of these groups. Each of the formulas (6') and (7') may be in a plurality of conformations above.

The crosslinkable aromatic polyether ketone having a protonic acid group of the invention may further contain a structural unit different from those of the formulas (6') and (7'), so long as the resin contains 10 to 100% by mol of the repeating structural unit represented by the formula (6') and 0 to 90% by mol of the repeating structural unit represented by the formula (7').

Among the crosslinkable aromatic polyether ketones having a protonic acid group of the invention, preferred are the aromatic polyether ketone wherein each of $X^1$ and $X^2$ is a protonic acid, each of $X^3$ to $X^{10}$ is hydrogen atom, $B^2$ is $-CO-$, each of $B^1$ and $B^3$ is $-CH_2-$ and j and l are 1. Such aromatic polyether ketones can be highly crosslinked since they contain a carbonyl group and a methylene group directly bonded to aromatic ring in each repeating structural unit.

As a process for producing the crosslinkable aromatic polyether ketones having a protonic acid group containing a repeating structural unit represented by the formula (6'), there can be cited a process for condensation-polymerization of an aromatic dihydroxy compound and an aromatic dihalide, process for introducing a desired amount of protonic acid group by the known methods such as sulfonation, alkyl

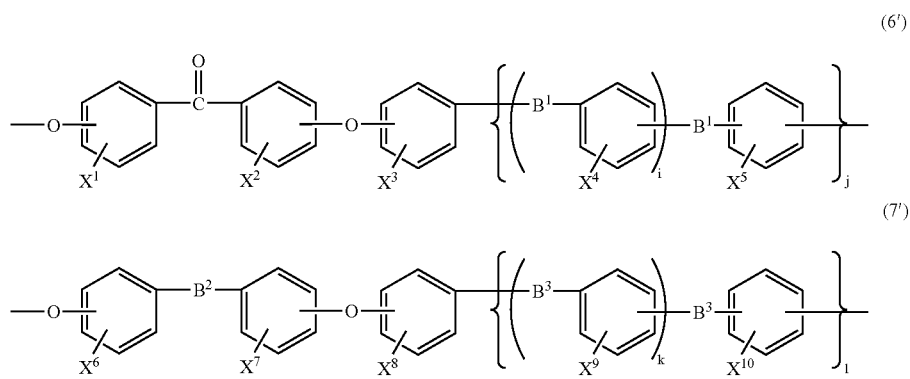

sulfonation etc. into an aromatic polyetherketones same as in the crosslinkable aromatic polyether ketones having a protonic acid group containing a repeating structural unit represented by the formula (6).

[Crosslinkable Aromatic Polyether 3 Having a Protonic Acid Group]

Another specific example of the crosslinkable aromatic polyether having a protonic acid group of the invention, which contains an alkyl group having 1 to 10 carbon atoms directly bonded to the aromatic ring and/or an alkylene group having 1 to 3 carbon atoms in the main chain in which at least one carbon atom directly bonded to the aromatic ring bonds to hydrogen, and a carbonyl group as the crosslinkable group, includes an aromatic polyether comprising, based on the repeating structural units in total, 10 to 100% by mol of the repeating structural unit represented by the following formula (18), and, 0 to 90% by mol of the repeating structural unit represented by formula (19), wherein at least one of $R^1$ to $R^{10}$ and $R^{1'}$ to $R^{2'}$ is $-C_mH_{2m+1}$ (wherein m is an integer of 1 to 10) and/or at least one of $A^1$ to $A^3$ is $-CH_2-$, and at least one of $X^1$ to $X^{10}$ is a protonic acid group.

The repeating structural units shown by formulas (18) and (19) may take an optional conformation which includes the unit containing both an alkyl group or an alkylene group, and a protonic acid groups, the unit containing one of these groups, and the unit containing none of these groups. The formulas (18) and (19) may be in a plurality of conformations above.

The crosslinkable aromatic polyether having a protonic acid group of the invention may further contain a structural unit different from those of the formulas (18) and (19), so long as the resin contains 10 to 100% by mol of the repeating structural unit represented by the formula (18) and 0 to 90% by mol of the repeating structural unit represented by the formula (19).

[Crosslinkable Aromatic Polyamide 1 Having a Protonic Acid Group]

Examples of the crosslinkable aromatic polyamide having a protonic acid group of the invention, which contains an alkyl group having 1 to 10 carbon atoms directly bonded to the aromatic ring and/or an alkylene group having 1 to 3 carbon atoms in the main chain in which at least one carbon atom directly bonded to the aromatic ring bonds to hydro-

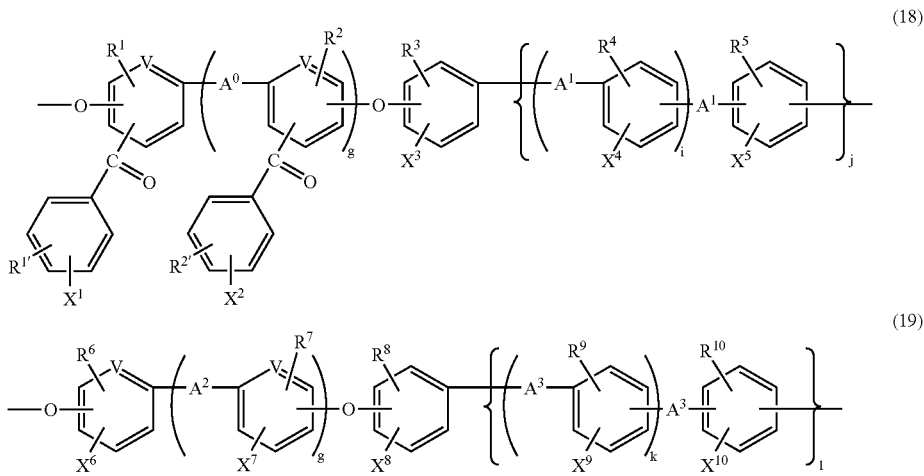

In the formulas (18) and (19), each of $R^1$ to $R^{10}$ and $R^{1'}$ to $R^{2'}$ independently represents H or $-C_mH_{2m+1}$ (wherein m is an integer of 1 to 10), each of $X^1$ to $X^{10}$ independently represents H or a protonic acid group; each of $A^0$ to $A^3$ independently represents a direct bond, $-CH_2-$, $-C(CH_3)_2-$, $-C(CF_3)_2-$, $-O-$, $-SO_2-$ or $-CO-$; V independently represents CH, N or C—CN; each of g, h, i, j, k and l independently represents 0 or 1. The hydrogen atom bonded to the aromatic rings in the formulas (18) and (19) may be substituted with $-C_mH_{2m+1}$ (wherein m is an integer of 1 to 10), a protonic acid group, Cl, F or $CF_3$.

gen, and a carbonyl group as the crosslinkable group, include an aromatic polyamide comprising 10 to 100% by mol of the repeating structural unit represented by the following formula (20), and 0 to 90% by mol of the repeating structural unit represented by the following formula (21), wherein at least one of $R^1$ to $R^{10}$ is $-C_mH_{2m+1}$ (wherein m is an integer of 1 to 10) and/or at least one of $A^1$ to $A^4$ is $-CH_2-$, at least one of $X^1$ to $X^{10}$ is a protonic acid group, and at least one of $A^1$ and $A^2$ is $-CO-$.

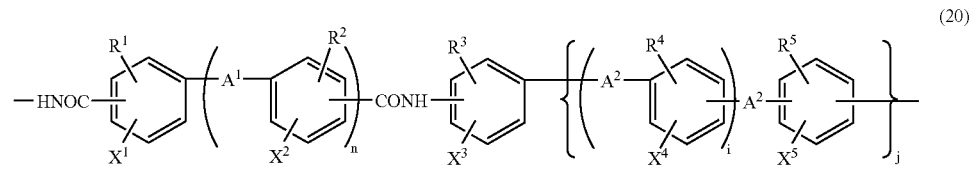

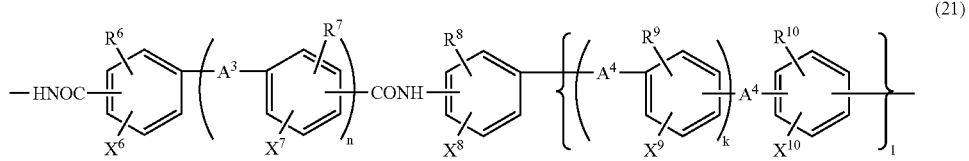

In the formulas (20) and (21), each of $R^1$ to $R^{10}$ independently represents H or $-C_mH_{2m+1}$ (wherein m is an integer of 1 to 10), each of $X^1$ to $X^{10}$ independently represents H or a protonic acid group; each of $A^1$ to $A^4$ independently represents a direct bond, $-CH_2-$, $-C(CH_3)_2-$, $-C(CF_3)_2-$, $-O-$, $-SO_2-$ or $-CO-$; and each of i, j, k, l and n independently represents 0 or 1. The hydrogen atom bonded to the aromatic rings in the formulas (20) and (21) may be substituted with $-C_mH_{2m+1}$ (wherein m is an integer of 1 to 10), a protonic acid group, Cl, F or $CF_3$.

The repeating structural units represented by the formulas (20) and (21) may take an optional conformation, which included the unit containing both an alkyl group or an alkylene group, and a protonic acid group, the unit containing either one of these groups, and the unit containing none of these groups.

For example, when the repeating unit represented by formula (20) is a unit containing both the alkyl group or the alkylene group, and the protonic acid group, a preferred example of the aromatic polyamide of the invention is a polyamide resin that the repeating unit of the formula (21) is the unit not containing a protonic acid group and a molar ratio of the repeating unit of the formula (20) to that of the formula (21) is in a range of 20 to 90% by mol : 80 to 10% by mol.

The crosslinkable aromatic polyamide having a protonic acid group of the invention may further contain structural units different from those of the formulas (20) and (21), so long as the resin contains 10 to 100% by mol of the repeating structural unit represented by the formula (20) and 0 to 90% by mol of the repeating structural unit represented by the formula (21).

Examples of the method for producing the crosslinkable aromatic polyamide having a protonic acid group of the invention include a process which comprises subjecting an aromatic diamine and an aromatic dicarboxylic acid chloride to polycondensation by known methods.

For example, for preparing the aromatic polyamide having the repeating unit represented by the formula (20) above, the aromatic dicarboxylic acid chloride represented by the following formula (22) and the aromatic diamine represented by the following formula (23) can be employed.

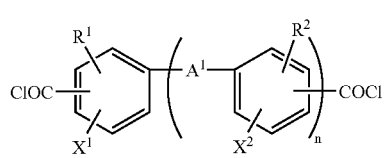

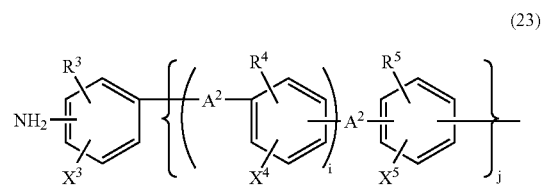

In the formulas (22) and (23), $R^1$ to $R^5$, $X^1$ to $X^5$, $A^1$ and $A^2$, i, j and n have the same significance as defined in the formula (20). The hydrogen atom bonded to the aromatic ring in the formula may be substituted with $-C_mH_{2m+1}$ (wherein m is an integer of 1 to 10), a protonic acid group, Cl, F or $CF_3$.

As one of preferred methods for obtaining the crosslinkable aromatic polyamide having a protonic acid group containing the repeating structural unit represented by the formula (20), there can be cited a method for introducing a desired amount of the protonic acid group into aromatic polyamides by a known sulfonation or alkyl sulfonation method, etc.

[Crosslinkable Aromatic Polyimide 1 Having a Protonic Acid Group]

Examples of the crosslinkable aromatic polyimide having a protonic acid group of the invention, which contains an alkyl group having 1 to 10 carbon atoms directly bonded to the aromatic ring and/or an alkylene group having 1 to 3 carbon atoms in the main chain in which at least one carbon atom directly bonded to the aromatic ring bonds to hydrogen, and a carbonyl group as the crosslinkable group, include an aromatic polyimide comprising, based on the total repeating structural units, 10 to 100% by mol of the repeating structural unit represented by the following formula (24), and 0 to 90% by mol of the repeating structural unit represented by the following formula (25), wherein at least one of $R^3$ to $R^5$ and $R^8$ to $R^{10}$ is $-C_mH_{2m+1}$ (wherein m is an integer of 1 to 10) and/or at least one of $A^1$ to $A^4$ is $-CH_2-$, and at least one of $X^3$ to $X^5$ and $X^8$ to $X^{10}$ is a protonic acid group, and at least one of $A^1$ and $A^2$ is $-CO-$.

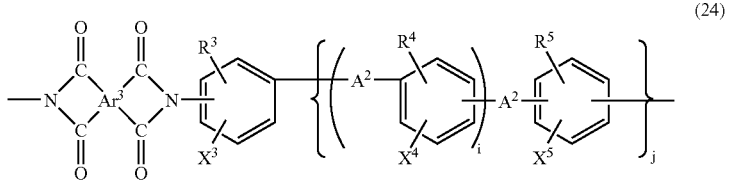

(24)

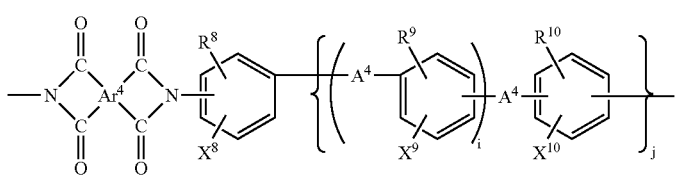

(25)

In the formulas (24) and (25), each of $R^3$ to $R^5$ and $R^8$ to $R^{10}$ independently represents H or $-C_mH_{2m+1}$ (wherein m is an integer of 1 to 10), each of $X^3$ to $X^5$ and $X^8$ to $X^{10}$ independently represents H or a protonic acid group, and each of $A^2$ and $A^4$ independently represents a direct bond, $-CH_2-$, $-C(CH_3)_2-$, $-C(CF_3)_2-$, $-O-$, $-SO_2-$ or $-CO-$; each of i, j, k and l independently represents 0 or 1; $Ar^3$ and $Ar^4$ independently represent

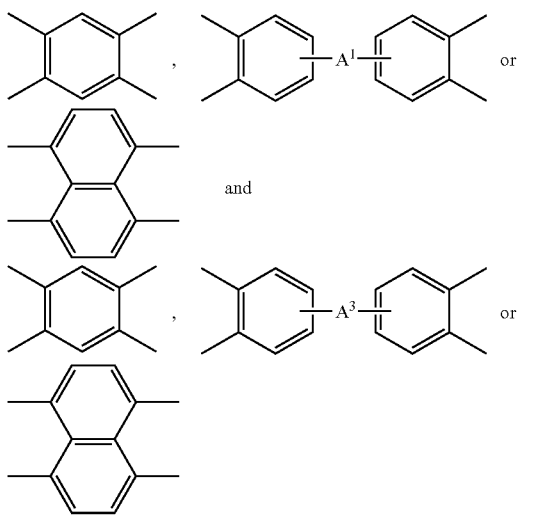

respectively, each of $A^1$ and $A^3$ independently represents a direct bond, $-CH_2-$, $-C(CH_3)_2-$, $-C(CF_3)_2-$, $-O-$, $-SO_2-$ or $-CO-$.

The hydrogen atom bonded to the aromatic rings in the formulas (24) and (25) may be substituted with $-C_mH_{2m+1}$ (wherein m is an integer of 1 to 10), a protonic acid group, Cl, F or $CF_3$.

The formulas (24) and (25) may take various forms of repeating units, as stated for the formulas (20) and (21) above.

For example, a preferred embodiment of the aromatic polyimide of the invention is a polyimide resin wherein the repeating unit represented by formula (24) is a repeating unit containing both the alkyl group or the alkylene group, and the protonic acid group, the repeating unit represented by the formula (25) is a repeating unit not containing a protonic acid group, and a molar ratio of the repeating unit of the formula (24) to that of the formula (25) is in a range of 20 to 90% by mol:80 to 10% by mol.

The crosslinkable aromatic polyimide having a protonic acid group of the invention may further contain a structural unit different from those of the formulas (24) and (25), so long as the resin contains 10 to 100% by mol of the repeating structural unit represented by the formula (24) and 0 to 90% by mol of the repeating structural unit represented by the formula (25).

For preparing the aromatic polyimides containing the repeating unit represented by the formula (24) above, there can be cited a method for reacting an aromatic diamine with an aromatic tetracarboxylic dianhydride in an organic solvent and subjecting the resulting precursor polyamic acid to thermal or chemical imidation.

As the aromatic diamine and the aromatic tetracarboxylic dianhydride, the compounds represented by the following formulas (26) and (27) are given below, respectively.

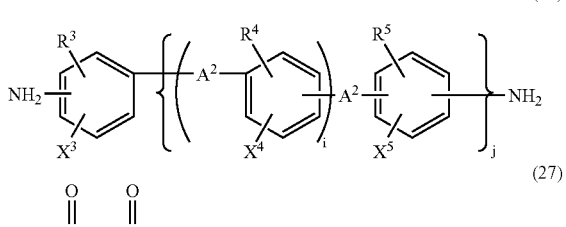

(26)

(27)

In the formulas (26) and (27), $R^3$ to $R^5$, $X^3$ to $X^5$, $A^2$ and $Ar^3$ as well as i and j have the same significance as defined in the formula (24) above. The hydrogen atom bonded to the aromatic rings in the formulas (26) and (27) may be substituted with $-C_mH_{2m+1}$ (wherein m is an integer of 1 to 10), a protonic acid group, Cl, F or $CF_3$.

As one of other preferred methods for obtaining the crosslinkable aromatic polyimide having a protonic acid group, which contains the repeating structural unit represented by the formula (24), there can be cited a method for introducing a desired amount of the protonic acid group into aromatic polyimides by a known sulfonation or alkyl sulfonation method, etc.

[Crosslinkable Aromatic Polyamideimide 1 Having a Protonic Acid Group]

Examples of the crosslinkable aromatic polyamideimide having a protonic acid group of the invention, which contains an alkyl group having 1 to 10 carbon atoms directly bonded to the aromatic ring and/or an alkylene group having 1 to 3 carbon atoms in the main chain in which at least one carbon atom directly bonded to the aromatic ring bonds to hydrogen, and a carbonyl group as the crosslinkable group, include an aromatic polyamideimide comprising, based on the total repeating structural units, 10 to 100% by mol of the repeating structural unit represented by the following formula (28), and 0 to 90% by mol of the repeating structural unit represented by the following formula (29), wherein at least one of $R^1$ to $R^{10}$ is —$C_mH_{2m+1}$ (wherein m is an integer of 1 to 10) and/or at least one of $A^1$ to $A^4$ is —$CH_2$—, and at least one of $X^1$ to $X^{10}$ is a protonic acid group, and at least one of $A^1$ and $A^2$ is —CO—.

structural unit different from those of the formulas (28) and (29), so long as the resin contains 10 to 100% by mol of the repeating structural unit represented by the formula (28) and 0 to 90% by mol of the repeating structural unit represented by the formula (29).

For preparing the aromatic polyamideimides containing the repeating units represented by the formulas (28) and (29) above, there can be cited a method for polycondensing an aromatic diamine and a tricarboxylic anhydride monochloride in an organic solvent to form a polyamic acid precursor and then subjecting it to thermal imidation or chemical imidation.

For example the aromatic polyamideimides containing the repeating units represented by the formulas (28), can be prepared by polycondensing an aromatic diamine represented by the following formula (30) and a tricarboxylic anhydride monochloride represented by the following formula (31) by known method.

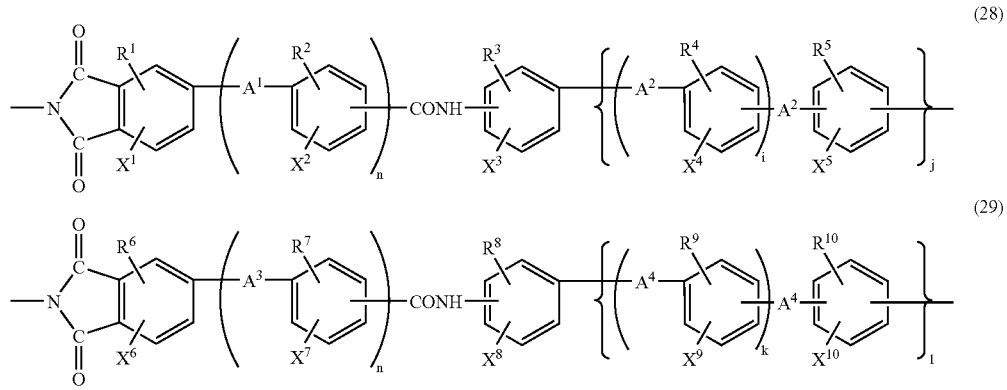

In the formulas (28) and (29), each of $R^1$ to $R^{10}$ independently represents H or —$C_mH_{2m+1}$ (wherein m is an integer of 1 to 10), each of $X^1$ to $X^{10}$ independently represents H or a protonic acid group, and each of $A^1$ to $A^4$ independently represents a direct bond, —$CH_2$—, —$C(CH_3)_2$—, —$C(CF_3)_2$—, —O—, —$SO_2$— or —CO—; each of i, j, k, l and n independently represents 0 or 1.

The hydrogen atom bonded to the aromatic rings in the formulas (28) and (29) may be substituted with —$C_mH_{2m+1}$ (wherein m is an integer of 1 to 10), a protonic acid group, Cl, F or $CF_3$.

The repeating structural units represented by the formulas (28) and (29) may take various forms of repeating structural units, as stated for the formulas (20) and (21) above. For example, a preferred embodiment of the aromatic polyamideimide of the invention is a polyamideimide resin wherein the repeating unit represented by formula (28) is a repeating unit containing both the alkyl group or the alkylene group, and the protonic acid group, the repeating unit represented by the formula (29) is a repeating unit not containing a protonic acid group, and a molar ratio of the repeating unit of the formula (28) to that of the formula (29) is in a range of 20 to 90% by mol:80 to 10% by mol.

The crosslinkable aromatic polyamideimide having a protonic acid group of the invention may further contain a

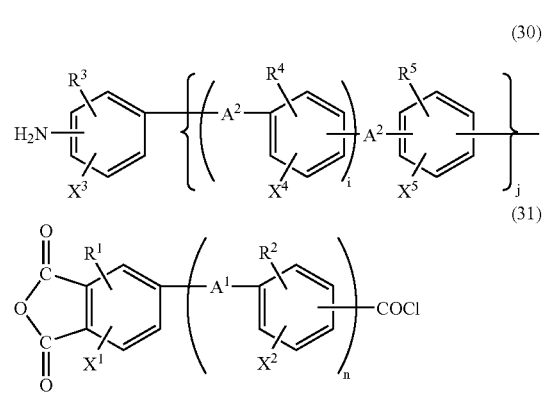

In the formulas (30) and (31), $R^1$ to $R^5$ $X^1$ to $X^5$, $A^1$ and $A^2$ as well as i, j and n have the same significance as defined in the formula (28) above.

The hydrogen atom bonded to the aromatic rings in the formulas (30) and (31) may be substituted with —$C_mH_{2m+1}$ (wherein m is an integer. of 1 to 10), a protonic acid group, Cl, F or $CF_3$.

As one of preferred methods for obtaining the crosslinkable aromatic polyamideimide having a protonic acid group, which contains the repeating structural unit represented by the formula (28), there can be cited a method for introducing a desired amount of the protonic acid group into aromatic polyamideimides by a known sulfonation or alkyl sulfonation method, etc.

[Crosslinkable Aromatic Polyazole 1 Having a Protonic Acid Group]

Examples of the crosslinkable aromatic polyazole having a protonic acid group of the invention, which contains an alkyl group having 1 to 10 carbon atoms directly bonded to the aromatic ring and/or an alkylene group having 1 to 3 carbon atoms in the main chain in which at least one carbon atom directly bonded to the aromatic ring bonds to hydrogen, and a carbonyl group as the crosslinkable group, include an aromatic polyazole comprising, based on the total repeating structural units, 10 to 100% by mol of the repeating structural unit represented by the following formula (32), and
0 to 90% by mol of the repeating structural unit represented by the following formula (33),
wherein at least one of $R^3$ to $R^5$ and $R^8$ to $R^{10}$ is $-C_mH_{2m+1}$ (wherein m is an integer of 1 to 10) and/or at least one of $A^1$ to $A^4$ is $-CH_2-$, and at least one of $X^3$ to $X^5$ and $X^8$ to $X^{10}$ is a protonic acid group, and at least one of $A^1$ and $A^2$ is $-CO-$.

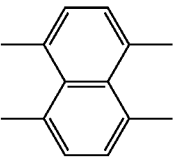
-continued respectively, each of $A^1$ and $A^3$ independently represents a direct bond, $-CH_2-$, $-C(CH_3)_2-$, $-C(CF_3)_2-$, $-O-$, $-SO_2-$ or $-CO-$.

The hydrogen atom bonded to the aromatic rings in the formulas (32) and (33) may be substituted with $-C_mH_{2m+1}$ (wherein m is an integer of 1 to 10), a protonic acid group, Cl, F or $CF_3$.

The crosslinkable aromatic polyazole having a protonic acid group of the invention can be roughly classified into polybenzimidazole wherein -Z- in the repeating units represented by the formulas (32) and (33) is $-NH-$ and polybenzoxazole wherein -Z- is $-O-$.

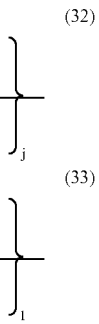

In the formulas (32) and (33), each of $R^3$ to $R^5$ and $R^8$ to $R^{10}$ independently represents H or $-C_mH_{2m+1}$ (wherein m is an integer of 1 to 10), each of $X^3$ to $X^5$ and $X^8$ to $X^{10}$ independently represents H or a protonic acid group, Z independently represents $-NH-$ or $-O-$, and each of $A^2$ and $A^4$ independently represents a direct bond, $-CH_2-$, $-C(CH_3)_2-$, $-C(CF_3)_2-$, $-O-$, $-SO_2-$ or $-CO-$; each of i, j, k and l independently represents 0 or 1; $Ar^5$ and $Ar^6$ independently represent

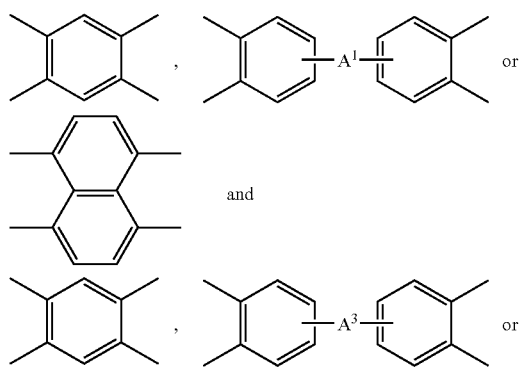

The polybenzimidazole wherein -Z- is $-NH-$ can be prepared by polycondensing an aromatic tetraamine and an aromatic dicarboxylic acid ester by known method. The polybenzoxazole wherein -Z- is $-O-$ can be prepared by polycondensing a diaminodihydroxy compound and an aromatic dicarboxylic acid by known method.

Polybenzimidazoles or polybenzoxazoles having a protonic acid group can be obtained by using a monomer containing a protonic acid group at the polycondensation. Further aromatic polyazoles having a protonic acid group can also be obtained by introducing a desired amount of the protonic acid group into aromatic polyazoles such as polybenzimidazole or polybenzoxazoles by a known sulfonation or alkyl sulfonation method, etc.

The formulas (32) and (33) may take various forms of repeating units. For example, a preferred embodiment of the aromatic polyazole of the invention is a polyazole resin having the repeating unit represented by formula (32) wherein at least one of $R^3$ to $R^5$ is $-C_mH_{2m+1}$ (wherein m is an integer of 1 to 10) and/or at least one of $A^1$ and $A^2$ is $-CH_2-$ and at least one of $X^3$ to $X^5$ is a protonic acid, and the repeating unit represented by the formula (33) not containing a protonic acid group wherein at least one of $A^1$ and $A^2$ is $-CO-$, and having a molar ratio of the repeating unit of the formula (32) to that of the formula (33) being in a range of 20 to 90% by mol:80 to 10% by mol.

The crosslinkable aromatic polyazole having a protonic acid group of the invention may further contain a structural unit different from those of the formulas (32) and (33), so long as the resin contains 10 to 100% by mol of the repeating structural unit represented by the formula (32) and 0 to 90% by mol of the repeating structural unit represented by the formula (33).

[Example 2 of Crosslinkable Aromatic Resin Having a Protonic Acid Group-Crosslinkable Aromatic Resin Having a Protonic Acid Group Comprising a Carbonyl Group-Containing Resin and an Alkyl Group or Alkylene Group-Containing Resin]

Another specific example of the crosslinkable aromatic resin having a protonic acid group includes a resin comprising a carbonyl group-containing resin having a carbonyl group, and an alkyl or alkylene group-containing resin having a $C_1$ to $C_{10}$ alkyl group directly bonded to a aromatic ring or an alkylene group having 1 to 3 carbon atoms in the main chain in which at least one carbon atom directly bonded to the aromatic ring bonds to hydrogen, wherein any one of the carbonyl group-containing resin and the alkyl or alkylene group-containing resin has a protonic acid group in its molecular chain.

As such a crosslinkable aromatic resin having a protonic acid group, there can be cited a resin comprising of 20 to 80% by weight of a carbonyl group-containing resin containing 10 to 100% by mol, based on total repeating structural units, of at least one repeating structural units selected from units represented by the following formulas (6), (6'), (18), (20), (24), (28) and (32) as described above wherein at least one of $A^1$ and $A^2$ is —CO— in the formulas (20), (24), (28) and (32), and 20 to 80% by weight of an alkyl or alkylene group-containing resin, containing 10 to 100% by mol, based on total repeating structural units, of at least one repeating structural unit selected from units represented by the following formulas (7), (7'), (19), (21), (25), (29) and (33) as mentioned above wherein at least one of $R^6$ to $R^{10}$ represents —$C_mH_{2m+1}$ (wherein m is a integer of 1 to 10) or units represented by the following formulas (7'), (19), (21), (25), (29) and (33) as mentioned above wherein at least one of $A^2$ to $A^4$ is —$CH_2$—, and at least one of $B^2$ and $B^3$ is a group represented by the formula: —$CH(C_xH_{x+1})\{C(C_{y'}H_{y+1})(C_{y'}H_{y'+1})\}_\alpha\{C(C_zH_{z+1})(C_{z'}H_{z'+1})\}_\beta$—, wherein x is an integer of 0 to 9, each of y, y', z and z' is independently an integer of 0 to 8, each of α and β is independently of 0 or 1 and $x+y+y'+z+z'+\alpha+\beta \leq 9$, wherein at least one of $X^1$ to $X^{10}$ in formulas cited hear represents a protonic acid group.

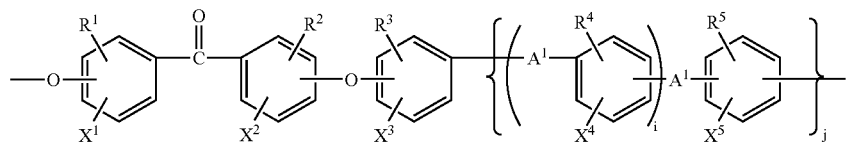

(6)

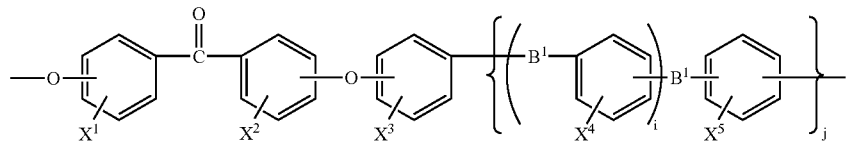

(6')

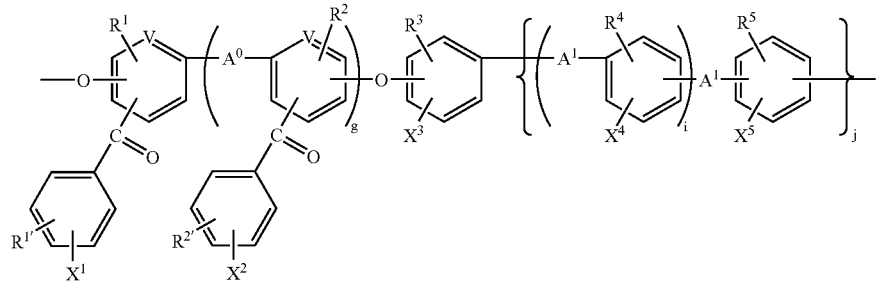

(18)

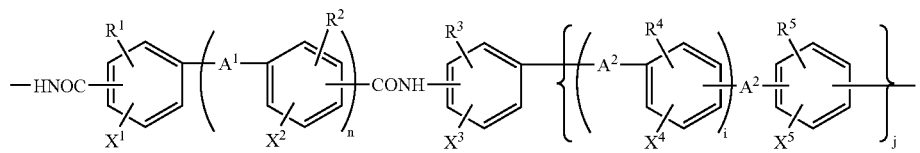

(20)

-continued
(24)
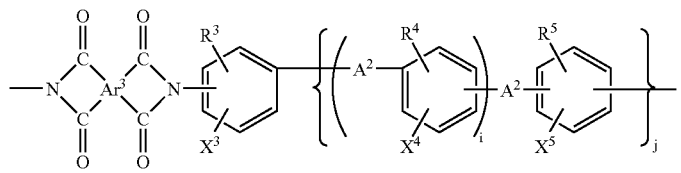
(28)
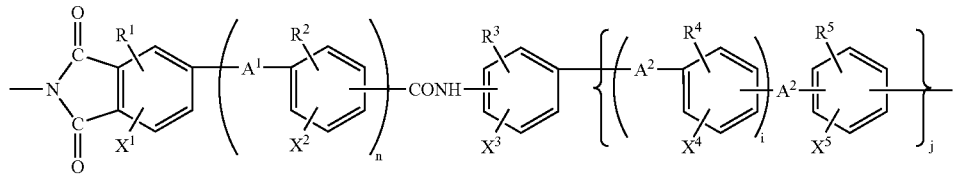
(32)
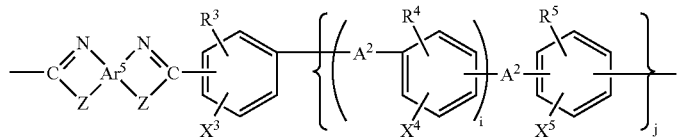
(7)
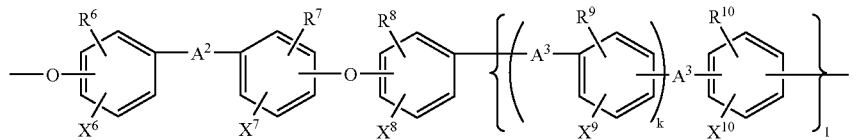
(7')
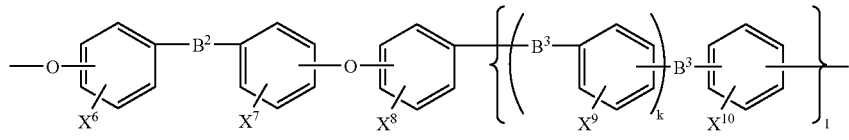
(19)
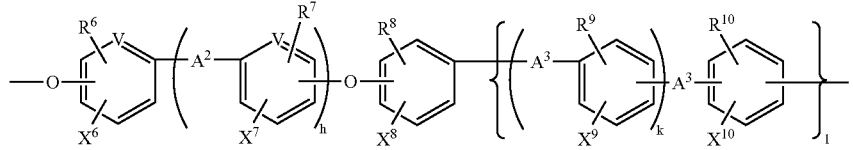
(21)
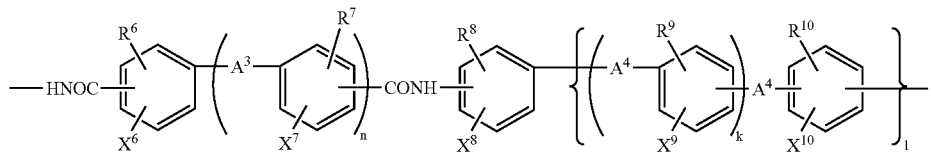
(25)
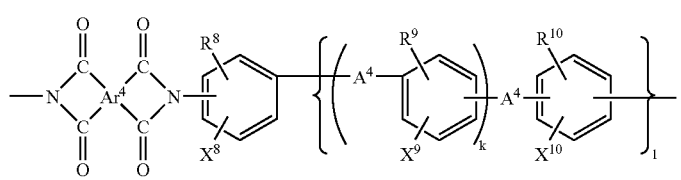

-continued

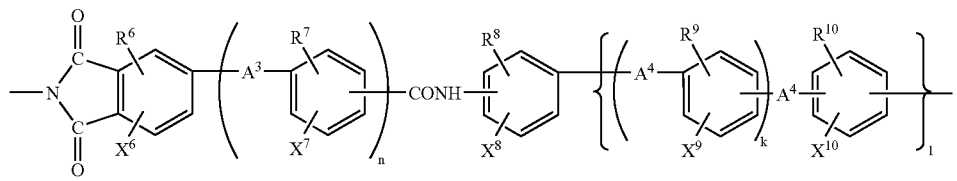

(29)

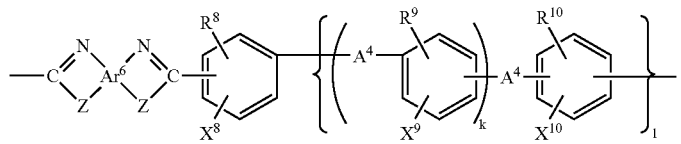

(33)

In the formulas (6), (6'), (7), (7'), (18), (19), (20), (21), (24), (25), (28), (29), (32) and (33), each of $R^1$ to $R^{10}$ independently represents H or —$C_mH_{2m+1}$ (wherein m is an integer of 1 to 10), each of $X^1$ to $X^{10}$ independently represents H or a protonic acid group, Z independently represents —NH— or —O—, each of $A^0$ to $A^4$ independently represents a direct bond, —$CH_2$—, —$C(CH_3)_2$—, —$(CF_3)_2$—, —O—, —$SO_2$— or —CO—, each of $B^1$ to $B^3$ independently represents a direct bond, —$C(CF_3)_2$—, —O—, —$SO_2$—, —CO— or a group represented by the formula: —$CH(C_xH_{x+1})\{C(C_yH_{y+1})(C_{y'}H_{y'+1})\}_\alpha\{C(C_zH_{z+1})(C_{z'}H_{z'+1})\}_\beta$—, wherein x is an integer of 0 to 9, each of y, y', z and z' is independently an integer of 0 to 8, each of α and β is independently of 0 or 1 and x+y+y'+z+z'+α+β≦9, v independently represents CH, N or C—CN, $Ar^3$ to $Ar^6$ represent same significance as described above, and each of g, h, i, j, k, l and n independently represents 0 or 1. The hydrogen atom bonded to the aromatic ring in these formulas may be substituted with —$C_mH_{2m+1}$ (wherein m is an integer of 1 to 10), a protonic acid group, Cl, F or $CF_3$.

The carbonyl group-containing resin described above contains 10 to 100% by mol of the repeating structural unit having a carbonyl group represented by the formula (6), (6'), (18), (20), (24), (28) or (32), and can further contain 0 to 90% by mol of a repeating structural unit which does not contains a carbonyl group.

The alkyl group-containing or alkylene-containing resin described above contains 10 to 100% by mol of the repeating structural unit having an alkyl group and/or alkylene group represented by the formula (7), (7'), (19), (21), (25), (29) or (33), and can further contain 0 to 90% by mol of a repeating structural unit which does not contain an alkyl group and alkylene group.

As far as either of the carbonyl group-containing resin and the alkyl or alkylene group-containing resin has a protonic acid group, the resins can be selected and used appropriately based on the description above.

Among them, especially preferred example includes a crosslinkable aromatic polyether ketone having a protonic acid group comprising 20 to 80% by weight of a carbonyl group-containing resin containing 10 to 100% by mol, based on total repeating structural units, of the repeating structural unit represented by the formula (6), and 20 to 80% by weight of an alkyl group-containing resin containing 10 to 100% by mol, based on total repeating structural units, of the repeating structural unit represented by the formula (7), wherein at least one of $R^6$ to $R^{10}$ represents —$C_mH_{2m+1}$ (wherein m is a integer of 1 to 10) and at least one of $X^1$ to $X^{10}$ represents a protonic acid group. These carbonyl group-containing resin and alkyl group-containing resin give a homogeneous resin without phase separation because they have good compatibility.

When the crosslinkable aromatic resin containing protonic acid group comprising a carbonyl group-containing resin and an alkyl or alkylene group-containing resin of the present invention may contain a resin having none of carbonyl group, an alkyl group and an alkylene group, so long as the crosslinkable aromatic resin contains 20 to 80% by weight of a carbonyl group-containing resin and 20 to 80% by weight of an alkyl or alkylene group-containing resin.

[Example 3 of the Crosslinkable Aromatic Resin Having a Protonic Acid Group]

The crosslinkable aromatic resin having a protonic acid group and containing a carbon-carbon double bond or triple bond as a crosslinkable group, is a preferred embodiment of the crosslinkable aromatic resin having a protonic acid group of the invention. Such aromatic resins include aromatic polyethers, aromatic polyamides, aromatic polyimides, aromatic polyamideimides, aromatic polyazoles, etc. Among them, aromatic polyethers and aromatic polyamides are preferred because of excellent solvent solubility in an uncrosslinked state and easy processability to form a membrane, etc. And aromatic polyethers are particularly preferred since the polyethers are not liable to hydrolysis by hot water, acids, alkaline water, alcohols, etc. That is, the crosslinkable aromatic polyethers having a protonic acid group, which contains a carbon-carbon double bond or triple bond, are particularly preferred.

In the present invention, the crosslinkable aromatic resin having a protonic acid group that has the crosslinkable group containing a carbon-carbon double bond or triple bond is roughly classified into the crosslinkable aromatic resin having a protonic acid group that has the crosslinkable group containing a carbon-carbon double bond or triple bond in a side chain and the crosslinkable aromatic resin having a protonic acid group that has the crosslinkable group at a molecular end. And particularly preferred is the crosslinkable aromatic resin having a protonic acid group that has the crosslinkable group in a side chain. The crosslinkable aromatic resin having a protonic acid group that has the crosslinkable group in the side chain can attain a high density of crosslinking, since the crosslinkable group can be present in all of the repeating structural units at maximum. On the other hand, the crosslinkable aromatic resin having a protonic acid group that has the crosslinkable group at the molecular end can control its crosslinking degree by reducing the molecular weight and increasing the amount of terminal groups. However, where the molecular weight is markedly low, mechanical strength is lowered in an uncrosslinked state, and it might be sometimes difficult to obtain an uncrosslinked membrane.

Hereinafter, specific examples of the crosslinkable aromatic resin having a protonic acid group that has a carbon-carbon double bond or triple bond are given.

[Crosslinkable Aromatic Polyether 3 Having a Protonic Acid Group]

As an example of the crosslinkable aromatic polyether having a protonic acid group and containing a carbon-carbon double bond or triple bond as the crosslinkable group, there can be cited aromatic polyethers having the crosslinkable group in the polymer side chain as described below.

Preferred is crosslinkable aromatic polyethers having a protonic acid group comprising 20 to 100% by mol of the repeating structural unit represented by the following formula (34) based on the total repeating structural units, wherein at least one of $R^{11}$ to $R^{15}$ is $-C_mH_{2m}-CH=CH-R$ or $-C_mH_{2m}-C\equiv C-R$ (wherein m is an integer of 0 to 10, and R is H or phenyl) and at least one of $X^{11}$ to $X^{15}$ is a protonic acid group.

$-C_mH_{2m}-C\equiv C-R$ (wherein m is an integer of 0 to 10, and R is H or phenyl), a protonic acid group, Cl, F or $CF_3$.]

Preferred resins as the aromatic polyether of the invention include polyetherketones or polyetheretherketones wherein $A^4$ is $-CO-$, polyether sulfones or polysulfones wherein $A^4$ is $-SO_2-$, polyphenylene oxides wherein $A^4$ is $-O-$, etc.

The aromatic polyether can be prepared by polycondensation of monomers constituting the repeating structural units. For example, the aromatic polyether can be obtained by polycondensation of an aromatic dihydroxyl compound and an aromatic dihalide compound. In this case, when a compound having the aforesaid group represented by $-C_mH_{2m}-CH=CH-R$ or $-C_mH_{2m}-C\equiv C-R$ in the side chain is used, the aromatic polyether having the group represented by $-C_mH_{2m}-CH=CH-R$ or $-C_mH_{2m}-C\equiv C-R$ in the side chain can be obtained.

[Crosslinkable Aromatic Polyether 4 Having a Protonic Acid Group]

Additional example of the crosslinkable aromatic polyether having a protonic acid group that contains a carbon-carbon double bond or triple bond as the crosslinkable group, includes aromatic polyethers having the crosslinkable group at the molecular end as described below.

Preferred is the crosslinkable aromatic polyether having a protonic acid group, which contains 20 to 100% by mol of the repeating structural unit represented by the following formula (35), based on the total repeating structural units, wherein at least one of $X^{16}$ to $X^{20}$ is a protonic acid group

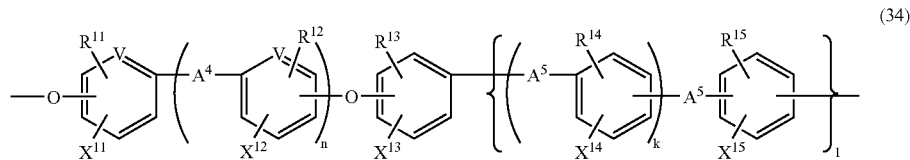
(34)

[In the formula, each of $R^{11}$ to $R^{15}$ independently represents H, $-C_mH_{2m}-CH=CH-R$ or $-C_mH_{2m}-C\equiv C-R$ (wherein m is an integer of 0 to 10, and R is H or phenyl);

and contains $-R^a-CH=CH-R^b$ or $-R^a-C\equiv C-R^b$ (wherein $R^a$ is phenylene and $R^b$ is H or phenyl) at the molecular end.

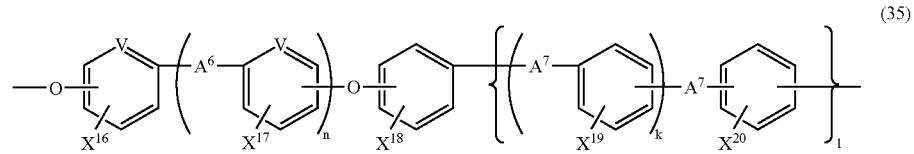
(35)

each of $X^{11}$ to $X^{15}$ independently represents H or a protonic acid group; V represents CH, C—CN or N; each of $A^4$ and $A^5$ independently represents a direct bond, $-CH_2-$, $-C(CH_3)_2-$, $-C(CF_3)_2-$, $-O-$, $-SO_2-$ or $-CO-$; each of k, l and n independently represents 0 or 1; the hydrogen atom bonded to the aromatic rings in the formula (34) may be substituted with $-C_mH_{2m}-CH=CH-R$ or

[In the formula, each of $X^{16}$ to $X^{20}$ independently represents H or a protonic acid group; V represents CH, C—CN or N; each of $A^6$ and $A^7$ independently represents a direct bond, $-CH_2-$, $-C(CH_3)_2-$, $-C(CF_3)_2-$, $-O-$, $-SO_2-$ or $-CO-$; each of k, l and n independently represents 0 or 1; the hydrogen atom bonded to the aromatic rings in the formula (35) may be substituted with a protonic acid group, Cl, F or $CF_3$.]

The aromatic polyether can be prepared by polycondensation of monomers constituting the repeating structural units. For example, the aromatic polyether can be obtained by polycondensation of an aromatic dihydroxyl compound and an aromatic dihalide compound. In this case, when Q-R$^a$—CH═CH—R$^b$ or Q-R$^a$—C≡C—R$^b$ (wherein Q is a group capable of reacting with polycondensation monomers, such as OH, a halogen, nitro, etc.; R$^a$ is phenylene and R$^b$ is H or phenyl.) is present as an end-capper, the aromatic polyether having the —R$^a$—CH═CH—R$^b$ or —R$^a$—C≡C—R$^b$ group at the molecular end can be obtained.

[Crosslinkable Aromatic Polyamide 2 Having a Protonic Acid Group]

Examples of the crosslinkable aromatic polyamide having a protonic acid group and containing a carbon-carbon double bond or triple bond as the crosslinkable group, include aromatic polyamides having the crosslinkable group at the molecular end as described below.

Preferred is the crosslinkable aromatic polyamide having a protonic acid group, which contains 20 to 100% by mol of the repeating structural unit represented by the following formula (36) based on the total repeating structural units, wherein at least one of $X^{16}$ to $X^{20}$ is a protonic acid group and contains —R$^a$—CH═CH—R$^b$ or —R$^a$—C≡C—R$^b$ (wherein R$^a$ is phenylene and R$^b$ is H or phenyl), or a group represented by the following formula (5) below at the molecular end.

—NHCO—Ar$^2$ (5)

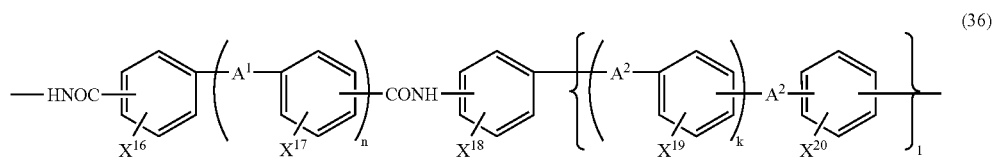

(36)

[In the formula (36), each of $X^{16}$ to $X^{20}$ independently represents H or a protonic acid group; each of $A^1$ and $A^2$ independently represents a direct bond, —CH$_2$—, —C(CH$_3$)$_2$—, —C(CF$_3$)$_2$—, —O—, —SO$_2$— or —CO—; each of k, l and n independently represents 0 or 1; the hydrogen atom bonded to the aromatic rings in the formula (36) may be substituted with a protonic acid group, Cl, F or CF$_3$.]

[In formula (5), Ar$^2$ represents,

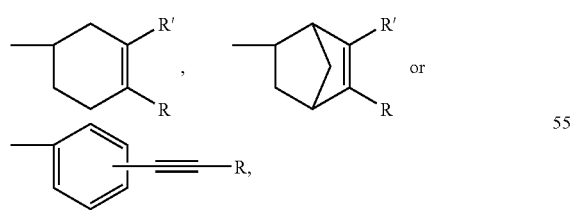

wherein R and R', which may be the same or different, represent hydrogen, methyl, ethyl or phenyl.]

The aromatic polyamide can be prepared by polycondensation of an aromatic diamino compound and an aromatic dicarboxylic acid or an aromatic dicarboxylic acid halide. In this case, when a compound represented by Q-R$^a$—CH═CH—R$^b$, Q-R$^a$—C≡C—R$^b$,

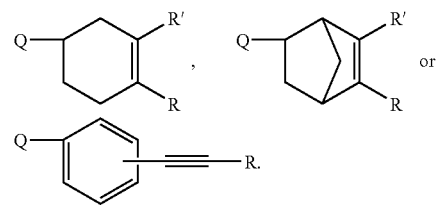

(wherein Q is a group capable of reacting with polycondensation monomers, such as NH$_2$, a carboxylic acid group, a carboxylic acid chloride group, etc.; R$^a$ is phenylene and R$^b$ is H or phenyl; and R and R' represent hydrogen, methyl, ethyl or phenyl) is present as an end-capper, the aromatic polyamide having the crosslinkable group described above at the molecular end can be obtained.

[Crosslinkable Aromatic Polyimide 2 Having a Protonic Acid Group]

Examples of the crosslinkable aromatic polyimide having a protonic acid group and containing a carbon-carbon double bond or triple bond as the crosslinkable group, include aromatic polyimides having the crosslinkable group at the molecular end as described below.

Preferred is the crosslinkable aromatic polyimides having a protonic acid group, which contains 20 to 100% by mol of the repeating structural unit represented by the following formula (37) based on the total repeating structural units, wherein at least one of $X^{16}$ to $X^{18}$ is a protonic acid group, and contains —R$^a$—CH═CH—R$^b$ or —R$^a$—C≡C—R$^b$ (wherein R$^a$ is phenylene and R$^b$ is H or phenyl), or a group represented by the following formula (4) below at the molecular end.

(4)

[In formula (4), Ar$^1$ represents,

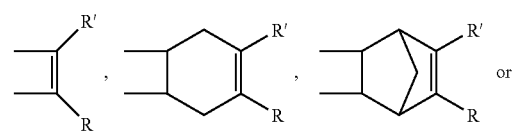

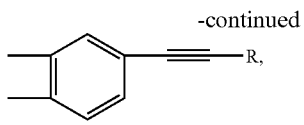

wherein R and R', which may be the same or different, each represents hydrogen, methyl, ethyl or phenyl.]

(37)

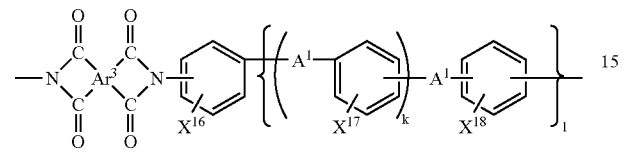

[In the formula (37), each of $X^{16}$ to $X^{18}$ independently represents H or a protonic acid group; $A^1$ independently represents a direct bond, —$CH_2$—, —$C(CH_3)_2$—, —$C(CF_3)_2$—, —O—, —$SO_2$— or —CO—; each of k and l independently represents 0 or 1; $Ar^3$ represents;

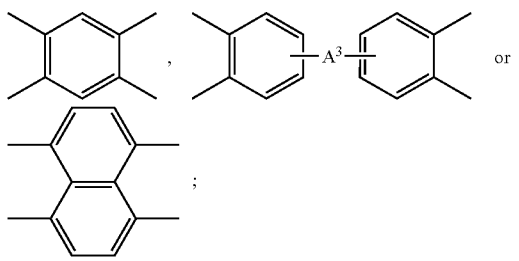

$A^3$ represents a direct bond, —$CH_2$—, —$C(CH_3)_2$—, —$C(CF_3)_2$—, —O—, —$SO_2$— or —CO—; the hydrogen atom bonded to the aromatic rings in the formula (37) may be substituted with a protonic acid group, Cl, F or $CF_3$.]

The aromatic polyimide can be prepared by reacting an aromatic diamine and an aromatic tetracarboxylic acid dianhydride in an organic solvent to form a polyamic acid precursor, and then subjecting to thermal imidation or chemical imidation. In this case, when Q-$R^a$—CH=CH—$R^b$, Q-$R^a$—C≡C—$R^b$ (wherein Q is a group capable of reacting with monomers, such as $NH_2$, a carboxylic acid group, a carboxylic acid chloride group, etc.; $R^a$ is phenylene and $R^b$ is H or phenyl), or dicarboxylic acid anhydride represented by the following formula (38) is present as an end-capper, the aromatic polyimide having the crosslinkable group described above at the molecular end can be obtained.

(38)

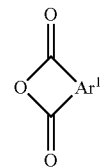

[In formula (38), $Ar^1$ represents,

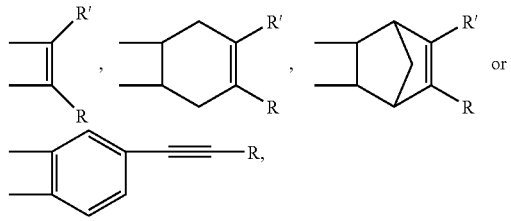

wherein R and R', which may be the same or different, represent hydrogen, methyl, ethyl or phenyl.]

[Crosslinkable Aromatic Polyamideimide 2 Having a Protonic Acid Group]

Examples of the crosslinkable aromatic polyamideimide having a protonic acid group and containing a carbon-carbon double bond or triple bond as the crosslinkable group, include aromatic polyamideimides having the crosslinkable group at the molecular end as described below.

Preferred is the crosslinkable aromatic polyamideimide having a protonic acid group, which contains 20 to 100% by mol of the repeating structural unit represented by the following formula (39) based on the total repeating structural units, wherein at least one of $X^{16}$ to $X^{19}$ is a protonic acid group, and contains —$R^a$—CH=CH—$R^b$ or —$R^a$—C≡C—$R^b$ (wherein $R^a$ is phenylene and $R^b$ is H or phenyl), or a group represented by the following formula (4) or (5) below at the molecular end.

(4)

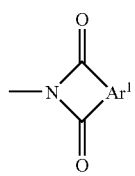

[In the formula (4), $Ar^1$ has the same significance as above.]

—NHCO—$Ar^2$     (5)

[In the formula (5), $Ar^2$ has the same significance as above.]

(39)

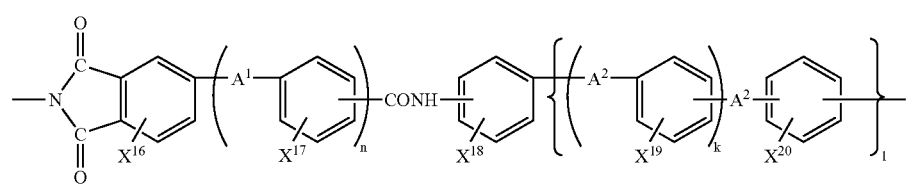

[In the formula, each of $X^{16}$ to $X^{20}$ independently represents H or a protonic acid group; each of $A^1$ and $A^2$ independently represents a direct bond, —$CH_2$—, —$C(CH_3)_2$—, —$C(CF_3)_2$—, —O—, —$SO_2$— or —CO—; each of k, l and n independently represents 0 or 1; the hydrogen atom bonded to the aromatic rings in the formula (39) may be substituted with a protonic acid group, Cl, F or $CF_3$.]

The aromatic polyamideimide can be prepared by reacting an aromatic diamine and an aromatic tricarboxylic acid monochloride in an organic solvent to form a polyamic acid precursor, and then subjecting to thermal imidation or chemical imidation. In this case, when a compound represented by Q-$R^a$—CH=CH—$R^b$, Q-$R^a$—C≡C—$R^b$,

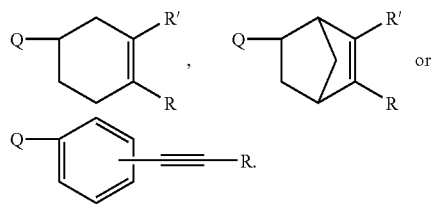

(wherein Q is a group capable of reacting with polycondensation monomers, such as $NH_2$, a carboxylic acid group, a carboxylic acid chloride group, etc.; $R^a$ is phenylene and $R^b$ is H or phenyl; and R and R' represent hydrogen, methyl, ethyl or phenyl) or dicarboxylic acid anhydride represented by the following formula (38) is present as an end-capper, the aromatic polyamideimide having the crosslinkable group described above at the molecular end can be obtained.

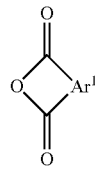

(38)

[In the formula (38), $Ar^1$ has the same significance as above.]

[Crosslinkable Aromatic Polyazole 2 Having a Protonic Acid Group]

Examples of the crosslinkable aromatic polyazole having a protonic acid group and containing a carbon-carbon double bond or triple bond as the crosslinkable group, include aromatic polyazoles having the crosslinkable group at the molecular end as described below.

Preferred is the crosslinkable aromatic polyazole having a protonic acid group, which contains 20 to 100% by mol of the repeating structural unit represented by the following formula (40) based on the total repeating structural units, wherein at least one of $X^{16}$ to $X^{18}$ is a protonic acid group and contains —$R^a$—CH=CH—$R^b$ or —$R^a$—C≡C—$R^b$ (wherein $R^a$ is phenylene and $R^b$ is H or phenyl) at the molecular end.

(40)

[In the formula (40), each of $X^{16}$ to $X^{18}$ independently represents H or a protonic acid group; Z independently represents —NH— or —O—; $Ar^5$ represents;

$A^1$ and $A^3$ independently represents a direct bond, —$CH_2$—, —$C(CH_3)_2$—, —$C(CF_3)_2$—, —O—, —$SO_2$— or —CO—; each of k and l independently represents 0 or 1; the hydrogen atom bonded to the aromatic rings in the formula (40) may be substituted with a protonic acid group, Cl, F or $CF_3$.]

Polybenzimidazoles wherein -Z- is —NH— can be prepared by reacting an aromatic tetraamine and an aromatic dicarboxylic acid ester by known methods. Polybenzoxazoles wherein -Z- is —O— can be produced by reacting a diaminohydroxyl compound and an aromatic dicarboxylic acid by known methods. In this case, when a compound represented by the formula: Q-$R^a$—CH=CH—$R^b$, Q-$R^a$—C≡C—$R^b$, (wherein Q is a group capable of reacting with condensation monomers, such as $NH_2$, a carboxylic acid group, a carboxylic acid chloride group, carboxylic acid ester group, etc.; $R^a$ is phenylene and $R^b$ is H or phenyl; R and R', which may be the same or different, represent hydrogen, methyl, ethyl or phenyl) is present as an end-capper, the aromatic polyazole having the crosslinkable group described above at the molecular end can be obtained.

[Example of Method for Preparing the Aromatic Resins]

As one of examples of a method for preparing the aromatic resins of the present invention, there can be cited the method for polycondensation of monomers described above and an end-capper. As the condition of the polycondensation, it can be selected appropriately based on known methods.

In selecting of these conditions, methods described in published references, such as, "New Polymer Experiment 3, Synthesis and Reaction of Polymers (2), P. 155-175" [Kyoritsu Publishing Co. (1996)], "Experimental Chemistry Course 28, Polymer chemistry, P. 326-332 [Maruzen Co., Ltd. (1992)]", "New Experimental Chemistry Course 19, Polymer Chemistry (I), P. 137-138 [Maruzen Co., Ltd. (1978)]", etc. can be referred.

By purifying thus obtained aromatic resins with water, aqueous hydrochloric acid solution, organic solvent, etc., unreacted monomers, oligomers, acids and salts are removed from the resin.

[Specific Examples of Monomers]

Specific examples of monomers and end-cappers usable for preparation of crosslinkable aromatic resin having a protonic acid of the invention described above by polycondensation are given below.

[Examples of Aromatic Dihydroxy Compound]

Examples of an aromatic dihydroxyl compounds that can be used for preparing the aromatic resin having a protonic acid group of the invention described above by polycondensation are shown below.

As an aromatic dihydroxy compound, hydroquinone, resorcin, catechol, 4,4'-dihydroxy biphenyl, 4,4'-dihydroxydiphenyl sulfide, 4,4'-dihydroxydiphenyl ether, 4,4'-dihydroxydiphenyl sulfone, 4,4'-dihydroxy benzophenone, 2,2-bis(4-hydroxyphenyl) propane, 1,1,1,3,3,3-hexafluoro-2,2-bis(4-hydroxyphenyl) propane, 1,4-bis(4-hydroxyphenyl) benzene, α,α'-bis(4-hydroxyphenyl)-1,4-dimethyl benzene, α,α'-bis(4-hydroxyphenyl)-1,4-diisopropyl benzene, α,α'-bis(4-hydroxyphenyl)-1,3-diisopropyl benzene, 1,4-bis(4-hydroxy benzoyl) benzene, 3,3-difluoro-4,4'-dihydroxy biphenyl, 9,9-bis(4-hydroxyphenyl) fluorene can be cited.

As an aromatic dihydroxy compound containing an alkyl group, 2-methyl hydroquinone, 2-ethyl hydroquinone, 2-isopropyl hydroquinone, 2-octyl hydroquinone, 2,3-dimethyl hydroquinone, 2,3-diethyl hydroquinone, 2,5-dimethyl hydroquinone, 2,5-diethyl hydroquinone, 2,5-diisopropyl hydroquinone, 2,6-dimethyl hydroquinone, 2,3,5-trimethyl hydroquinone, 2,3,5,6-tetramethyl hydroquinone, 3,3'-dimethyl-4,4'-dihydroxy biphenyl, 3,3',5,5'-tetramethyl-4,4'-dihydroxy biphenyl, 3,3'-dimethyl-4,4'-dihydroxydiphenyl methane, 3,3',5,5-tetramethyl-4,4'-dihydroxydiphenyl methane, 3,3',5,5'-tetraethyl-4,4'-dihydroxydiphenyl methane, 3,3'-dimethyl-4,4'-dihydroxydiphenyl ether, 3,3',5,5'-tetramethyl-4,4'-dihydroxydiphenyl ether, 3,3'-dimethyl-4,4'-dihydroxydiphenyl sulfide, 3,3',5,5'-tetramethyl-4,4'-dihydroxydiphenyl sulfide, 3,3'-dimethyl-4,4'-dihydroxydiphenyl sulfone, 3,3',5,5'-tetramethyl-4,4'-dihydroxydiphenyl sulfone, 2,2-bis(3-methyl-4-hydroxyphenyl)propane, 2,2-bis(3-ethyl-4-hydroxyphenyl) propane, 2,2-bis(3,5-dimethyl-4-hydroxy phenyl) propane, α,α'-bis(3-methyl-4-hydroxyphenyl)-1,4-diisopropyl benzene, α,α'-bis(3,5-dimethyl-4-hydroxyphenyl)-1,4-diisopropyl benzene, α,α'-bis(3-methyl-4-hydroxy phenyl)-1,3-diisopropyl benzene, α,α'-bis(3,5-dimethyl-4-hydroxy phenyl)-1,3-diisopropyl benzene, 9,9-bis(3-methyl-4-hydroxyphenyl) fluorene can be cited.

As an aromatic dihydroxy compound containing an alkylene group, 4,4-dihydroxydiphenyl methane, 3,3'-difluoro-4,4'-dihydroxydiphenyl methane, 3,3'-tetrafluoro-4,4'-dihydroxydiphenyl methane, 1,1-bis(4-hydroxydiphenyl)ethane, 2-methyl-1,1-bis(4-hydroxydiphenyl) propane, 1,1-bis(4-hydroxydiphenyl) butane, 1,2-bis(4-hydroxydiphenyl) ethane, 3,4-bis(4-hydroxydiphenyl) hexane, 2-methyl-1,3-bis(4-hydroxydiphenyl) pentane, 3-ethyl-2,4-bis(4-hydroxydiphenyl) hexane, α,α'-bis(4-hydroxy phenyl)-1,4-dimethyl benzene, α,α'-bis(3-fluoro-4-hydroxy phenyl)-1,4-dimethyl benzene and α,α'-bis(3,5-difluoro-4-hydroxyphenyl)-1,4-dimethyl benzene can be cited.

As an aromatic dihydroxy compound containing a crosslinkable group, 2-allyl hydroquinone, 4,4'-dihydroxy-3, 3'-diallyl biphenyl, bis(4-hydroxy-3-allylphenyl) methane, 2,2-bis(4-hydroxy-3-allylphenyl) propane can be cited.

As a dihydroxy compound having a protonic acid group, sulfonated compound and alkyl sulfonated compound of the above aromatic dihydroxy compound and an aromatic dihydroxy compound containing an alkyl group can be cited. In addition, the sulfonated compound and the alkyl sulfonated compound include their salt of alkali metal such as Na, K, etc. Sulfonated compounds can be obtained by a method of sulfonating an aromatic dihydroxy compound with a known sulfonating agent such as concentrated sulfuric acid (Macromol. Rapid. Commun., 19, 135 (1998)), etc. Alkyl sulfonated compounds can be obtained by a method of making an aromatic dihydroxy compound react with formaldehyde and sulfurous acid (J. Amer. Chem. Soc., 92, 861 (1970)), etc.

As an aromatic dihydroxy compound having a protonic acid group, an aromatic dihydroxy compound having carboxylic acid group such as 2,5-dihydroxy benzoic acid, 2,5-dihydroxy terephthalic acid, 5,5'-methylene disalicylate, 5,5'-thiodisalicylate; and an alkali metal salt thereof, or an aromatic dihydroxy compound having phosphoric acid group such as 2,5-dihydroxyphenyl phosphonic acid and an alkali metal salt thereof can be cited in addition to a sulfonated compound and an alkyl sulfonated compound of the above aromatic dihydroxy compound.

[Examples of Aromatic Dihalide Compound]

Examples of the aromatic dihalide compound that can be used when the aromatic resin having a protonic acid group of the present invention is prepared by polycondensation are shown below.

As an aromatic dihalide compound, 4,4'-difluoro benzophenone, 3,3'-difluoro benzophenone, 4,4'-dichloro benzophenone, 3,3'-dichloro benzophenone, 4,4'-difluoro diphenyl sulfone, 4,4'-dichloro diphenyl sulfone, 1,4-difluoro benzene, 1,3-difluoro benzene, 4,4'-difluoro biphenyl, 3,3'-dibromo-4,4'-difluoro biphenyl, 4,4'-difluoro diphenyl methane, 4,4'-dichloro diphenyl methane, 4,4'-difluoro diphenyl ether, 2,2-bis(4-fluoro phenyl) propane, 2,2-bis(4-chlorophenyl) propane, α,α'-bis(4-fluoro phenyl)-1,4-diisopropyl benzene, 2,5-difluoro benzophenone, 2,5-dichloro-4-pyridylphenyl ketone, 2,5-difluorobenzonitrile, etc. can be cited.

As an aromatic dihalide compound containing an alkyl group, 3,3'-dimethyl-4,4'-difluoro benzophenone, 3,3'-diethyl-4,4'-difluoro benzophenone, 3,3',5,5'-tetramethyl-4,4'-difluoro benzophenone, 3,3'-dimethyl-4,4'-dichloro benzophenone, 3,3',4,4'-tetramethyl-5,5'-dichloro benzophenone, 3,3'-dimethyl-4,4'-difluoro diphenyl sulfone, 3,3'-dimethyl-4,4'-dichloro diphenyl sulfone, 2,5-difluoro toluene, 2,5-difluoro ethyl benzene, 2,5-difluoro-p-xylene can be cited.

As a dihydroxy compound containing a protonic acid group, sulfonated compound and alkyl sulfonated compound of the aromatic dihydroxy compound and the aromatic dihydroxy compound containing an alkyl group described above can be cited. An aromatic dihalide compound containing sulfone group can be obtained by a method for sulfonating the aromatic dihalide compound or the dihalide compound containing an alkyl group described above with a known sulfonating agent such as fuming sulfuric acid (Macromol. Chem. Phys., 199, 1421 (1998)). In addition, sulfonated compound and alkyl sulfonated compound include their salt of alkali metals such as Na, K, etc.

As an aromatic dihalide compound containing a protonic acid group, an aromatic dihalide compound having carboxylic acid group such as 2,5-dichloro benzoic acid, 2,5-difluoro benzoic acid, 5,5'-carbonyl bis(2-fluoro benzoic acid), 5,5'-sulfonyl bis(2-fluoro benzoic acid) and an alkali metal salt thereof, and an aromatic dihalide compound having phosphoric acid group such as 2,5-dichloro phenyl phosphonic acid, 5,5'-carbonyl bis(2-fluoro benzene phosphonic acid)

and an alkali metal salt thereof can be cited in addition to a sulfonated compound and an alkyl sulfonated compound of the above aromatic dihalide compound.

[Examples of Aromatic Diamine Compound]

As examples of an aromatic diamine which can be used when the above aromatic resin having a protonic acid group of the present invention is prepared by polycondensation, 1,4-diamino benzene, 4,4'-diaminobiphenyl, 4,4'-diaminodiphenyl ether, 4,4'-diamino diphenyl methane, 4,4'-diamino diphenyl propane, 4,4'-diamino diphenyl sulfone, 4,4'-diamino diphenyl sulfide, 9,9-bis(4-aminophenyl) fluorene, 1,4-bis(4-aminophenoxy) benzene, 4,4'-diamino benzophenone, 3,3'-diamino benzophenone, 3,5-diamino benzophenone, 2-methyl-1,4-diamino benzene, 2,5-dimethyl-1,4-diamino benzene, 3,3'-dimethyl-4,4'-diamino biphenyl, 3,3'-dimethyl-4,4'-diamino diphenyl ether, 2,2'-dimethyl-4,4'-diamino diphenyl methane, 2,2'-dimethyl-4,4'-diamino diphenyl propane, 2,2'-dimethyl-4,4'-diamino diphenyl sulfone, 3,3'-dimethyl-4,4'-diamino diphenyl sulfone, 3,3',5,5'-tetramethyl-4,4'-diamino diphenyl sulfone can be cited.

As an aromatic diamine having a protonic acid group, a sulfonated compound and an alkyl sulfonated compound of the above aromatic diamine can be cited. In addition, the sulfonated compound and alkyl sulfonated compound include their salt of alkali metals such as Na, K, etc. An aromatic diamine having sulfonic acid group can be obtained by sulfonating the above aromatic diamine with a known sulfonating agent such as fuming sulfuric acid (Macromolecules, 35, 6707(2002)).

As an aromatic diamine having a protonic acid group, an aromatic dihydroxy compound having carboxylic acid group such as 3,5-diamino benzoic acid the alkali metal salt thereof; and an aromatic dihydroxy compound having phosphate group such as 3,5-diamino phenyl phosphonic acid and an alkali metal salt thereof can be cited in addition to a sulfonated compound and an alkyl sulfonated compound of the above aromatic diamine.

[Examples of Aromatic Dicarboxylic Acid Chloride]

As examples of an aromatic dicarboxylic acid chloride that can be used when the aromatic resin having a protonic acid group of the present invention is prepared by polycondensation, terephthalic acid chloride, isophthalic acid chloride, 3,3'-biphenyl dicarboxylic acid chloride, 3,3'-diphenyl ether dicarboxylic acid chloride, 3,3'-diphenyl sulfide dicarboxylic acid chloride, 3,3'-diphenyl sulfone dicarboxylic acid chloride, 3,3'-diphenyl methane dicarboxylic acid chloride, 2-methyl-1,4-benzene dicarboxylic acid chloride, 5-methyl-1,3-benzene dicarboxylic acid chloride, 2,5-dimethyl-1,4-benzene dicarboxylic acid chloride, 4,6'-dimethyl-1,3-benzene dicarboxylic acid chloride, 3,3'-dimethyl-4,4'-biphenyl dicarboxylic acid chloride, 2,2'-dimethyl-4,4'-biphenyl dicarboxylic acid chloride, 3,3',5,5'-tetramethyl-4,4'-biphenyl dicarboxylic acid chloride can be cited.

[Examples of Aromatic Tetracarboxylic Acid Dianhydride]

As examples of aromatic tetracarboxylic acid dianhydride that can be used when the aromatic resin having a protonic acid group of the present invention is prepared by polycondensation, pyromellitic dianhydride, 3,3',4,4'-biphenyl tetracarboxylic acid dianhydride, 2,2',3,3'-biphenyl tetracarboxylic acid dianhydride, bis(3,4-dicarboxyphenyl) ether dianhydride, bis(3,4-dicarboxyphenyl) sulfide dianhydride, bis(3,4-dicarboxyphenyl) sulfone dianhydride, bis(3,4-dicarboxyphenyl) methane dianhydride, bis(3,4-dicarboxyphenyl) propane dianhydride, 1,1,1,3,3,3-hexafluoro-2,2-bis(3,4-dicarboxyphenyl) propane dianhydride, 1,4,5,8-naphthalene tetracarboxylic acid dianhydride, 3,3',4,4'-benzophenone tetracarboxylic acid dianhydride, 3-methyl-1,2,4,5-benzene tetracarboxylic acid dianhydride, bis(5-methyl-3,4-dicarboxyphenyl) ether dianhydride, bis(5-methyl-3,4-dicarboxyphenyl) sulfone dianhydride, bis(5-methyl-3,4-dicarboxyphenyl) methane dianhydride, 2,3,6,7-tetramethyl-1,4,5,8-naphthalene tetracarboxylic acid dianhydride can be cited.

[Examples of Aromatic Tricarboxylic Acid Monochloride]

As an aromatic tricarboxylic acid monochloride which can be used when the aromatic resin having a protonic acid group of the present invention is prepared by polycondensation, 1,2,4-benzene trimellitic acid chloride anhydride, 3',4,4'-biphenyl tricarboxylic acid monochloride anhydride, 3',4,4'-diphenyl methane tricarboxylic acid chloride anhydride, 3',4,4'-diphenyl isopropane tricarboxylic acid chloride anhydride, 5-methyl-1,2,4-benzene tricarboxylic acid monochloride anhydride, 3-methyl-3',4,4'-biphenyl tricarboxylic acid monochloride anhydride, 3-methyl-3',4,4'-diphenyl methane tricarboxylic acid chloride anhydride, 3-methyl-3',4,4'-diphenyl sulfone tricarboxylic acid chloride anhydride, 3,4,4'-benzophenone tricarboxylic acid monochloride anhydride can be cited.

[Examples of Aromatic Tetraamine]

As examples of an aromatic tetraamine which can be used when the aromatic resin having a protonic acid group of the present invention is prepared by polycondensation, 1,2,4,5-tetraaminobenzene, 3,3',4,4'-tetraaminobiphenyl, 3,3',4,4'-tetraaminodiphenyl ether, 3,3',4,4'-tetraaminobenzophenone can be cited.

As aromatic tetraamine having a protonic acid group, sulfonated compound of the above aromatic tetraamine can be cited. In addition, the aromatic tetraamine sulfonated compound includes a salt of alkali metal such as Na, K, etc. The aromatic tetraamine sulfonated compound can be obtained by sulfonating the above aromatic tetraamine with a known sulfonating agent such as fuming sulphuric acid.

[Examples of Aromatic Dicarboxylic Acid]

As examples of an aromatic dicarboxylic acid, terephthalic acid, tetrachloro terephthalic acid, isophthalic acid, 4,4'-dicarboxy biphenyl, 4,4'-dicarboxy diphenyl ether, 4,4'-dicarboxy diphenyl sulfone, 4,4'-dicarboxy benzophenone, bis(4-carboxyphenyl) methane, 2,2-bis(4-carboxyphenyl) propane, hexafluoro-2,2-bis(4-carboxyphenyl) propane, 2-methyl-1,4-benzene dicarboxylic acid, 5-methyl-1,3-benzene dicarboxylic acid, 2,5-dimethyl-1,4-benzene dicarboxylic acid, 3,3'-dimethyl-4,4'-biphenyl dicarboxylic acid can be cited.

As aromatic dicarboxylic acid having a protonic acid group, an aromatic dicarboxylic acid having sulfonic acid group such as 2,5-dicarboxy benzene sulfonic acid, 3,5-dicarboxy benzene sulfonic acid; aromatic dicarboxylic acid having phosphonic acid group such as 2,5-dicarboxyphenyl phosphonic acid and the alkali metal salt thereof can be cited.

[Examples of Aromatic Dicarboxylic Acid Ester]

As examples of an aromatic dicarboxylic acid ester which can be used when the aromatic resin having a proton acid group of the present invention is prepared by polycondensation, diphenyl terephthalate, diphenyl isophthalate, diphenyl 4,4'-diphenyl ether dicarboxylate, diphenyl 4,4'-diphenyl sulfone dicarboxylate, diphenyl 4,4'-benzophenone dicarboxylate, diphenyl 2-methyl-1,4-benzene dicarboxylate, diphenyl 5-methyl-1,3-benzene dicarboxylate, diphenyl 2,5-dimethyl-1,4-benzene dicarboxylate, diphenyl 3,3'-dimethyl-4,4'-biphenyl dicarboxylate, diphenyl 3,3'-dimethyl-4,4'-diphenylether dicarboxylate, diphenyl 2,2'-dimethyl-4,4'-diphenyl sulfonedicarboxylate can be cited.

[Examples of Aromatic Diamino Dihydroxy Compound]

As examples of an aromatic diamino dihydroxy compound, 2,5-diamino-1,4-dihydroxy benzene, 4,6-diamino-1,3-dihydroxy benzene, 3,3'-diamino-4,4'-dihydroxy biphenyl, 4,4'-diamino-3,3'-dihydroxy biphenyl can be cited.

As an aromatic diamino dihydroxy compound having a protonic acid group, a sulfonated compound of the above aromatic diamino dihydroxy compound can be cited. In addition, the sulfonated compound includes a salt of alkali metal such as Na, K, etc.

Aromatic diamino dihydroxy having sulfonic acid group can be obtained by sulfonating the above aromatic diamino dihydroxy compound with a known sulfonating agent such as fuming sulphuric acid.

[Examples of End-Capper Having a Crosslinkable Group]

As an end-capper having a crosslinkable group described above, monohalide compounds, monohydroxy compounds, monoamine compounds, monocarboxylic acid chloride compounds, monocarboxylic acid ester compounds, dicarboxylic anhydride compounds, etc. can be cited.

As examples of monohalide compounds, 3-fluoro propene, 3-fluoro-1-propyne, 4-fluoro-1-butene, 4-fluoro-1-butyne, 3-fluoro cyclohexene, 3-fluoro styrene, 4-fluoro ethynyl benzene, α-fluoro-4-ethynyl toluene, 4-fluoro stilbene, 4-(phenyl ethynyl) fluoro benzene, 3-(phenyl ethynyl) fluoro benzene, 4-fluoro-4'-phenylethynyl-benzophenone, 4-fluoro-4'-phenylethynyl diphenyl sulfone, 4-chloro-1-butene, 4-chloro-1-butyne, 3-chlorocyclohexene, 4-chlorostyrene, 3-chlorostyrene, 3-chloroethynyl benzene, 3-(phenyl ethynyl) chlorobenzene, 4-chloro-4'-(phenyl ethynyl) benzophenone, etc. can be cited.

As examples of monohydroxy compounds, 3-hydroxy-1-propyne, 4-hydroxy-1-butene, 4-hydroxy-1-butyne, 4-hydroxy styrene, 3-hydroxy styrene, 2-allyl phenol, 4-hydroxy ethynyl benzene, 3-ethynyl phenol, 4-hydroxy stilbene, 4-(phenyl ethynyl) phenol, 3-(phenyl ethynyl) phenol, 4-hydroxy-4'-phenylethynyl benzophenone, 4-hydroxy-4'-phenylethynyl-diphenyl sulfone, 4-phenylethynyl phthalimide phenol, etc. can be cited.

As examples of monocarboxylic acid chloride compounds, 4-carboxy-1-cyclohexene chloride, 1-methyl-4-carboxy-1-cyclohexene chloride, 2-carboxy-5-norbornene chloride, 5-methyl-2-carboxy-5-norbornene chloride, 4-ethynyl benzoic acid chloride, 4-phenylethynyl benzoic acid chloride, 3-vinyl benzoic acid chloride, 4-carboxy stilbene chloride, etc. can be cited.

As examples of monoamine compounds, 3-ethynyl aniline, 3-vinyl aniline, etc. are cited.

As examples of ester compounds, 4-(carboxyphenyl)-1-cyclohexene, 1-methyl-4-(carboxyphenyl)-1-cyclohexene, 2-(carboxyphenyl)-5-norbornene, 5-methyl-2-(carboxyphenyl)-5-norbornene, phenyl 2-ethynyl benzoate, phenyl 3-ethynyl benzoate, phenyl 4-ethynyl benzoate, phenyl 3-(phenyl ethynyl) benzoate, phenyl 4-(phenyl ethynyl) benzoate, phenyl 3-vinyl benzoate, 4-(carboxyphenyl) stilbene, etc. can be cited.

As examples of dicarboxylic acid anhydrides having a crosslinkable group, maleic anhydride, 2-methyl maleic anhydride, 2-fluoro maleic anhydride, 2,3-dimethyl maleic anhydride, ethyl maleic anhydride, 2-phenyl maleic anhydride, 5-norbornene-2,3-dicarboxylic acid anhydride, 5-methyl-2,3-dicarboxy-5-norbornene anhydride, 5,6-dimethyl-2,3-dicarboxy-5-norbornene anhydride, cis-1,2,3,4-tetrahydro phthalic anhydride, 3-methyl-cis-1,2,3,6-tetrahydro phthalic anhydride, 4,5-dimethyl-cis-1,2,3,6-tetrahydro phthalic anhydride, 1-phenyl-2-(3,4-dicarboxy phenyl) acetylene anhydride, 3-ethynyl phthalic anhydride, 3-vinyl phthalic anhydride, etc. can be cited.

[Examples of Method for Introducing a Protonic Acid Group into Aromatic Resin]

Among the aromatic resins of the invention, the aromatic resins having a protonic acid group can be obtained by a method for polycondensation using monomers containing a protonic acid group, besides the aromatic resins can be obtained by a method for introducing a protonic acid group into an aromatic resin not containing a protonic acid group. As the method for introducing the protonic acid group into the aromatic resin, known methods such as sulfonation and alkyl sulfonation are appropriately used.

As specific examples of a method for sulfonating the resin, a method for sulfonating with a known sulfonating agent such as concentrated sulfuric acid (Japanese Laid-open Patent Application SHO 57-25328), fuming sulfuric acid (Japanese Publication of Translation of PCT HEI 11-502245), chlorosulfonic acid (Journal of Applied Polymer Science, 70, 477 (1998)) and methane sulfonic acid (Macromolecules, 27, 6267 (1994)) can be cited. As a method for alkyl sulfonating the resin, a method using sulfone compounds (J. Amer. Chem. Soc., 76, 5357 (1954)); a method for substituting hydrogen of aromatic ring of a resin with lithium, and exchanging it to a halogenoalkyl group with dihalogenoalkane, and then converting it into sulfoalkyl group; a method for introducing halogenobutyl group with tetramethylene halogenium ion, and then converting halogen into sulfonate group, etc. can be cited.

By purifying thus obtained aromatic resin having a protonic acid group with water, aqueous hydrochloric acid solution, an organic solvent, etc., acids and salts can be removed from the resin.

Examples of resins usable for obtaining the aromatic resin having a proton acid group of the present invention described above, include aromatic resins obtained by production methods exemplified above, poly(oxy-2-methyl-1,4-phenyleneoxy-1,4-phenylene carbonyl-1,4-phenylene), poly(oxy-2-ethyl-1,4-phenyleneoxy-1,4-phenylene carbonyl-1,4-phenylene), poly(oxy-2-octyl-1,4-phenyleneoxy-1,4-phenylene carbonyl-1,4-phenylene), poly(oxy-2,5-dimethyl-1,4-phenyleneoxy-1,4-phenylene carbonyl-1,4-phenylene), poly(oxy-2,3,6-trimethyl-1,4-phenyleneoxy-1,4-phenylene carbonyl-1,4-phenylene), poly(oxy-2,3,5,6-tetramethyl-1,4-phenyleneoxy-1,4-phenylene carbonyl-1,4-phenylene), poly(oxy-3,3'-dimethyl-4,4'-biphenyleneoxy-1,4-phenylene carbonyl-1,4-phenylene), poly(oxy-2,6-dimethyl-1,4-phenylene methylene-3,5-dimethyl-1,4-oxy-1,4-phenylene carbonyl-1,4-phenylene), poly(oxy-2-methyl-1,4-phenylene-2,2-propylidene-1,4-phenyleneoxy-1,4-phenylene carbonyl-1,4-phenylene), poly(oxy-2,6-dimethyl-1,4-phenylene-2,2-propylidene-3,5-dimethyl-1,4-phenyleneoxy-1,4-phenylene carbonyl-1,4-phenylene), poly(oxy-1,4-phenylene-1,4-phenyleneoxy-1,4-phenylene carbonyl-1,4-phenylene), poly(oxy-2-methyl-1,4-phenylene sulfonyl-3-methyl-1,4-phenylene), poly(oxy-2,6-dimethyl-1,4-phenylene sulfonyl-3,5-dimethyl-1,4-phenylene), poly(oxy-1,4-phenylene sulfonyl-1,4-phenyleneoxy-2,5-dimethyl-1,4-phenylene), poly(oxy-1,4-phenylene sulfonyl-1,4-phenyleneoxy-1,4-tetramethyl phenylene), poly(oxy-2-methyl-1,4-phenylene sulfonyl-3-methyl-1,4-phenyleneoxy-1,4-phenylene sulfonyl-1,4-phenyleneoxy-5-methyl-1,3-phenylene), poly(oxy-1,4- phenylene sulfonyl-1,4-phenyleneoxy-2,6-dimethyl-1,4-phenylene-3,5-dimethyl-1,4-phenylene), poly(oxy-1,4-phenylene sulfonyl-1,4-phenyleneoxy-2,6-dimethyl-1,4-phenylene methylene-3,5-dimethyl-1,4-phenylene), poly(oxy-1,4-phenylene sulfonyl-1,4-phenyleneoxy-2,6-dimethyl-1,4-phenylene-2,2-isopropylidene-3,5-dimethyl-1,4-phenylene), poly(oxy-1,4-phenylene methylene-1,4-phenyleneoxy-1,4-phenylenecarbonyl-1,4-phenylene) and poly(oxy-1,4-phenylene methylene-1,4-phenylene methylene-1,4-phenyleneoxy-1,4-phenylenecarbonyl-1,4-phenylene).

[Molecular Weight of the Crosslinkable Aromatic Resin Having a Protonic Acid Group]

The molecular weight of the aromatic resin having a protonic acid group of the invention is not particularly limited. In order to obtain a good uncrosslinked membrane, its molecular weight is desirously in a range of 0.1 to 5.0 dl/g, preferably 0.2 to 3.0 dl/g, more preferably 0.3 to 1.5 dl/g in terms of reduced viscosity ($\eta$inh) (when measured at 35° C. in a solvent at polymer or precursor concentration of 0.5 g/dl). When the molecular weight is too low, mechanical properties of the resulting membrane in an uncrosslinked state are poor, which might generate cracking, etc. in forming membranes or handling. Even when the molecular weight is low, however, crosslinked membranes having excellent mechanical properties can be obtained when crosslinking are performed at the time of formation. When the resin has the crosslinkable group at its ends, a lower molecular weight is advantageous to give a membrane of higher degree of crosslinking. When the molecular weight is too high, problems might occur in varnish preparation or use that the resin is sparingly soluble in a solvent, a viscosity of the varnish obtained becomes extremely high, etc. The molecular weight of the crosslinkable aromatic resin having a protonic acid group of the invention can be controlled by adjusting the molar ratio of monomers used or the amount of end-capper during the reaction.

[Varnish Obtained by Using the Crosslinkable Aromatic Resin Having a Protonic Acid Group]

The crosslinkable aromatic resin having a protonic acid group of the invention or its precursor (e.g., polyamic acids, etc.) has excellent solubility in solvent, since the resin is a linear polymer in an uncrosslinked state. Thus, the resin can be rendered in the form of a varnish wherein the resin is dissolved in a solvent. Herein, the solvent is not particularly limited and can be freely selected. Examples of the solvent include water, alcohols such as methanol, ethanol, 1-proanol, 2-propanol and butanol; hydrocarbons such as toluene and xylene; halogenated hydrocarbons such as methyl chloride and methylene chloride; ethers such as dichloroethyl ether, 1,4-dioxan and tetrahydrofuran; aliphatic acid esters such as methyl acetate and ethyl acetate; ketones such as acetone and methyl ethyl ketone; and further include non-protonic polar solvents such as N,N-dimethylacetamide, N-methyl-2-pyrrolidone, dimethyl sulfoxide and dimethyl carbonate. These solvent can be employed singly or in combination. Among them, lower alcohols, tetrahydrofuran, dimethyl carbonate, etc. are preferred because they have a low boiling point permitting the solvent to evaporate off rapidly and they are soluble in water. It is more preferred to use a mixture of these solvents and water. The resin content in the varnish may be chosen depending on how to use, and preferably from not less than 1 wt % to not more than 80 wt %. In addition to the resin, the varnish may further contain, e.g., fluorinated ion conductive resins, fluorinated electrode materials, or the like. In this case, the varnish may be either a complete solution in which all are dissolved or a suspension in which a part of them is not dissolved.

[Polymer Membrane Obtained Using the Crosslinkable Aromatic Resin Having a Protonic Acid Group]

The polymer membrane of the invention is a polymer membrane obtained by using the crosslinkable aromatic resin having a protonic acid group. The polymer membrane of the invention may further contain, in addition to the crosslinkable aromatic resin having a protonic acid group of the invention, fluorinated ion conductive resins, fluorinated electrode materials, etc., and may form an complex with metals, fibers of glass or carbon, porous polymer membranes, etc.

Since the crosslinkable aromatic resin having a protonic acid group of the invention is a linear polymer in an uncrosslinked state, the resin has excellent thermoplastic properties, which enables to form membranes easily by press molding or extrusion molding and enables to stretch the membranes. In some resins such as aromatic polyimides and aromatic polyazoles, they are not thermoplastic. And in some resins, they are inappropriate for melt molding, because their melt flow temperatures are higher than those of degradation of the protonic acid group (the temperatures of detachment of the protonic acid group from the aromatic ring).

The aromatic resin having a protonic acid group of the invention can be formed into membranes from the varnish state described above by casting method. That is, the varnish is cast onto a substrate and the solvent is removed by evaporation to prepare membranes having good quality.

[Ion Conductive Polymer Membrane]

The ion conductive polymer membrane for fuel cells of the invention is an ion conductive polymer membrane obtained by crosslinking the polymer membranes described above. The ion conductive polymer membrane for fuel cells of the invention may further contain, in addition to the aromatic resin having a protonic acid group of the invention, fluorinated ion conductive resins, fluorinated electrode materials, or the like, and may form an complex with metals, fibers of glass or carbon, porous polymer membranes, etc.

In the ion conductive polymer membrane for fuel cells of the invention, the ion-exchange equivalent weight is not particularly limited, and is preferably in a range of 200 to 5000 g/mol, more preferably 200 to 1000 g/mol. Herein the ion-exchange equivalent weight is defined by a resin weight per mol of the protonic acid group and means a reciprocal number of the mole number of the protonic acid group per unit weight of the resin. In other words, the smaller the ion-exchange equivalent weight, the larger the amount of the protonic acid group per unit weight of the resin. In an uncrosslinked membrane having the ion-exchange equivalent weight within the range described above, the membrane involves problems that the membrane is soluble in water or methanol, is seriously swollen, and has high permeability of fuel through the membrane, etc. In contrast, even within the range described above, the ion conductive polymer membrane for fuel cells of the invention can be provided for use in fuel cells, since the dissolution, swelling and permeation of fuel through the membrane can be diminished by crosslinking. When the ion-exchange equivalent weight is too high, the ion conductivity is low and fuel cells of high output cannot be obtained.

The solubility in methanol of the ion conductive polymer membrane for fuel cells of the invention is preferably less than 15 wt %, more preferably 10 wt % or less, and most preferably 5 wt % or less. Herein, the solubility in methanol is defined by percentage of the weight loss of membrane after the membrane is dipped in methanol. Since the solubility in methanol can be diminished by crosslinking in the ion conductive polymer membrane for fuel cells of the invention, the solubility in methanol can be adjusted within the range above even when the ion-exchange equivalent weight is low. When the solubility in methanol is high, the polymer membrane cannot be provided for use in fuel cells, since dissolution of membrane, reduced strength, membrane thinning, void formation, methanol crossover, etc. occur.

The ion-exchange equivalent weight and solubility in methanol of the ion conductive polymer membrane for fuel cells of the invention can be controlled by the content of protonic acid group or crosslinkable group of the crosslinkable aromatic resin having a protonic acid group used. The equivalent weight and solubility may also be controlled by regulating the degree of crosslinking by means of crosslinking conditions.

The thickness of the ion conductive polymer membrane for fuel cells of the invention is not particularly limited, and is generally from 10 to 200 μm, preferably 30 to 100 μm. Within this range, sufficient membrane strength can be obtained and membrane resistance is sufficiently low for practical use. That is, by intercepting fuel between the cathode and the anode of fuel cells and providing a sufficient ion conductivity, excellent power generation efficiency can be obtained for fuel cells. When the membrane is too thin, the fuel crossover cannot be prevented sufficiently sometimes, whereas when the membrane is too thick, membrane resistance increases to affect power generation efficiency in some occasion. Herein, the membrane thickness can be controlled by conditions for membrane formation such as temperature or pressure in press molding, a varnish concentration and a coating thickness in casting, or the like.

The ion conductive polymer membrane for fuel cells of the invention has the protonic acid group described above. Out of them, a protonic acid group represented by the following formula (41) which has the highest ion conductivity is preferable.

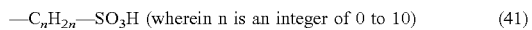

—$C_nH_{2n}$—$SO_3H$ (wherein n is an integer of 0 to 10)  (41)

The ion conductive polymer membrane having a protonic acid group for fuel cells can be obtained by using the aromatic resin having a protonic acid group which contains said protonic acid group. Or, the polymer membrane may also be obtained by treating a membrane prepared from an aromatic resin having a protonic acid group containing said protonic acid group in the form of an alkali metal salt, with aqueous hydrochloric acid solution, aqueous sulfuric acid solution, etc.

Where an organic solvent, etc. in casting remains in the ion conductive polymer membrane for fuel cells of the invention, the ion conductivity might decrease in some occasion. Thus, it is preferred to thoroughly dry the ion conductive polymer membrane for fuel cells of the invention or to be washed with water, an aqueous sulfuric acid solution, an aqueous hydrochloric acid solution, etc.

[Binders]

The ion conductive binders for fuel cells of the invention are binders comprising the crosslinkable aromatic resin having a protonic acid group of the invention. The binders are used for blending with electrolyte materials, etc. or for adhering to electrolyte materials or membranes. Therefore resins that have already been crosslinked and become insoluble or non-fusible, can not be employed as binders.

The crosslinkable aromatic resin having a protonic acid group of the invention can be crosslinked during or after adhesion and exhibits excellent ion conductivity, heat resistance, water resistance and adhesion property after the crosslinking, and therefore shows suitable properties as the ion conductive binders for fuel cells.

That is, the binders of the invention can play a roll to produce electrodes by fixing conductive materials, catalysts, etc., and also to bind electrolyte membranes, electrodes and separators with each other. In addition, the binders of the invention can be provided for binding in form of powder or coating, or in the form of a varnish dissolved or suspended in a solvent.

The ion-exchange equivalent weight and solubility in methanol of the ion conductive binder for fuel cells of the invention are not particularly limited, but can be controlled by the content of protonic acid group or crosslinkable group of crosslinkable aromatic resin having a protonic acid group used. The equivalent and solubility may also be controlled by regulating the degree of crosslinking by means of crosslinking conditions. Unlike the polymer membrane, the binder has preferably higher fuel permeability. Herein, since the binder of the invention can lower the solubility by crosslinking, the ion-exchange equivalent weight in the binder can be made smaller than that of ordinary uncrosslinked resins to improve the ion conductivity and fuel permeability. Furthermore, the fuel permeability may be controlled by reducing the crosslinking degree by means of the content of crosslinkable group or conditions for the crosslinking treatment, etc.

The ion conductive binder for fuel cells of the invention may also be used by combining the crosslinkable aromatic resin of the invention having a protonic acid group with other ion conductive polymer materials. These other ion conductive polymer materials include fluorinated polymers having a protonic acid group represented by the following formula (42), and conventionally known hydrocarbon-based polymers containing a protonic acid group.

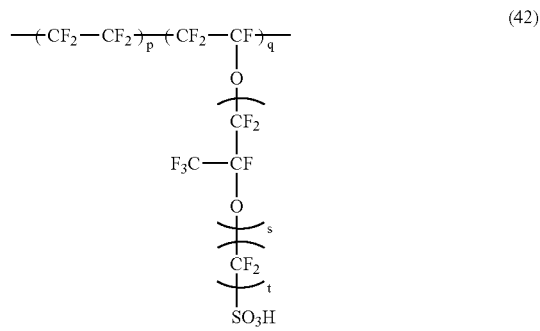

[In formula (42), each of p and q independently represents an integer of 1 to 2000, s is an integer of 0 to 6, and t is an integer of 1 to 6.]

In this case, a compositional ratio of the crosslinkable aromatic resin having a protonic acid group in the binder is preferably 5 wt % or more, whereby the binder provides a good adhesion to electrode materials, polymers, etc.

[Composition for Electrode Formation]

The composition for electrode formation of the invention comprises a mixture of the binder and electrode materials, which binder comprises the crosslinkable aromatic resin having a protonic acid group described above, or a mixture of this resin and other various ion conductive polymers.

The electrode materials include conductive materials having electric conductivity, catalysts for promoting oxidation of hydrogen or reduction of oxygen, etc.

The conductive materials may be any substances, so long as they are electrically conductive. Examples of the conductive materials include carbon black such as acetylene black, activated charcoal, graphite, etc., which are employed singly or in combination, and used in the form of powder or sheets.

The catalysts are not particularly limited as long as they are metals for promoting oxidation of hydrogen and reduction of oxygen. Examples of the catalysts are lead, iron, manganese, cobalt, chromium, gallium, vanadium, tungsten, ruthenium, iridium, palladium, platinum, rhodium, or alloys thereof.

The composition for electrode formation, wherein the electrode material is at least one selected from the group consisting of carbon black, activated charcoal, graphite, lead, iron, manganese, cobalt, chromium, gallium, vanadium, tungsten, ruthenium, iridium, palladium, platinum, rhodium, and alloys thereof, is preferred embodiment.

Proportion of these electrode materials and binders is not particularly limited but the proportion of binder is preferably in a range of 5 to 90 wt % because the strength of electrode and its efficiency are compatible.

The composition for electrode formation of the invention can be provided for forming the electrodes in the form of powder, or in the form of a varnish dissolved or suspended in a solvent.

[Crosslinking of the Crosslinkable Aromatic Resin Having a Protonic Acid Group, Polymer Membrane, Binder and Composition for Electrode Formation]

By crosslinking the crosslinkable aromatic resin having a protonic acid group, the polymer membrane, the binder or the composition for electrode formation of the invention, the crosslinked product, ion conductive polymer membrane for fuel cells, electrodes or MEA (Membrane Electrode Assembly) can be obtained.

The method for crosslinking the crosslinkable aromatic resin having a protonic acid group of the invention, the polymer membrane, the binder or the composition for electrode formation is not particularly limited, and the crosslinking can be effected by light, heat, electron rays, etc.

In the case of photo-crosslinking of the crosslinkable aromatic resin having a protonic acid group, the polymer membrane, the binder or the composition for electrode formation of the invention, a light source to be used is not particularly limited. In general, the light source that can generate light within the range of UV light and visible light is employed. Specific examples of the light source include a low pressure mercury lamp, a high pressure mercury lamp, a xenon lamp, a metal halide lamp, etc. The dose of exposure varies depending on wavelength of light, structure of the resin exposed to light, resin content, crosslinking temperature, membrane thickness, etc. but is generally in a range of 500 to 100,000 mJ/cm$^2$, preferably 1,000 to 30,000 mJ/cm$^2$.

In the case of thermal crosslinking of the crosslinkable aromatic resin having a protonic acid group, the polymer membrane, the binder or the composition for electrode formation of the invention, a method for supplying heat is not particularly limited but it is sufficient to heat with an ordinary oven, etc. Heating temperature and time vary depending on structure of the crosslinkable polyether ketone used and its membrane thickness but are generally at 120 to 300° C., preferably 150 to 250° C. for 0.1 to 180 minutes, preferably for 1 to 60 minutes.

The crosslinkable aromatic resin having a protonic acid group, the polymer membrane, the binder or the composition for electrode formation of the invention may also be crosslinked by heat generated during the membrane formation or assembling operations such as drying after coating and heat press. Also, crosslinking can be performed by exposing to light simultaneously during the operation of membrane formation or assembling.

[Fuel Cell]

The fuel cell of the invention is a fuel cell obtained by using the polymer membrane, binder, composition for electrode formation and/or electrodes of the invention.

The fuel cell of the invention comprises the polymer membrane of the invention and the cathode and anode arranged in contact with both sides of the membrane. Fuel such as hydrogen, methanol, etc. is electrochemically oxidized at the anode to produce protons and electrons. The protons migrate through the polymer membrane into the cathode where oxygen is supplied. On the other hand, the electrons produced at the anode flow to the cathode through the load connected to the cell, and the protons, oxygen and electrons are reacted at the cathode to produce water.

Preferably, the electrodes that constitute the fuel cell described above are electrodes obtained by using the binder and/or composition for electrode formation of the invention. Herein, fluorinated resins, etc. may be used for the binder as well. Examples of fluorinated resins are the fluorinated polymers having a protonic acid group described above, polytetrafluoro-ethylene, tetrafluoroethylene-perfluoroalkyl vinyl ether copolymer, etc. However, in view of good adhesion to the polymer membrane of the invention and difficulty to cause detachment of membrane or electrode materials when prepared into a cell, it is particularly preferable to use the binder of the invention.

In the fuel cell obtained by using the polymer membrane, binder and electrode materials of the invention, a higher output can be obtained because of the ion conductivity of the membrane and binder, and dissolution or dissolving-out of the resin, and the fuel crossover and reduction in output due to detachment of the membrane or electrode materials that constitute cells hardly occur so that the fuel cell of the invention provides excellent power generation efficiency and reliability.

EXAMPLES

Hereinafter, the invention will be described in more detail with reference to EXAMPLES but is not deemed to be limited thereto.

Methods for various tests in Examples are given below.

(i) Reduced Viscosity

The viscosity was measured at 35° C. with a solution obtained by dissolving 0.50 g of polymer powders into 100 ml of a solvent, or diluting a polymer solution to a concentration of 0.005 g/ml.

(ii) 5% Weight Loss Temperature, Weight Loss Initiation Temperature

The temperatures were determined in the air using DTA-TG (TG-DTA 2000 manufactured by Mac-Science Co.) at a rising rate of temperature of 10° C./min.

(iii) Glass Transition Temperature

This temperature was measured with differential scanning calorimetry (DSC; DSC 3100 manufactured by Mac-Science Co.) up to 400° C. at a rising rate of temperature of 10° C./min.

(iv) Proton Exchange

Protonic acid metal salts, etc. were reverted to free protonic acids by the following process.

1) Powder, membrane or its photo-crosslinked membrane of crosslinkable resin having a protonic acid group was immersed in 2N sulfuric acid overnight, 2) the powder or membrane treated by acid was immersed in distilled water overnight, and 3) the powder or membrane treated by acid and washed with distilled water was dried at 150° C. for 4 hours to obtain the powder or membrane containing a free protonic acid.

(v-1) Photo-Crosslinking 1

Photo-crosslinking was carried out by exposing to light under 6000 mJ/cm² using a metal halide lamp.

(v-2) Photo-Crosslinking 2

At the photo-crosslinking, the light exposure was set to 10000 mJ/cm².

(vi) Thermal Crosslinking

Thermal crosslinking was carried out by a heat treatment at 270° C. for 2 hours in a nitrogen flow.

(vii) Ion Conductivity

The ion conductive polymer membrane was cut out into a piece having 5 mm of width and 40 mm of length. And the piece was mounted on a PTFE (polytetrafluoroethylene) holder, and 4 electrodes were press-contacted to the holder. The specific resistance was calculated from the arc of Cole-Cole plots determined by the alternating current impedance measurement using four terminals. A distance between the voltage terminals was set to 20 mm. The impedance was measured using an LCR meter (3532 manufactured by Hioki E.E. Corp.). A sample having the electrodes connected thereto was placed in a thermostatic chamber made from aluminum block, and the temperature was varied to measure the conductivity in a range from 30° C. to 110° C. Humidification was effected by introducing steam into the thermostatic chamber under normal pressure. The steam was generated by heating distilled water in a steam generator at the temperature of 5° C. higher than that of the chamber when the measurement temperature was lower than 100° C., and at the temperature of 120° C. constant when the measured temperature was 100° C. or higher. The membrane thickness necessary for calculating the ion conductivity was determined in a dry state using a micrometer.

(viii) Methanol Solubility

The ion conductive polymer membrane, which was dried at 150° C. for 4 hours in a nitrogen atmosphere, was immersed in methanol and allowed to stand at 25° C. for 24 hours. The ion conductive polymer membrane taken out was again dried at 150° C. for 4 hours, and a rate of decrease in mass was measured.

(ix) Methanol Permeability

Distilled water was contacted with 1 mol/l aqueous methanol solution through the ion conductive polymer membrane of 23 mmφ in diameter. Change in methanol concentration on the distilled water side was measured up to 3 hours by gas chromatography. The methanol permeability in a membrane thickness of 50 μm was calculated from a slope of the resulting straight line of methanol concentration increment.

(x) Ion-Exchange Equivalent Weight

The ion conductive polymer membrane was accurately weighed and put in a sealable glass container. And aqueous calcium chloride solution in excess was added thereto and stirred overnight. Hydrogen chloride generated in the system was titrated and calculated with 0.1 N sodium hydroxide standard aqueous solution using phenolphthalein indicator.

Synthesis Example 1

4,4'-Difluorobenzophenone (0.525 mol) and 210 ml of 50% fuming sulfuric acid were charged in a reaction flask equipped with a stirrer, a thermometer and a condenser, and reacted at 100° C. for 12 hours. The reaction mixture was discharged into 1000 g of ice water, and neutralized with 210 g of NaOH. Subsequently, 210 g of NaCl was added, dissolved under heating and then cooled to allow the mixture to stand overnight. After the crystals precipitated were filtered, 400 ml of water and 400 ml of ethanol were added to dissolve under heating and cooled by leaving in the atmosphere to recrystallize. The crystals precipitated were filtered and dried at 100° C. for 6 hours to form 5,5'-carbonylbis(2-fluorobenzenesulfonic acid) sodium salt described below as white crystals. Obtained amount was 155.2 g (0.386 mol, yield 70%).

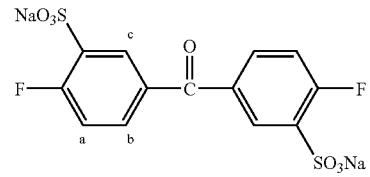

$^1$H-NMR (D$_2$O, TMS) ppm δ 7.46 (2H, dd, a-H×2) 7.99 (2H, ddd, b-H×2) 8.23 (2H, dd, c-H×2)

| Elemental analysis (%) | C | H |
|---|---|---|
| Calculated value | 36.98 | 1.43 |
| Analyzed value | 36.65 | 1.40 |

Synthesis Example 2

4,4'-Dichlorodiphenylsulfone (0.60 mol) and 180 ml of 30% fuming sulfuric acid were charged in a reaction flask equipped with a stirrer, a thermometer and a condenser, and reacted at 110° C. for 6 hours. The reaction mixture was discharged into 1.8 kg of ice water. Subsequently, 360 g of NaCl and 500 ml of water were added, dissolved under heating, and cooled by leaving in the atmosphere, and then the mixture was left to stand overnight. After the crystals precipitated were filtered, 300 ml of water and 350 ml of ethanol were added to the crystal to dissolve under heating. And the mixture was cooled by leaving in the atmosphere to recrystallize. The crystals precipitated were filtered and recrystallized again with 180 ml of water and 180 ml of ethanol. The crystals were dried at 100° C. for 6 hours and at 200° C. for 4 hours to give 5,5'-sulfonyl bis(2-chlorobenzylsulfonic acid) sodium salt described below as white crystals. Obtained amount was 95.5 g (0.194 mol, yield 32%).

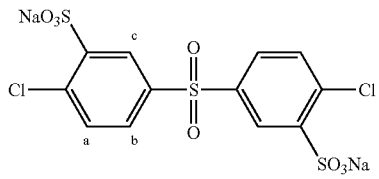

NMR (Measured by GSX-270 Manufactured by JEOL) $^1$H-NMR (DMSO, TMS) ppm δ 7.83 (2H, dd, a-H×2) 8.10 (2H, ddd, b-H×2) 8.54 (2H, dd, c-H×2) Elemental Analysis (%) (Measured by Model 2400 CHN Analyzer Manufactured by Perkin-Elmer)

|  | C | H |
|---|---|---|
| Calculated value | 29.34 | 1.23 |
| Analyzed | 29.38 | 1.20 |

Synthesis Example 3

In a 500 ml three-necked flask equipped with a Dimroth condenser and a 100 ml dropping funnel, 2,2-bis(4-hydroxyphenyl)-propane (10 g, 0.04 mol), sodium sulfite (48.3 g, 0.35 mol), sodium carbonate (2.8 g, 0.03 mol) and 200 ml of water were charged, and 37% formaldehyde aqueous solution (10.5 g, 28.4 ml, 0.35 mol) was added dropwise to the mixture over 15 minutes while refluxing under heating. The reaction was carried out for 12 hours while refluxing under heating. After cooling to room temperature, 10% hydrochloric acid was added until pH of the solution becomes 7. A solid precipitated was separated by filtration and washed with water and methanol to give 26.0 g (yield, 74.4%) of 2,2-bis(3,5-bis(sulfomethyl)-4-hydroxyphenyl) propane sodium salt.

Analytical Results:
$^1$H-NMR (D$_2$O): δ (ppm) 7.10 (s, 2H), 4.09 (s, 4H), 1.52 (s, 3H)

Example 1

In a five-necked reactor equipped with a nitrogen-introducing tube, a thermometer, a reflux condenser and a stirrer, 4.22 g (0.01 mol) of 5,5'-carbonylbis(2-fluorobenzene-sulfonic acid sodium salt) prepared in Synthesis Example 1, 2.18 g (0.01 mol) of 4,4'-difluorobenzophenone, 5.69 g (0.02 mol) of 2,2-bis(3,5-dimethyl-4-hydroxyphenyl)propane and 3.46 g (0.025 mol) of potassium carbonate were weighed and charged. After 40 ml of dimethylsulfoxide and 30 ml of toluene were added to the mixture, the mixture was heated at 130° C. while stirring under a nitrogen atmosphere to remove water generated out of the system for 2 hours and then distill toluene off.

Subsequently, the reaction was continued at 160° C. for 14 hours to give a viscous polymer solution. To the solution obtained, 60 ml of dimethylsulfoxide (DMSO) was added for dilution and then filtered. The polymer solution was discharged into 600 ml of acetone. The polymer powder precipitated was filtered and dried at 160° C. for 4 hours to give 10.39 g (yield, 92%) of polyether ketone powder. The reduced viscosity, glass transition temperature and 5% weight loss temperature of the polyether ketone powder obtained were 0.85 dl/g (DMSO), 230° C. and 367° C., respectively.

(a) The powdery polymer obtained was dissolved in DMSO and the solution was cast on a glass substrate and dried at 200° C. for 4 hours to give the polyether ketone membrane having sulfonic acid sodium salt group. The membrane obtained was very flexible and tough. The ion conductivity of this membrane was measured by the method described in (vii) above. The results are shown in Table 1.

(b) This membrane was proton-exchanged by the method described in (iv) above to give the polyether ketone membrane containing sulfonic acid group. The membrane obtained was very flexible and tough. The ion conductivity of this membrane was measured by the method described in (vii) above. The results are shown in Table 1.

(c) The polyether ketone membrane having sulfonic acid sodium salt group, which was obtained in (a) above, was crosslinked by the method described in (v-1) to give crosslinked polyether ketone membrane having sulfonic acid sodium salt group. The membrane obtained was very flexible and tough. The ion conductivity of this membrane was measured by the method described in (vii) above. The results are shown in Table 1.

(d) The crosslinked polyether ketone membrane having sulfonic acid sodium salt group, which was obtained in (c) above, was proton-exchanged by the method described in (iv) above to give the crosslinked polyether ketone membrane having sulfonic acid group. The membrane obtained was very flexible and tough. The ion conductivity of this membrane was measured by the method described in (vii) above. The results are shown in Table 1.

When a piece of the polyether ketone membrane having sulfonic acid sodium salt group obtained in (a) above was dipped in DMSO, the piece was completely dissolved in DMSO. When a piece of the membrane was dipped in water, a part dissolved therein was observed. On the other hand, the crosslinked polyether ketone membrane having of sulfonic acid sodium salt group obtained in (c) above was completely insolubilized in DMSO and water, and it was confirmed that chemical resistance and water resistance were improved by crosslinking.

(e) Regarding to the crosslinked polyether ketone membrane having sulfonic acid group obtained in (d) above, the initiation temperature of weight loss that is caused by elimination of sulfonic acid group, was measured by the method described in (ii) above, and showed the result of 257° C.

The methanol solubility of the polyether ketone membranes having sulfonic acid group obtained in (b) and (d) described above was measured by the method described in (viii) above. The solubility of the membrane of (b) was 60 wt %, whereas the membrane of (d) showed 4.2 wt %. It was thus confirmed that methanol tolerance was markedly improved by crosslinking.

Example 2

10.30 g (yield, 93%) of the polymer powder were obtained in the same manner as in Example 1 except that the amount of 2,2-bis(3,5-dimethyl-4-hydroxyphenyl)-propane was changed to 5.41 g (0.019 mol). The reduced viscosity of the polyether ketone powder obtained was 0.40 dl/g (DMSO) and the 5% weight loss temperature was 360° C.

The polyether ketone membrane was obtained by using the obtained powdery polymer in the same manner as in (a) through (d) of Example 1. The ion conductivity of the membrane was determined. The results are shown in Table 1. All of the membranes obtained had excellent flexibility and toughness.

TABLE 1

| | Conductivity (S/cm) | | | |
|---|---|---|---|---|
| Example | (a) (30° C./ 90° C.) | (b) (30° C./ 90° C.) | (c) (30° C./ 90° C.) | (d) (30° C./ 90° C.) |
| 1 | 0.018/0.065 | 0.048/0.147 | 0.017/0.069 | 0.021/0.132 |
| 2 | 0.018/0.063 | 0.051/0.150 | 0.016/0.069 | 0.020/0.136 |

Example 3

3-1) Preparation of Electrolyte Membrane

An electrolyte membrane was prepared using the crosslinked polyether ketone having sulfonic acid group obtained in (d) of Example 1.

3-2) Preparation of Air Electrode (Cathode)

A 10 g of varnish obtained by dissolving 0.5 g of powder as a binder, which was prepared by proton-exchange of polyether ketone powder having a protonic acid group obtained in Example 1 in the same manner as in (iv) described above, in a solvent mixture of 5.0 g of distilled water and 4.5 g of tetrahydrofuran, was blended with 0.5 g of 30 wt % Pt catalyst supported on a carrier (trade name: TEC10V30E) manufactured by Tanaka Kikinzoku K. K. The blended mixture was rendered to ultrasonication and stirred to give the composition for electrodes formation for air electrode.

The composition for electrode formation was coated on a carbon paper manufactured by Toray Industries, Inc. (Product No.: TGP-H-060) using a applicator. After drying in vacuum at 70° C. for 12 hours, it was cut out in a size of 5 cm$^2$, which was referred to Electrode 2. The coating amount was 2 mg/cm$^2$ when calculated as the amount of Pt.

3-3) Preparation of Fuel Electrode (Anode)

A 10 g of varnish obtained by dissolving 0.5 g of powder as a binder, which was prepared by proton-exchange of polyether ketone having a protonic acid group obtained in Example 1 in the same manner as in (iv) described above, in a solvent mixture of 5.0 g of distilled water and 4.5 g of tetrahydrofuran, was blended with 0.5 g of 33 wt % PtRu catalyst supported on a carrier (trade name: TEC61V33) manufactured by Tanaka Kikinzoku K. K. The blended mixture was rendered to ultrasonication and stirred to give the composition for electrodes formation for fuel electrode.

The composition for electrode formation was coated on a carbon paper manufactured by Toray Industries, Inc. (Product No.: TGP-H-060). After drying in vacuum at 70° C. for 12 hours, it was cut out in a size of 5 cm$^2$, which was referred to Electrode 2'. The coating amount was 2 mg/cm$^2$ when calculated as the amount of PtRu.

3-4) Preparation of Assembly

The crosslinked polyether ketone electrolyte membrane having sulfonic acid group prepared in 3-1, Electrode 2 prepared in 3-2 and Electrode 2' prepared in 3-3 were laminated one by one in a predetermined order, while spraying 20 wt % tetrahydrofuran aqueous solution. The laminate was provided into a heat press previously heated to 80° C., and 0.4 MPa press was applied to the electrode surface only. Subsequently, the temperature was elevated from 80° C. to 130° C. while applying the pressure, which required 15 minutes with the heat press used. Although the electrolyte membrane electrode assembly after assembling was almost dried, there was no detachment of electrodes.

3-5) Power Generation Test

The electrolyte membrane electrode assembly prepared in 3-4 was incorporated into a cell for fuel cell test (Product No.: EFC-05-REF) manufactured by Electrochem, Inc. to assemble the fuel cell shown in FIG. 1. In FIG. 1, the fuel cell has the structure that the electrolyte membrane 1 is inserted between Electrodes with the catalysts 2 and 2' prepared above using gaskets 3, separators 4 are placed at the out sides and the entire structure is firmly tightened with clamp bolts 7 using pressure plates 5, and gas flow channel is provided at the inside 6.

Figure 2:
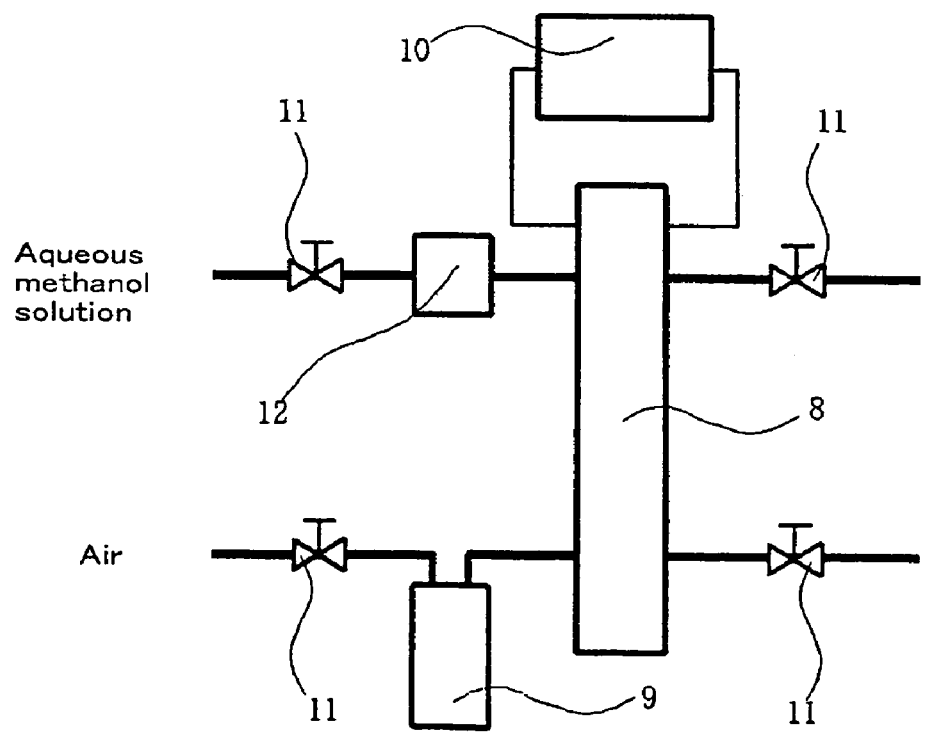
FIG. 2 is a block flowchart showing a fuel cell performance evaluation device used in EXAMPLES for evaluation of fuel cells.

After the cell assembling, cell performance was evaluated with 1M aqueous methanol solution as fuel, using such a fuel cell evaluation device as shown in FIG. 2. An output of about 5.1 mW/cm$^2$ was obtained.

In FIG. 2, the fuel cell shown in FIG. 1 is incorporated into a cell 8 for the fuel cell. In the line at the upper side of the drawing, the aqueous methanol solution is fed from the left to right through feeding pump 12 through the cell 8. In the line at under side, air is fed from the left to the right through the cell 8 in a state humidified by bubbling tank 9 for humidification. The structure is so designed that the aqueous methanol solution flows through the flow channel 6 on the fuel electrode side, and air flows through the flow channel 6 on the air electrode side. Each flow amount is controlled by mass flow controller 11. This device is designed to evaluate the fuel cell performance by measuring the voltage and current density, which is generated by allowing the aqueous methanol solution and air to flow, at electron load 10.

Figure 3:
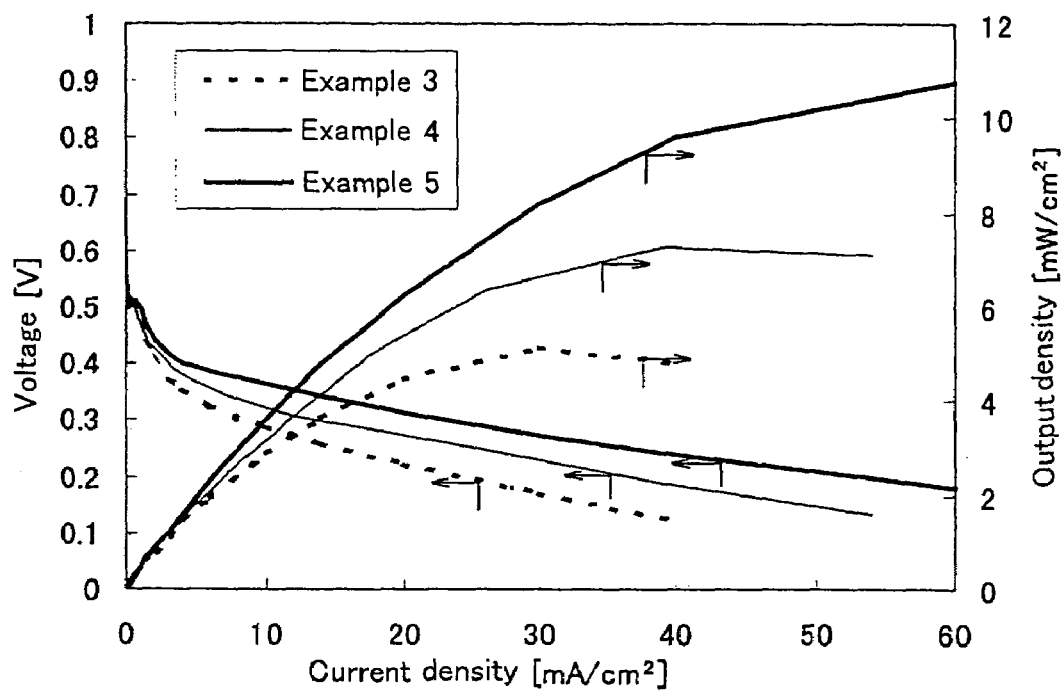
FIG. 3 is a graph showing the properties of fuel cells obtained in EXAMPLES of the invention.

The cell property of the fuel cell prepared is shown in FIG. 3 and the measurement conditions are shown in TABLE 2. FIG. 3 is plots of the voltage and output density to current density, by which the output performance of fuel cell can be compared.

The cell was disassembled after the power generation test to observe the electrolyte membrane electrode assembly. As the result of the observation, no detachment of the electrolyte membrane and electrodes was found.

TABLE 2

| Measurement conditions | Setting value |
|---|---|
| Temperature of fuel cell | 80° C. |
| Concentration of aq. methanol solution | 1 M (3.2%) |
| Flow rate of aq. methanol solution | 2 cc/min |
| Temperature of aq. methanol solution | 30° C. |
| Pressure of air | 0.05 MPa |
| Flow rate of air | 100 SCCM |
| Temperature of air bubbling tank | 50° C. |

Example 4

4-1) Preparation of Electrolyte Membrane

An electrolyte membrane was prepared using the crosslinked polyether ketone having sulfonic acid group obtained in (d) of Example 1.

4-2) Preparation of Air Electrode (Cathode)

A 10 g of varnish obtained by dissolving 0.25 g of powder, which was prepared by proton-exchange of polyether ketone having a protonic acid group obtained in Example 1 in the same manner as in (iv) described above, and 0.25 g of powder, which was prepared by proton-exchange of polyether ketone powder having a protonic acid group in the same manner as in (iv) obtained in Example 2, in a solvent mixture of 5.0 g of distilled water and 4.5 g of tetrahydrofuran, was blended with 10 g of a 5 wt % solution (Product No.: 27, 470-4) of fluorinated polymer containing a protonic acid group (Nafion) manufactured by Aldrich Corp. to make a varnish blend. 20 g of the varnish blend was blended with 1.0 g of 30 wt % Pt supported catalyst (trade name: TEC10V30E) manufactured by Tanaka Kikinzoku K. K. The blended mixture was rendered to ultrasonication and stirred to give the composition for electrodes formation for air electrode.

The composition for electrode formation was coated on a carbon paper manufactured by Toray Industries, Inc. (Product No.: TGP-H-060) using an applicator. After drying in vacuum at 70° C. for 12 hours, it was cut out in a size of 5 $cm^2$, which was referred to Electrode 2. The coating amount was 2 $mg/cm^2$ when calculated as the amount of Pt.

4-3) Preparation of Fuel Electrode (Anode)

A 10 g of varnish obtained by dissolving 0.25 g of powder, which was prepared by proton-exchange of polyether ketone powder having a protonic acid group obtained in Example 1 in the same manner as in (iv) described above, and 0.25 g of powder, which was prepared by proton-exchange of polyether ketone powder having a protonic acid group obtained in Example 2 in the same manner as in (iv) described above, in a solvent mixture of 5.0 g of distilled water and 4.5 g of tetrahydrofuran, was blended with 10 g of a 5 wt % solution (Product No.: 27, 470-4) of fluorinated polymer containing a protonic acid group (Nafion) manufactured by Aldrich Corp. to make a varnish blend. 20 g of the varnish blend was blended with 1.0 g of 33 wt % PtRu supported catalyst (trade name: TEC61V33) manufactured by Tanaka Kikinzoku K. K. The blended mixture was rendered to ultrasonication and stirred to give the composition for electrodes formation for fuel electrode was obtained.

The composition for electrode formation was coated on a carbon paper manufactured by Toray Industries, Inc. (Product No.: TGP-H-060). After drying in vacuum at 70° C. for 12 hours, it was cut out in a size of 5 $cm^2$, which was made Electrode 2'. The coating amount was 2 $mg/cm^2$ when calculated as the amount of PtRu.

4-4) Preparation of Assembly

The assembly was prepared in the same manner as in 3-4 of Example 3, except for using each one of the crosslinked polyether ketone electrolyte membrane having sulfonic acid group prepared in 4-1, Electrode 2 prepared in 4-2 and Electrode 2' prepared in 4-3. Although the electrolyte membrane electrode assembly after assembling was almost dry, there was no detachment of the electrodes.

4-5) Power Generation Test

Using the electrolyte membrane electrode assembly prepared in 4-4, the fuel cell was assembled and the cell property was evaluated in the same manner as in 3-5) of Example 3. An output of about 7.3 $mW/cm^2$ was obtained. The cell property of the fuel cell prepared is shown in FIG. 3. The measurement conditions are the same as in Table 2.

The cell was disassembled after the power generation test to observe the electrolyte membrane electrode assembly. As the result of the observation, no detachment of the electrolyte membrane and electrodes was found.

Example 5

5-1) Preparation of Electrolyte Membrane

An electrolyte membrane was prepared using the crosslinked polyether ketone membrane having sulfonic acid group obtained in (d) of Example 1.

5-2) Preparation of Air Electrode (Cathode)

10 g of 5 wt % solution (Product No.: 27, 470-4) of fluorinated polymer containing a protonic acid group (Nafion) manufactured by Aldrich Corp. was blended with 0.5 g of 30 wt % Pt supported catalyst (trade name: TEC10V30E) manufactured by Tanaka Kikinzoku K. K. The blended mixture was rendered to ultrasonication and stirred to give the composition for electrode formation for air electrode.

The composition for electrode formation was coated on a carbon paper manufactured by Toray Industries, Inc. (Product No.: TGP-H-060) using an applicator. After drying in vacuum at 70° C. for 12 hours, it was cut out in a size of 5 $cm^2$, which was referred to Electrode 2. The coating amount was 2 $mg/cm^2$ when calculated as the amount of Pt.

In addition, a vanish blend prepared by mixing 10 g of varnish obtained by dissolving 0.5 g of powder, which was prepared by proton-exchange of polyether ketone powder having a protonic acid group obtained in Example 2 in the same manner as in (iv) described above, in a solvent mixture of 5.0 g of distilled water and 4.5 g of tetrahydrofuran, and 10 g of a 5 wt % solution (Product No.: 27, 470-4) of fluorinated polymer containing a protonic acid group (Nafion) manufactured by Aldrich Corp. was further spray-coated on Electrode 2. Then the coated electrode was air-dried overnight in air at normal temperature. The coating amount of the polyether ketone having a protonic acid group/fluorinated polymer having a protonic acid group mixture was made 1 $mg/cm^2$ on a dry weight basis.

5-3) Preparation of Fuel Electrode (Anode)

10 g of 5 wt % solution (Product no.: 27, 470-4) of fluorinated polymer containing a protonic acid group (Nafion) manufactured by Aldrich Corp. was blended with 0.5 g of 33 wt % PtRu supported catalyst (trade name: TEC61V33) manufactured by Tanaka Kikinzoku K. K. The blended mixture was rendered to ultrasonication and stirred to give the composition for electrode formation for fuel electrode.

The composition for electrode formation was coated on a carbon paper manufactured by Toray Industries, Inc. (Product No.: TGP-H-060). After drying in vacuum at 70° C. for 12 hours, it was cut out in a size of 5 $cm^2$, which was made Electrode 2'. The coating amount was 2 $mg/cm^2$ when calculated as the amount of PtRu.

In addition, a varnish blend of 10 g of varnish obtained by dissolving 0.5 g of powder, which was prepared by proton-exchange of polyether ketone powder having a protonic acid group obtained in Example 2 in the same manner as in (iv) described above, in a solvent mixture of 5.0 g of distilled water and 4.5 g of tetrahydrofuran, and 10 g of a 5 wt % solution (Product No.: 27, 470-4) of fluorinated polymer containing a protonic acid group (Nafion) manufactured by Aldrich Corp. was further spray-coated on Electrode 2'. Then the coated electrode was air-dried overnight in air at normal temperature. The coating amount of the polyether ketone having a protonic acid group/fluorinated polymer having a protonic acid group mixture was made 1 mg/cm² on a dry weight basis.

5-4) Preparation of Assembly

The assembly was prepared in the same manner as in Example 3-4, except for using each one of the crosslinked polyether ketone electrolyte membrane having sulfonic acid group prepared in 5-1, Electrode 2 prepared in 5-2 and Electrode 2' prepared in 5-3. Although the electrolyte membrane electrode assembly after assembling was almost dry, there was no detachment of the electrodes.

5-5) Power Generation Test

Using the electrolyte membrane electrode assembly prepared in 5-4, the fuel cell was assembled and the cell property was evaluated in the same manner as in 3-5 of Example 3. An output of about 10.8 mW/cm² was obtained. The cell property of the fuel cell prepared is shown in FIG. 3. The measurement conditions are the same as in Table 2.

The cell was disassembled after the power generation test to observe the electrolyte membrane electrode assembly. As the result of the observation, no detachment of the electrolyte membrane and electrodes was found.

Example 6

The powdery polymer obtained in Example 1 was proton-exchanged by the method in (iv) above, and the powder obtained was dissolved in dimethyl acetamide (DMAc). The solution was cast onto a glass substrate and dried at 150° C. for 4 hours to give the membrane of polyether ketone. After photo-crosslinking by the method described in (v-1), the ion conductivity was measured by the method described in (vii) above. The conductivity was found to be 0.129 S/cm at 90° C.

Example 7-27

All kinds of polyether ketone membranes were prepared in the same manner as in Example 1, except that proportions of each of aromatic dihydroxy compounds, aromatic dihalide compounds having a protonic acid group and aromatic dihalide compounds were changed. The polyether ketone membranes obtained were measured on each physical properties in the same manner as in Example 1, which are shown in Table 3, and the measurement results of ion conductivity are shown in Table 4.

In the compounds used in Examples hereinafter, the following compounds are shown by abbreviations given below.

| | |
|---|---|
| DFBP-2S: | 5,5'-carbonylbis(2-fluorobenzenesulfonic acid) sodium salt |
| DCBP-2S: | 5,5'-carbonylbis(2-chlorobenzenesulfonic acid) sodium salt |
| DNBP-2S: | 5,5'-carbonylbis(3-nitrobenzenesulfonic acid) sodium salt |
| SDCDPS: | 5,5'-sulfonylbis(2-chlorobenzylsulfonic acid) sodium salt |
| SDFDPS: | 5,5'-sulfonylbis(2-fluorobenzylsulfonic acid) sodium salt |
| DFBP: | 4,4'-difluorobenzophenone |
| DCBP: | 4,4'-dichlorobenzophenone |
| DNBP: | 3,3'-dinitrobenzophenone |
| DCDPS: | 4,4'-dichlorodiphenylsulfone |
| DFDPS: | 4,4'-difluorodiphenylsulfone |
| BisA: | bisphenol A |
| BisF: | bisphenol F |
| HQ: | hydroquinone |
| DHBP: | 4,4'-dihydroxybiphenyl |
| DHDFS: | 4,4'-dihydroxydiphenylsulfone |
| dMe-HQ: | 2,6-dimethylhydroquinone |
| tMe-BisA: | 2,2-bis(3,5-dimethyl-4-hydroxyphenyl)propane |
| tMe-BP: | 3,3',5,5'-tetramethyl-4,4'-dihydroxybiphenyl |
| tMe-MPH: | 3,3',5,5'-tetramethyl-4,4'-dihydroxydiphenyl-methane |
| tMe-OPH: | 3,3',5,5'-tetramethyl-4,4'-dihydroxydiphenyl ether |
| tMe-SPH: | 3,3',5,5'-tetramethyl-4,4'-dihydroxydiphenyl-sulfide |
| tMe-SOPH: | 3,3',5,5'-tetramethyl-4,4'-dihydroxydiphenyl-sulfone |
| tMe-BisP: | α,α'-bis(3,5-dimethyl-4-hydroxyphenyl)-1,4-di-isopropylbenzene |
| dMe-BDSA: | 5,5'-dimethyl-4,4'-diamino-2,2'-diphenyldisulfonic acid sodium salt |
| BDSA: | 4,4'-diamino-2,2'-biphenyldisulfonic acid sodium salt |
| DABP: | 4,4'-diaminobenzophenone |
| NTDA: | 1,4,5,8-naphthalenetetracarboxylic dianhydride |
| 3EP: | 3-ethynylphenol |
| 4EFB: | 4-ethynylfluorobenzene |

Comparative Example 1

Physical properties were measured in the same manner as in Example 1, using Nafion membrane (membrane thickness of 50 m) (reagent available from Aldrich Corp.). Tg was 130° C. and the measurement results of ion conductivity are shown in Table 4.

TABLE 3

| Example | Dihydroxyl compound g, (mol) | Protonic acid compound g, (mol) | Dihalide compound g, (mol) | Yield % | Reduced viscosity dl/g | Glass transition temperature ° C. | 5% weight loss temperature ° C. |
|---|---|---|---|---|---|---|---|
| 7 | tMe-BisA 5.69(0.02) | DFBP-2S 6.76(0.016) | DFBP 0.87(0.004) | 90 | 0.76 | 248 | 372 |
| 8 | DMe-HQ 2.76(0.02) | DFBP-2S 4.22(0.01) | DFBP 2.18(0.01) | 93 | 1.23 | Not detected | 384 |
| 9 | DMe-HQ 2.76(0.02) | DFBP-2S 6.76(0.016) | DFBP 0.87(0.004) | 92 | 0.92 | Not detected | 394 |
| 10 | tMe-BP 4.84(0.02) | DFBP-2S 4.22(0.01) | DFBP 2.18(0.01) | 94 | 1.16 | 255 | 363 |
| 11 | tMe-BP 4.84(0.02) | DFBP-2S 6.76(0.016) | DFBP 0.87(0.004) | 93 | 1.06 | Not detected | 327 |

TABLE 3-continued

| Example | Dihydroxyl compound g, (mol) | Protonic acid compound g, (mol) | Dihalide compound g, (mol) | Yield % | Reduced viscosity dl/g | Glass transition temperature ° C. | 5% weight loss temperature ° C. |
|---|---|---|---|---|---|---|---|
| 12 | tMe-MPH 5.13(0.02) | DFBP-2S 4.22(0.01) | DFBP 2.18(0.01) | 91 | 1.01 | Not detected | 332 |
| 13 | tMe-MPH 5.13(0.02) | DFBP-2S 6.76(0.016) | DFBP 0.87(0.004) | 92 | 0.86 | Not detected | 326 |
| 14 | tMe-OPH 5.17(0.02) | DFBP-2S 4.22(0.01) | DFBP 2.18(0.01) | 94 | 1.06 | Not detected | 346 |
| 15 | tMe-OPH 5.17(0.02) | DFBP-2S 6.76(0.016) | DFBP 0.87(0.004) | 92 | 0.85 | Not detected | 352 |
| 16 | tMe-SPH 5.49(0.02) | DFBP-2S 4.22(0.01) | DFBP 2.18(0.01) | 92 | 0.82 | Not detected | 343 |
| 17 | tMe-SPH 5.49(0.02) | DFBP-2S 6.76(0.016) | DFBP 0.87(0.004) | 96 | 0.73 | Not detected | 346 |
| 18 | tMe-SOPH 6.13(0.02) | DFBP-2S 4.22(0.01) | DFBP 2.18(0.01) | 93 | 0.89 | Not detected | 362 |
| 19 | tMe-SOPH 6.13(0.02) | DFBP-2S 6.76(0.016) | DFBP 0.87(0.004) | 94 | 0.71 | Not detected | 352 |
| 20 | tMe-BisP 8.05(0.02) | DFBP-2S 4.22(0.01) | DFBP 2.18(0.01) | 95 | 1.01 | 255 | 358 |
| 21 | tMe-BisP 8.05(0.02) | DFBP-2S 6.76(0.016) | DFBP 0.87(0.004) | 97 | 0.86 | 277 | 374 |
| 22 | tMe-BisA 5.69(0.02) | DFBP-2S 4.22(0.01) | DCBP 2.51(0.01) | 95 | 0.76 | Not detected | 351 |
| 23 | DMe-HQ 2.76(0.02) | DFBP-2S 4.22(0.01) | DNBP 2.72(0.01) | 92 | 0.68 | Not detected | 342 |
| 24 | tMe-BP 4.84(0.02) | DCBP-2S 4.55(0.01) | DCBP 2.51(0.01) | 90 | 0.65 | Not detected | 362 |
| 25 | tMe-BP 4.84(0.02) | DCBP-2S 4.55(0.01) | DNBP 2.72(0.01) | 93 | 0.72 | Not detected | 354 |
| 26 | tMe-BisP 8.05(0.02) | DNBP-2S 4.76(0.01) | DNBP 2.72(0.01) | 91 | 0.62 | Not detected | 343 |
| 27 | tMe-BisP 8.05(0.02) | DNBP-2S 4.76(0.01) | DFBP 2.18(0.01) | 94 | 0.69 | Not detected | 358 |

TABLE 4

| | Conductivity (S/cm) | | | |
|---|---|---|---|---|
| Example | (a) (30° C./ 90° C.) | (b) (30° C./ 90° C.) | (c) (30° C./ 90° C.) | (d) (30° C./ 90° C.) |
| 7 | 0.034/0.082 | 0.095/0.337 | 0.030/0.091 | 0.054/0.301 |
| 8 | 0.029/0.073 | 0.082/0.296 | 0.021/0.084 | 0.051/0.245 |
| 9 | 0.039/0.098 | 0.102/0.352 | 0.036/0.103 | 0.062/0.382 |
| 10 | 0.018/0.070 | 0.050/0.155 | 0.020/0.075 | 0.024/0.139 |
| 11 | 0.036/0.089 | 0.098/0.336 | 0.032/0.095 | 0.059/0.316 |
| 12 | 0.020/0.069 | 0.049/0.150 | 0.018/0.072 | 0.022/0.140 |
| 13 | 0.035/0.091 | 0.096/0.336 | 0.032/0.094 | 0.055/0.315 |
| 14 | 0.021/0.071 | 0.050/0.148 | 0.016/0.073 | 0.023/0.138 |
| 15 | 0.036/0.090 | 0.098/0.341 | 0.033/0.095 | 0.056/0.321 |
| 16 | 0.023/0.070 | 0.047/0.158 | 0.017/0.082 | 0.024/0.139 |
| 17 | 0.038/0.092 | 0.099/0.331 | 0.031/0.097 | 0.054/0.335 |
| 18 | 0.021/0.072 | 0.045/0.162 | 0.015/0.089 | 0.026/0.135 |
| 19 | 0.035/0.095 | 0.096/0.318 | 0.030/0.093 | 0.055/0.328 |
| 20 | 0.014/0.055 | 0.038/0.132 | 0.012/0.058 | 0.019/0.122 |
| 21 | 0.029/0.074 | 0.088/0.294 | 0.025/0.086 | 0.043/0.278 |
| 22 | 0.017/0.062 | 0.046/0.145 | 0.016/0.066 | 0.020/0.129 |
| 23 | 0.025/0.070 | 0.079/0.275 | 0.018/0.081 | 0.049/0.243 |
| 24 | 0.019/0.069 | 0.049/0.152 | 0.019/0.072 | 0.023/0.135 |
| 25 | 0.018/0.065 | 0.045/0.146 | 0.018/0.076 | 0.031/0.132 |
| 26 | 0.012/0.051 | 0.032/0.126 | 0.011/0.055 | 0.017/0.120 |
| 27 | 0.013/0.050 | 0.030/0.122 | 0.013/0.058 | 0.018/0.123 |
| Comparative example 1 | not measured | not measured | not measured | 0.020/0.131 |

It is noted from Table 4 that the membranes of Examples 7 through 27 all show excellent ion conductivity equivalent to the Nafion membrane of Comparative Example 1. It is also noted that TG is sufficiently higher than 130° C. with the Nafion membrane, indicating that heat resistance is markedly improved.

Example 28

In a 200 ml five-necked reactor equipped with a nitrogen-introducing tube, a thermometer, a reflux condenser and a stirrer, 5.69 g (20 mmols) of tMe-BisA and 3.46 g (25 mmols) of potassium carbonate were weighed and charged. After 20 ml of dimethyl acetamide (DMAc) and 30 ml of toluene were added to the mixture, the mixture was heated at 130° C. while stirring under a nitrogen atmosphere to remove water generated out of the system for 4 hours and then distill toluene off. Subsequently, 4.91 g (10 mmols) of SDCDPS obtained in Synthesis Example 2, 2.18 g (10 mmols) of DFBP and 20 ml of DMAc were added to the reaction mixture. The reaction was carried out at 165° C. for 20 hours to give a viscous polymer solution. To the solution obtained, 60 ml of DMAc was added for dilution followed by filtration through Celite. The filtrate was discharged into 600 ml of toluene. The polymer powders precipitated were filtered and dried at 160° C. for 4 hours to give the polymer powders. The results of the synthesis are shown in Table 5.

The powdery polymer obtained was dissolved in DMAc and the solution was cast on a glass substrate. Drying at 200° C. for 4 hours gave the polyether ketone membrane containing sulfonic acid sodium salt group. The membrane obtained was crosslinked by the method described in (v-2) and the crosslinked polyether ketone membrane having sulfonic acid sodium salt group was obtained. Subsequently, proton exchange was performed by the method described in (iv) above to give the crosslinked polyether ketone membrane having sulfonic acid group. The membrane thus obtained was very flexible and tough. The ion conductivity and methanol solubility of this membrane were measured by the methods described in (vii) and (viii) above, respectively. The results are shown in Table 6.

Examples 29-31

All kinds of polyether ketone powder were prepared in the same manner as in Example 28, except that the kind and proportion of each aromatic dihydroxyl compounds, aromatic dihalide compounds having a protonic acid group and aromatic dihalide compounds were changed. From the polymer powder obtained, cast membranes were prepared and crosslinked by the method described in (v-1). Furthermore, proton exchange was performed by the method described in (iv) to give crosslinked polyether ketone membranes having sulfonic acid group. The results of synthesis are shown in Table 5, and each physical properties of the polyether ketone powder and membranes obtained are also shown in Table 6.

Comparative Examples 2-4

Polyether membranes were prepared from aromatic dihydroxyl compounds, aromatic dihalide compounds having a protonic acid group and aromatic dihalide compounds, without using compounds containing any crosslinkable group, but otherwise in the same manner as in Example 28. The results of synthesis of the polyethers obtained are shown in Table 5, and the measurement results of various physical properties are shown in Table 6, including the results of Comparative Example 1.

TABLE 5

| Example | Sulfonated dihalide compound g(mmol) | Dihalide compound g(mmol) | Dihydroxyl compound g(mmol) | Ion-exchange equivalent weight a g/eq | Yield % | Reduced Viscosity dl/g |
|---|---|---|---|---|---|---|
| 28 | SDCDPS 4.91(10) | DFBP 2.18(10) | tMe-BisA 5.69(20) | 570 | 92 | 1.02 |
| 29 | SDCDPS 2.95(6) | DFBP 3.52(14) | tMe-BisA 5.69(20) | 890 | 94 | 0.99 |
| 30 | SDCDPS 6.88(14) | DFBP 1.51(6) | tMe-BisA 5.69(20) | 570 | 92 | 1.03 |
| 31 | SDCDPS 4.91(10) | DCBP 2.51(10) | tMe-MPH 5.13(20) | 540 | 92 | 1.07 |
| Comp. Example 2 | SDCDPS 4.91(10) | DCDPS 2.87(10) | BisA 4.57(20) | 550 | 93 | 1.02 |
| Comp. Example 3 | SDCDPS 2.95(6) | DCDPS 4.02(14) | BisA 4.57(20) | 840 | 92 | 1.11 |
| Comp. Example 4 | SDCDPS 2.95(2) | DCDPS 4.02(18) | BisA 4.57(20) | 1210 | 92 | 1.14 | a: Calculated value

TABLE 6

| Example | Glass transition temperature (° C.) | 5% weight loss temperature (° C.) | Conductivity (S/cm) (30° C./90° C.) | MeOH Solubility (Wt %) |
|---|---|---|---|---|
| 28 | Not detected | 391 | 0.069/0.214 | 4.8 |
| 29 | Not detected | 395 | 0.013/0.106 | 1.2 |
| 30 | Not detected | 393 | 0.072/0.220 | 4.2 |
| 31 | Not detected | 390 | 0.070/0.235 | 4.1 |
| Comparative example 2 | 204 | 412 | 0.070/0.247 | 100 |
| Comparative example 3 | 200 | 410 | 0.013/0.146 | 49 |
| Comparative example 4 | 198 | 407 | 0.003/0.019 | 0.7 |
| Comparative example 1 | 130 | Not measured | 0.020/0.131 | Not measured |

It is clearly noted from Table 6 that methanol tolerance is improved in Examples 28 through 31, as compared to the uncrosslinked polyethers of Comparative Examples 2 and 3. It is also noted that the ion conductivity is equivalent to or higher than that of the Nafion membrane of Comparative Examples 1. Tg is sufficiently higher than 130° C. of the Nafion membrane, that indicates markedly improved heat resistance.

Example 32

In a 200 ml five-necked reactor equipped with a nitrogen introducing tube, a thermometer and a stirrer, 9.99 g (24.0 mols) of dMe-BDSA, 3.40 g (16.0 mmols) of DABP and 36.3 g of DMAc were charged and dissolved while stirring at room temperature. Subsequently, 10.73 g (40 mmols) of NTDA was added together with 20.1 g of DMAc, and stirred at room temperature for 24 hours. The reduced viscosity of the polyamic acid obtained was 0.81 dl/g (DMAc).

A 30.0 wt % solution of the polyamic acid obtained was cast onto a glass plate and heated in an inert oven in a nitrogen atmosphere under normal pressure by elevating the temperature to 280° C. over 4 hours and maintaining at 280° C. for 4 hours for removal of DMAc and imidation. After photo-crosslinking by the method described in (v-2) above, the glass plate was dipped in water to peel the membrane off, and the sulfonic acid group was reverted from the sodium salt type to the free protonic acid type by the method described in (iv) above. The membrane obtained was very flexible and tough. The results of measurement of ion conductivity by the method in (vii) above, the result of measurement of methanol solubility by the method in (viii) above, the result of measurement of methanol permeability by the method in (ix) above and the result of measurement of ion-exchange equivalent weight by the method in (x) above of this membrane are shown in Table 7.

Example 33

Polycondensation was carried out in the same manner as in Example 32, except that 5.96 g (24.0 mmols) of 3,5-diamino-2,4,6-trimethylbenzenesulfonic acid sodium salt and 3.40 g (16.0 mmols) of DABP as aromatic diamines, 26.9 g of DMAc for charging the aromatic diamine and 20.0 g of DMAc for charging NTDA were employed. The reduced viscosity (DMAc) was 0.70 dl/g. A cast membrane was prepared in the same manner as in Example 32, using 30 wt % solution of the polyamic acid obtained, followed by photo-crosslinking, peeling off the membrane from the glass plate and proton exchange. Various physical properties were measured in the same manner as in Example 32, and the measurement results are shown in Table 7.

Example 34

In a 200 ml reactor, 8.33 g (20.0 mmols) of dMe-BDSA, 4.25 g (20.0 mmols) of DABP, 18.8 g of pyridine and 100 ml of DMAc as a solvent were charged. Solution of 8.42 g (40.0 mmols) of anhydrous benzenetrimellitic acid chloride in 20 ml of DMAc was added dropwise to the mixture, and stirred for 24 hours at room temperature. The reaction solution was filtered through Celite and the filtrate was concentrated to about 100 ml of total amount. A cast membrane was prepared in the same manner as in Example 32, followed by photo-crosslinking and proton exchange. Various physical properties were measured in same manner as in Example 32, and the measurement results are shown in Table 7.

Example 35

In a 200 ml five-necked reactor, 8.33 g (20.0 mmols) of dMe-BDSA, 120 ml of DMAc, 9.4 g of pyridine and 3.6 g of lithium chloride were charged to dissolve the diamine. After the solution was cooled to −5° C., a solution of 6.14 g (20.0 mmols) of 3,3'-benzophenonedicarboxylic acid chloride in 20 ml of DMAc was added dropwise to the solution. After the dropwise addition, the mixture was stirred for 24 hours at room temperature. The resulting solution was diluted with 50 ml of DMAc and the dilution was filtered through Celite. The filtrate was discharged into 500 ml of toluene. The polymer powder precipitated were filtered and dried at 150° C. for 4 hours to give 9.17 g (yield, 70.5%) of the polymer powder. The reduced viscosity of the polymer obtained was 0.69 dl/g (DMAc).

After 5.0 g of the polymer was dissolved in 20 ml of DMAc, the solution was cast onto a glass plate. The temperature was elevated in an inert oven to 200° C. over 4 hours in a nitrogen atmosphere under normal pressure and maintained at 200° C. for 4 hours to remove DMAc. Photo-crosslinking, peeling off the membrane and proton exchange were performed in the same manner as in Example 32. The results of various measurements on this membrane are shown in Table 7.

Example 36

Photo-crosslinkable sulfonated polyamide was synthesized using 4.16 g (10.0 mmols) of dMe-BDSA as the aromatic diamine and 2.54 g (10.0 mmols) of bis(3,5-dimethyl-4-amino-phenyl)-methane, otherwise in the same manner as in Example 35. The obtained amount and reduced viscosity were 8.10 g (yield, 71.1%) and 0.74 dl/g (DMAc), respectively. A cast membrane was prepared in the same manner as in Example 35 followed by photo-crosslinking and proton exchange. The measurement results are shown in Table 7.

Example 37

Photo-crosslinkable sulfonated polyamide was synthesized in the same manner as in Example 35, except that a mixture of 4.16 g (10.0 mmols) of dMe-BDSA and 2.12 g (10.0 mmols) of DABP as the aromatic diamine and 4.06 g (20.0 mmols) of terephthalic acid chloride as the dicarboxylic acid chloride were used. The obtained amount and reduced viscosity were 6.60 g (yield, 74.2%) and 0.64 dl/g (DMAc), respectively. A cast membrane was prepared as in Example 35 followed by photo-crosslinking and proton exchange. The measurement results are shown in Table 7.

Example 38

In a 200 ml five-necked reactor equipped with a nitrogen-introducing tube, a thermometer, a condenser and a stirrer, 7.23 g (25.0 mmols) of 3,3'-diamino-4,4'-dihydroxy-biphenyl dihydrochloride and 120 g of polyphosphoric acid were charged, and stirred at 200° C. for an hour. Then, 2.78 g (12.5 mmols) of tetramethylterephthalic acid and 3.38 g (12.5 mmols) of 4,4'-benzophenonedicarboxylic acid were added to the mixture. And the mixture was stirred at 200° C. for an hour. The reaction solution was discharged into 2000 ml of ion-exchanged water. The polymer precipitated was washed with water and methanol. The polymer was then dried at 160° C. for 4 hours to give 7.83 g (yield, 77.1%) of the polymer powders.

In a 100 ml five-necked reactor equipped with a nitrogen-introducing tube, a condenser, a dropping funnel, a thermometer, and a stirrer, 6.00 g of this polymer and 40 ml of conc. sulfuric acid were charged and dissolved. To the mixture, 5 ml of chlorosulfonic acid was added dropwise. After the dropwise addition, the mixture was stirred at room temperature for 6 hours. The reaction solution was poured onto 400 ml of ion-exchanged water and the polymer precipitated was washed with ion-exchanged water until the wash liquid became neutral. The polymer was dried at 100° C. for 6 hours in an inert oven under a nitrogen atmosphere to give 5.75 g of proton type sulfonated polybenzoxazole. The reduced viscosity of the polymer obtained was 0.65 dl/g (DMAc).

After 5.0 g of the polymer was dissolved in 18 ml of DMAc, the solution was cast onto a glass plate. The temperature was elevated in an inert oven to 150° C. over 4 hours in a nitrogen atmosphere under normal pressure and maintained at 150° C. for 4 hours to remove DMAc. The cast membrane obtained was photo-crosslinked in the same manner as in Example 32, and the membrane was peeled off. The measurement results of the membrane obtained are shown in Table 7.

Synthesis Example 4

After 8.73 g (40 mmols) of DFBP, 9.13 g (40 mmols) of bis(3-methyl-4-hydroxyphenyl)methane and 6.91 g (50 mmols) of potassium carbonate were charged into the reactor in the same manner as in Example 1. 80 ml of DMSO and 60 ml of toluene were added to the mixture. The mixture was stirred under heating at 130° C. for 4 hours. Toluene was distilled off at 150° C. Subsequently, the reaction was carried out at 160° C. for 10 hours to give a viscous polymer solution. 200 ml of DMSO was added to the solution obtained for diluting, and the dilution was filtered through Celite. The polymer solution was poured onto 800 ml of methanol. The polymer powder precipitated were filtered and dried at 160° C. for 4 hours to give 13.3 g (yield, 82%) of the polymer powder. The reduced viscosity of the polyether ketone powder was 1.14 dl/g (DMSO).

Example 39

In a 50 ml reactor equipped with a nitrogen-introducing tube, a dropping funnel, a thermometer and a stirrer, 5.01 g of the polyether ketone synthesized in Synthesis Example 4 and 20 ml of conc. sulfuric acid were charged and dissolved. To the mixture, 1.39 g of chlorosulfonic acid was added dropwise under a nitrogen atmosphere. After the dropwise addition, the mixture was stirred at room temperature for 6 hours. The reaction solution was poured onto 300 ml of ion-exchanged water and the polymer precipitated was washed with ion-exchanged water until the wash liquid became neutral. The polymer was dried at 100° C. for 6 hours in an inert oven under a nitrogen atmosphere to give 5.02 g of proton type sulfonated polyetheretherketone.

The powdery polymer obtained was dissolved in DMSO, and the solution was cast on a glass substrate. After drying at 150° C. for 4 hours, a polyether ketone membrane having sulfonic acid group was obtained. The resulting membrane was very flexible and tough. The membrane obtained was crosslinked by the method described in (v-2) above to give a crosslinked polyether ketone membrane having sulfonic acid group. The resulting membrane was very flexible and tough. Various physical properties of this membrane were measured as in Example 32. The measurement results are shown in Table 7.

Also, the weight loss initiation temperature of the thus obtained crosslinked polyether ketone membrane having sulfonic acid group, which was caused by elimination of the sulfonic acid group, was determined as in Example 1 (e) and found to be at 235° C.

Example 40

In a 100 ml reactor equipped with a nitrogen-introducing tube, a thermometer and a stirrer, 4.06 g of the polyether ketone synthesized in Synthesis Example 4, 2.45 g (0.02 mol) of propanesulfone and 10 ml of nitrobenzene were charged. While stirring, 2.9 g (0.022 mol) of anhydrous aluminum chloride was charged. The mixture was heated at 210° C. for 8 hours. Then, the reaction mixture was discharged into 100 ml of ice water added with 5 ml of conc. hydrochloric acid to terminate the reaction. The reaction solution was dropwise added to 200 ml of distilled water to precipitate the polymer. After filtration, the polymer was washed with distilled water. The polymer was dried at 150° C. overnight in vacuum.

A cast membrane was prepared in the same manner as in Example 39 and then photo-crosslinked. Various physical properties were measured as in Example 39. The measurement results are shown in Table 7.

Example 41

In a five-necked reactor equipped with a nitrogen-introducing tube, a thermometer, a reflux condenser and a stirrer, 4.36 g (0.02 mol) of DFBP, 3.46 g (0.005 mol) of 2,2-bis[3,5-bis(sulfo-methyl)-4-hydroxyphenyl]propane sodium salt, 3.85 g (0.015 mol) of tMe-BisF and 3.46 g (0.025 mol) of potassium carbonate were weighed and charged. After 50 ml of DMSO and 30 ml of toluene were added to the mixture, the mixture was heated at 130° C. to remove water generated of the system for 4 hours and then distill toluene off. The reaction was carried out at 160° C. for further 14 hours to give a viscous polymer solution. To the solution, 20 ml of DMSO was added for dilution and the dilution was then filtered. The polymer solution was discharged into 400 ml of toluene, and pulverized and washed in 400 ml of acetone. The polymer powder was filtered and then dried at 160° C. for 4 hours to give 7.17 g (yield, 66%) of polyether ketone powder having alkyl sulfonic acid salt. The reduced viscosity of the resulting polyether ketone powders was found to be 0.68 dl/g (DMSO).

A cast membrane was prepared in the same manner as in Example 39, then photo-crosslinked, and proton-exchanged by the method described in (iv). Various physical properties were measured in the same manner as in Example 32. The measurement results are shown in Table 7.

Example 42

Using 4.36 g (0.02 mol) of DFBP as the aromatic dihalide compound, 2.19 g (0.01 mol) of sodium 2,5-dihydroxybenzene-sulfonate as the sulfonated diols and 1.66 g (0.01 mol) of tetramethylhydroquinone, polymerization and post-treatment were carried out otherwise in the same manner as in Example 41. The obtained amount and reduced viscosity was 5.79 g (yield, 78%) and 0.89 dl/g (DMSO), respectively.

A cast membrane was prepared, photo-crosslinked and proton-exchanged as in the same manner as in Example 41. Various physical properties were measured in the same manner as in Example 32. The measurement results are shown in Table 7.

Also, the weight loss initiation temperature of the thus obtained crosslinked polyether ketone membrane having sulfonic acid group, which was be caused by elimination of the sulfonic acid group, was determined as in Example 1 (e) and found to be 239° C.

Comparative Example 5

Polycondensation was carried out in the same manner as in Example 32, except that 9.32 g (24.0 mmols) of BDSA and 2.95 g (16.0 mmols) of 4,4'-diaminobiphenyl as aromatic diamine were used, 31.2 g of DMAc was used for charging the aromatic diamines, and the amount of DMAC was made 20.0 g in charging NDTA. The reduced viscosity of the polyamic acid precursor was 0.75 dl/g (DMAc). A cast membrane of sulfonated polyimide was prepared from 30 wt % solution of the polyamic acid obtained in the same manner as in Example 32, followed by photo-crosslinking and proton exchange. Various physical properties were measured as in Example 32. The measurement results are shown in Table 7.

Comparative Example 6

Using 6.89 g (20.0 mmols) of BDSA as aromatic diamine, polycondensation was carried out otherwise in the same manner as in Example 34 to give 7.27 g (yield, 67.2%) of the sulfonated polyamide powder. The reduced viscosity of the polymer obtained was 0.62 dl/g (DMAc).

A cast membrane was prepared, photo-crosslinked and proton-exchanged as in Example 35, except that the drying temperature was changed to 170° C. Various physical properties were measured as in Example 32. The measurement results are shown in Table 7, together with the results in Comparative Example 1.

TABLE 7

| Example | Ion-exchange equivalent weight (g · eq$^{-1}$) | Membrane thickness (μm) | Ion conductivity at 90° C. (S · cm$^{-1}$) | MeOH solubility (Wt %) | MeOH permeability (μmol · cm$^{-2}$ · min$^{-1}$) |
|---|---|---|---|---|---|
| 32 | 450 | 51 | 0.14 | 3.1 | 3.2 |
| 33 | 760 | 47 | 0.07 | 0.7 | 2.1 |
| 34 | 450 | 44 | 0.06 | 4.2 | 3.8 |
| 35 | 300 | 52 | 0.08 | 7.8 | 6.2 |
| 36 | 550 | 48 | 0.06 | 2.9 | 3.0 |
| 37 | 420 | 48 | 0.06 | 4.0 | 4.3 |
| 38 | 460 | 46 | 0.10 | 5.4 | 4.2 |
| 39 | 570 | 54 | 0.19 | 3.0 | 4.1 |
| 40 | 710 | 51 | 0.15 | 1.0 | 3.4 |
| 41 | 530 | 55 | 0.23 | 1.8 | 4.2 |
| 42 | 720 | 52 | 0.12 | 2.4 | 3.3 |
| Comparative example 5 | 430 | 49 | 0.09 | 23.6 | 17.1 |
| Comparative example 6 | 270 | 48 | Unmeasurable due to dissolution | 58 | Unmeasurable due to dissolution |
| Comparative example 7 | 1100 | 50 | 0.13 | 0 | 11.7 |

It is clearly noted that in Examples 32 through 42, the methanol solubility is lower than with the uncrosslinked polymers of Comparative Examples 5 and 6, namely, methanol tolerance is markedly improved. It is also noted that the ion conductivity is in the order substantially equivalent to that of the Nafion membrane in Comparative Example 1, but the methanol permeability is lower.

when the crosslinked polyether membranes having sulfonic acid group of Examples 28, 30, 31, 39 and 41, which have the ion-exchange equivalent weight of 400 to 600 g·eq$^{-1}$, are compared to the crosslinked polyimide, polyamideimide, polyamide and polyazole membranes having sulfonic acid group of Examples 32, 34, 36, 37 and 38, which have substantially the same ion-exchange equivalent weight, the ion conductivity at 90° C. is higher in the crosslinked polyether membranes, showing that the crosslinked polyether membranes are more preferable as the crosslinkable aromatic resin having a protonic acid group for fuel cells.

Synthesis Example 5

In a 500 ml reactor equipped with a nitrogen-introducing tube, a dropping funnel, a thermometer and a stirrer, 50 g of the polyetheretherketone (PEEK450P manufactured by Victrex Inc.) and 200 ml of conc. sulfuric acid were charged and dissolved. Under a nitrogen atmosphere, 70 ml of chlorosulfonic acid was added dropwise to the mixture. After the dropwise addition, the mixture was stirred at room temperature for 6 hours. The reaction solution was poured onto 3000 ml of ion-exchanged water and the polymer precipitated was washed with ion-exchanged water until the wash liquid became neutral. The polymer was dried at 100° C. for 6 hours in an inert oven under a nitrogen atmosphere to give 68.1 g of proton type sulfonated polyetheretherketone. 50 g of the proton type sulfonated polyetheretherketone obtained was treated with NaOH to convert into the Na salt type sulfonated polyetheretherketone.

Synthesis Example 6

In a 200 ml five-necked reactor equipped with a nitrogen-introducing tube, a thermometer and a stirrer, 15.53 g (40.0 mmols) of BDSA and 46.1 g of DMAc were charged and dissolved. Then, 12.89 g (40.0 mmols) of 3,3',4,4'-tetracarboxylic acid benzophenone dianhydride and 20.3 g of DMAc were charged and the mixture was stirred at room temperature for 24 hours. The reduced viscosity of a 30.0 wt % amidic acid varnish obtained was 0.72 dl/g (DMAc).

Synthesis Example 7

In a 200 ml five-necked reactor equipped with a nitrogen-introducing tube, a thermometer, a dropping funnel, a reflux condenser and a stirrer, 7.77 g (20.0 mmols) of BDSA, 70 ml of DMAc, 4.7 g of pyridine and 1.8 g of lithium chloride were charged to dissolve the diamine. After the solution was cooled to −5° C., a solution of 6.14 g (20.0 mmols) of 3,3'-benzophenone-dicarboxylic acid chloride in 20 ml of DMAc was added dropwise to the solution. After completion of the dropwise addition, the mixture was stirred at room temperature for 24 hours. The resulting solution was diluted with 50 ml of DMAc and the dilution was filtered through Celite. The filtrate was discharged into 500 ml of toluene. The polymer powder precipitated was filtered and dried at 160° C. for 4 hours to give 8.52 g (yield, 71%) of the polymer powder. The reduced viscosity of the polymer obtained was 0.85 dl/g (DMAc).

Synthesis Example 8

4.36 g (20 mmols) of DFBP, 5.69 g (20 mmols) of tMe-BisA and 3.46 g (25 mmols) of potassium carbonate were weighed and charged. 40 ml of DMSO, and 30 ml of toluene were added to the mixture in the same manner as in Example 1. The mixture was heated at 130° C. for 4 hours while stirring under a nitrogen atmosphere to remove water generated out of the system, and then toluene was distilled off at 150° C. The reaction was carried out at 160° C. for further 10 hours to give a viscous polymer solution. To the solution 100 ml of DMSO was added for diluting and the dilution was then filtered through Celite. The polymer solution was discharged into 400 ml of methanol. The polymer powder was filtered and then dried at 160° C. for 4 hours to give 7.77 g (yield, 84%) of the polymer powder. The reduced viscosity of the resulting polyether ketone powder was 1.06 dl/g (DMSO).

Synthesis Example 9

After 11.48 g (40 mmols) of DCDPS, 11.38 g (40 mmols) of tMe-BisA and 6.92 g (50 mmols) of potassium carbonate were weighed and charged, 80 ml of DMAc and 60 ml of toluene were added to the mixture in the same manner as in Synthesis Example 5. The mixture was heated while stirring at 130° C. for 4 hours to distill toluene off. The reaction was carried out at 160° C. for further 10 hours to give a viscous polymer solution. To the solution 150 ml of DMAc was added for diluting and the dilution was then filtered through Celite. The polymer solution was discharged into 600 ml of methanol. The polymer powders were filtered and then dried at 160° C. for 4 hours to give 16.34 g (yield, 82%) of the polymer powder. The reduced viscosity of the resulting polyether was 0.85 dl/g (DMAc).

Synthesis Example 10

Using 9.61 g (40 mmols) of 3,3',5,5'-tetramethyl-4,4'-biphenyl-diamine as the diamine, 29.9 g of DMAc as a solvent for dissolving the diamine, 10.81 g (40.0 mmols) of 3,3',4,4'-biphenyltetracarboxylic dianhydride as the tetracarboxylic dianhydride and 18.2 g of DMAc for thoroughly washing the tetracarboxylic dianhydride, 29.8 wt % varnish of the polyamic acid was prepared otherwise under the same conditions as in Synthesis Example 6. The reduced viscosity of the resulting polyamic acid was 0.66 dl/g (DMAc).

Synthesis Example 11

In a 200 ml five-necked reactor equipped with a nitrogen-introducing tube, a thermometer and a stirrer, 11.48 g (20 mmols) of 2,2-bis[(4-fluorophenyl)benzoxazol-6-yl]hexafluoropropane, 3.32 g (20 mmols) of tetramethylhydroquinone and 3.46 g (25 mmols) of potassium carbonate were charged. After 40 ml of N-methyl-2-pyrrolidone (NMP) and 30 ml of toluene were added to the mixture, the mixture was heated at 130° C. for 4 hours while stirring under a nitrogen atmosphere to remove water generated out of the system, and the temperature was elevated to 150° C. to distill toluene off. The reaction was carried out at 180° C. for further 20 hours to give a viscous polymer solution. After 100 ml of NMP was added to the solution for diluting, the dilution was filtered through Celite. The polymer solution was discharged into 400 ml of methanol. The polymer powder precipitated were filtered and dried at 160° C. for 4 hours to give 7.84 g (yield, 56%) of the polymer powder. The reduced viscosity of the polybenzoxazole powder obtained was 0.59 dl/g (NMP).

Synthesis Example 12

In a 500 ml five-necked reactor equipped with a nitrogen-introducing tube, a thermometer, a reflux condenser and a stirrer, 17.46 g (80 mmols) of DFBP, 18.26 g (80 mmols) of BiSA and 13.84 g (100 mmols) of potassium carbonate were charged. After 160 ml of DMSO and 120 ml of toluene were added to the mixture, the mixture was heated at 130° C. for 4 hours while stirring under a nitrogen atmosphere to remove water generated out of the system, and the temperature was elevated to 150° C. to distill toluene off. The reaction was carried out at 160° C. for further 10 hours to give a viscous polymer solution. After 200 ml of DMSO was added to the solution for diluting, the dilution was filtered through Celite. The polymer solution was discharged into 1000 ml of methanol. The polymer powder precipitated were filtered and dried at 160° C. for 4 hours to give 28.2 g (yield, 87%) of the polymer powder. The reduced viscosity of the polyether ketone powder obtained was 0.96 dl/g (DMSO).

Synthesis Example 13

In a 200 ml five-necked reactor equipped with a nitrogen-introducing tube, a thermometer and a stirrer, 7.05 g (40.0 mmols) of 3,3'-diaminodiphenylsulfone and 30.4 g of DMAc were charged, and the mixture was dissolved while stirring. Then, 12.89 g (40.0 mmols) of 3,3',4,4'-tetracarboxylic acid benzophenone dianhydride and 16.2 g of DMAc were added to the solution. The mixture was stirred at room temperature for 24 hours. The reduced viscosity of a 30.0 wt % varnish of the polyamic acid obtained was 0.71 dl/g (DMAc).

Synthesis Example 14

In a 200 ml five-necked reactor equipped with a nitrogen-introducing tube, a thermometer, a dropping funnel, a reflux condenser and a stirrer, 4.97 g (20.0 mmols) of 3,3'-diamino-diphenyl-sulfone, 70 ml of DMAc, 4.7 g of pyridine and 1.8 g of lithium chloride were charged to dissolve the diamine. After the solution was cooled to −5° C., a solution of 6.14 g (20.0 mmols) of 3,3'-benzophenone-dicarboxylic acid chloride in 20 ml of DMAc was added dropwise to the solution. After the dropwise addition, the mixture was stirred at room temperature for 24 hours. The resulting solution was diluted with 50 ml of DMAc and the dilution was filtered through Celite. The filtrate was discharged into 500 ml of toluene. The polymer powder precipitated were filtered and dried at 160° C. for 4 hours to give 7.14 g (yield, 74%) of the polymer powder. The reduced viscosity of the polymer obtained was 0.72 dl/g (DMAc).

Example 43

In a 200 ml five-necked reactor equipped with a nitrogen-introducing tube, a thermometer, a reflux condenser and a stirrer, 8.45 g (20 mmols) of DFBP-2S, 5.69 g (20 mmols) of tMe-BisA and 3.46 g (25 mmols) of potassium carbonate were charged. After 40 ml of DMSO and 30 ml of toluene were added to the mixture, the mixture was heated at 130° C. for 4 hours while stirring under a nitrogen atmosphere to remove water generated out of the system, and then toluene was distilled off at 150° C. The reaction was carried out at 160° C. for further 10 hours to give a viscous polymer solution. After 100 ml of DMSO was added to the solution for diluting, the dilution was filtered through Celite. The polymer solution was discharged into 400 ml of toluene. The polymer powder precipitated was washed with acetone. The polymer powder obtained was dried at 160° C. for 4 hours to give 10.53 g (yield, 79%) of the polymer powder. The reduced viscosity of the sulfonated polyether ketone powder obtained was 0.78 dl/g (DMSO, 35° C.).

A cast membrane was prepared from the polymer powder obtained, photo-crosslinked and proton-exchanged in the same manner as in Example 41. The ion-exchange equivalent weight of the photo-crosslinked membrane was 320 g·eq$^{-1}$. And the methanol solubility was determined by the procedure of (viii) and found to be 10.5 wt %.

Synthesis Example 15

In a 300 ml five-necked reactor equipped with a nitrogen-introducing tube, a thermometer, a reflux condenser and a stirrer, 5.69 g (20 mmols) of tMe-BisA and 3.46 g (25 mmols) of potassium carbonate were charged. After 20 ml of DMAc and 30 ml of toluene were added to the mixture, the mixture was heated at 130° C. while stirring under a nitrogen atmosphere to remove water generated out of the system for 4 hours and then distill toluene off. Subsequently, 9.82 g (20 mmols) of SDCDPS and 20 ml of DMAc were added to the mixture and the reaction was carried out at 165° C. for further 20 hours to give a viscous polymer solution. After 40 ml of DMAc was added to the solution for diluting, the dilution was filtered through Celite. The polymer solution was discharged into 400 ml of toluene. The polymer precipitated was washed with toluene. The polymer powder obtained was dried at 160° C. for 4 hours to give 10.96 g (yield, 78%) of the polymer powder. The reduced viscosity of the polyether obtained was 0.62 dl/g (DMAc).

Synthesis Example 16

Using 19.30 g (40 mmols) of dMe-BDSA as the diamine, 50.00 g of DMAc as a solvent for dissolving the diamine, 10.73 g (40.0 mmols) of NTDA as the tetracarboxylic dianhydride and 20.07 g of DMAc for washing and charging tetracarboxylic dianhydride, 30.0 wt % varnish of the polyamic acid was prepared otherwise under the same conditions as in Synthesis Example 13. The reduced viscosity of the resulting polyamic acid was 0.74 dl/g (DMAc).

Synthesis Example 17

In a 1000 ml five-necked reactor equipped with a nitrogen-introducing tube, a thermometer, a reflux condenser and a stirrer, 12 g of the poly(2,6-dimethyl-1,4-phenylene oxide) was dissolved in 200 g of chloroform. While stirring at room temperature, 500 g of 10 wt % chlorosulfonic acid solution in chloroform was added dropwise to the mixture. The precipitate was separated by filtration and washed with dichloromethane. After drying at 100° C. for 6 hours in an inert oven under a nitrogen atmosphere, 15.11 g of proton type sulfonated polyphenylene oxide was obtained. The proton type sulfonated polyphenylene oxide was treated with NaOH to convert into the Na salt type sulfonated polyphenylene oxide.

Synthesis Example 18

In a 200 ml five-necked reactor equipped with a nitrogen-introducing tube, a thermometer and a stirrer, 7.23 g of 3,3'-diamino-4,4'-dihydroxybiphenyl dihydrochloride and 120 g of polyphosphoric acid were charged, and the mixture was stirred at 200° C. for an hour. Then, 4.15 g of 2,5-dimethylterephthalic acid was added to the mixture, which was stirred at 200° C. for an hour. The reaction solution was discharged into 2000 ml of ion-exchanged water. The polymer precipitated was washed with water and methanol. The polymer was then dried at 160° C. for 4 hours to give 6.21 g (yield, 79%) of the polymer powder. In a 100 ml five-necked reactor equipped with a nitrogen-introducing tube, a dropping funnel, a thermometer and a stirrer, 6.00 g of this polymer was charged and dissolved in 40 ml of conc. sulfuric acid. Chlorosulfonic acid, 5 ml, was drop wise added to the solution. After completion of the dropwise addition, the mixture was stirred at room temperature for 6 hours. The reaction solution was poured onto 400 ml of ion-exchanged water. The polymer precipitated was washed with ion-exchanged water until the wash liquid became neutral. After drying at 100° C. for 6 hours in an inert oven under a nitrogen atmosphere, 6.44 g of proton type sulfonated polybenzoxazole was obtained. The reduced viscosity of the polymer obtained was 0.91 dl/g (DMAc).

Example 44

The Na salt type sulfonated polyetheretherketone, 4.86 g, synthesized in Synthesis Example 5, and 4.62 g of the polyether ketone synthesized in Synthesis Example 8 were dissolved in 20 ml of DMSO. The solution mixture was cast on a glass substrate, and heated in an inert oven in a nitrogen atmosphere under normal pressure to evaporate DMSO off by elevating the temperature to 200° C. over 4 hours and maintaining at 200° C. for 4 hours. After photo-crosslinking by the method described in (v-2) above, the glass substrate was dipped in water to peel the membrane off, and the sulfonic acid group was reverted from the sodium salt type to the free protonic acid type by the method described in (iv). The resulting membrane was very flexible and tough. The result of measurement of ion conductivity by the method in (vii) above, the result of measurement of methanol solubility by the method in (viii) above, the result of measurement of methanol permeability by the method in (ix) above and the result of measurement of ion-exchange equivalent weight by the method in (x) above of this membrane are shown in Table 8.

Example 45

Using 3.40 g of Na salt type sulfonated polyetheretherketone and 6.01 g of polyether ketone, a photo-crosslinked membrane was prepared otherwise under the same conditions as in Example 44. The measurement results are shown in Table 8.

Example 46

Using 4.98 g of the polyether synthesized in Synthesis Example 8 in place of the polyether ketone, a photo-crosslinked membrane was prepared otherwise under the same conditions as in Example 44. The measurement results are shown in Table 8.

Example 47

18.95 g of 30% DMAc solution of the sulfonated polyamic acid synthesized in Synthesis Example 6 was mixed with 13.70 g of a 29.8% DMAc solution of the polyamic acid synthesized in Synthesis Example 10. The solution mixture was cast on a glass substrate and heated in an inert oven in a nitrogen atmosphere under normal pressure to remove DMAc and effect thermal imidation by elevating the temperature to 300° C. over 4 hours and maintaining at 300° C. for 4 hours. Photo-crosslinking and proton exchange were performed in the same manner as in Example 44, and the photo-crosslinked membrane was evaluated. The results are shown in Table 8.

Example 48

6.00 g of the sulfonic acid sodium salt type polyamide synthesized in Synthesis Example 7, 17.13 g of a 29.8 wt % varnish of the polyamide synthesized in Synthesis Example 10 and 15 ml of DMAc were mixed together and dissolved. The solution mixture was cast on a glass substrate and heated in an inert oven in a nitrogen atmosphere under normal pressure to remove DMAc by elevating the temperature to 300° C. over 4 hours and maintaining at 300° C. for 4 hours. Photo-crosslinking, proton exchange and measurements were performed as in Example 44. The results are shown in Table 8.

Example 49

4.86 g of the sodium salt type sulfonated polyetheretherketone synthesized in Synthesis Example 5 and 7.00 g of the polybenzoxazole synthesized in Synthesis Example 11 were dissolved in 25 ml of NMP. The solution mixture was cast on a glass substrate and heated in an inert oven in a nitrogen atmosphere under normal pressure to remove NMP by elevating the temperature to 220° C. over 4 hours and maintained at 220° C. for 4 hours. Photo-crosslinking, proton exchange and measurements were performed as in Example 44. The results are shown in Table 8.

Example 50

4.06 g of the polyether ketone synthesized in Synthesis Example 12 and 6.67 g of the Na salt type sulfonated polyether ketone synthesized in Synthesis Example 12 were dissolved in 25 ml of DMSO. The solution mixture was cast on a glass substrate and heated in an inert oven in a nitrogen atmosphere under normal pressure to remove DMSO by elevating the temperature to 200° C. over 4 hours and maintained at 200° C. for 4 hours. After photo-crosslinking by the method described in (v-2), the glass substrate was dipped in water to peel the membrane off and the membrane was proton-exchanged by the method described in (iv). The membrane obtained was very flexible and tough. Physical properties of this membrane were measured by the methods (vii), (viii) and (x) described above. The measurement results are shown in Table 8.

Example 51

A photo-crosslinked membrane was prepared in the same manner as in Example 50, except that 4.88 g of the polyether ketone and 5.33 g of the Na salt type sulfonated polyether ketone were used in place of the polyether ketones. The measurement results are shown in Table 8.

Example 52

A photo-crosslinked membrane was prepared in the same manner as in Example 50, except that 7.03 g of the Na salt type sulfonated polyether synthesized in Synthesis Example 15 in place of the Na salt type sulfonated polyether ketones. The measurement results are shown in Table 8.

Example 53

19.00 g of a 30.0% DMAc solution of the polyamic acid synthesized in Synthesis Example 13 and 22.90 g of 30.0% DMAc solution of the sulfonated polyamic acid synthesized in Synthesis Example 16 were mixed. The solution mixture was cast on a glass substrate and heated in an inert oven in a nitrogen atmosphere under normal pressure to remove DMAc and effect thermal imidation by elevating the temperature to 300° C. over 4 hours and maintaining at 300° C. for 4 hours. Photo-crosslinking and proton exchange were performed in the same manner as in Example 50. Various measurements of the resulting photo-crosslinked membrane were carried out. The results are shown in Table 8.

Example 54

4.83 g of the polyamide synthesized in Synthesis Example 14, 22.91 g of a 30.0 wt % varnish of the sulfonated polyamide synthesized in Synthesis Example 16 and 15 ml of DMAc were mixed and dissolved. The solution mixture was cast on a glass substrate and heated in an inert oven in a nitrogen atmosphere under normal pressure to remove DMAc by elevating the temperature to 300° C. over 4 hours and maintaining at 300° C. for 4 hours. Photo-crosslinking, proton exchange and various measurements were performed as in Example 50. The results are shown in Table 8.

Example 55

4.06 g of the polyether ketone synthesized in Synthesis Example 12 and 3.87 g of the Na salt type sulfonated polyphenylene oxide synthesized in Synthesis Example 17 were dissolved in 25 ml of DMSO. The solution mixture was cast on a glass substrate and heated in a nitrogen atmosphere under normal pressure to remove DMSO by elevating the temperature to 200° C. over 4 hours in an inert oven and maintaining at 200° C. for 4 hours. Photo-crosslinking, proton exchange and various measurements were performed as in Example 50. The results are shown in Table 8.

Example 56

4.06 g of the polyether ketone synthesized in Synthesis Example 12 and 4.11 g of the sulfonated polybenzoxazole synthesized in Synthesis Example 18 were dissolved in 25 ml of DMSO. The solution mixture was cast on a glass substrate and heated in an inert oven in a nitrogen atmosphere under normal pressure to remove DMSO by elevating the temperature to 140° C. over 4 hours and maintaining at 140° C. for 4 hours. Photo-crosslinking and various measurements were performed in the same manner as in Example 50. The results are shown in Table 8.

Comparative Example 7

5.01 g of the proton type sulfonated polyetheretherketone of Synthesis Example 5 was dissolved in 15 ml of DMAc. The solution was cast on a glass plate and heated in an inert oven in a nitrogen atmosphere under normal pressure to remove DMAc by elevating the temperature to 140° C. over 4 hours and maintaining at 140° C. for 4 hours. The glass plate was dipped in toluene to peel the membrane off and dried at 140° C. The measurement results are shown in Table 8.

Comparative Example 8

Using 4.57 g (20 mmols) of BisA instead of tMe-BisA, a polyether ketone was prepared otherwise in the same manner as in Synthesis Example 8 to give 6.98 g (yield, 86%) of the polymer powder. The reduced viscosity was 1.16 dl/g (DMAc). After 4.06 g of the polyether ketone obtained and 4.43 g of the proton type sulfonated polyetheretherketone of Synthesis Example 5 were dissolved in 20 ml of DMAc, a cast membrane was prepared in the same manner as in Comparative Example 7. The measurement results are shown in Table 8.

Comparative Example 9

3.50 g of the proton type sulfonated polyetheretherketone of Synthesis Example 5 and 5.00 g of the polyether ketone of Synthesis Example 12 were dissolved in 20 ml of DMSO, and a cast membrane was prepared in the same manner as in Comparative Example 7. The measurement results are shown in Table 8.

For purposes of easier comparison, the results obtained using the Nafion membrane in Comparative Example 1 above are also shown in Table 8.

TABLE 8

| Example | Ion-exchange equivalent weight (g · eq$^{-1}$) | Ion conductivity at 90° C. (S · cm$^{-1}$) | MeOH solubility (Wt %) | MeOH permeability (μmol · cm$^{-2}$ · min$^{-1}$) |
|---|---|---|---|---|
| 44 | 470 | 0.28 | 5.7 | 3.6 |
| 45 | 630 | 0.16 | 2.5 | 2.2 |
| 46 | 490 | 0.25 | 6.2 | 4.2 |
| 47 | 560 | 0.09 | 1.5 | 2.8 |
| 48 | 540 | 0.08 | 1.7 | 2.4 |
| 49 | 600 | 0.11 | 2.4 | 1.7 |
| 50 | 520 | 0.21 | 4.4 | 3.2 |
| 51 | 620 | 0.15 | 2.7 | 2.7 |
| 52 | 530 | 0.19 | 5.0 | 4.0 |
| 53 | 590 | 0.11 | 1.9 | 2.1 |
| 54 | 550 | 0.07 | 1.4 | 3.1 |
| 55 | 530 | 0.17 | 3.2 | 7.5 |
| 56 | 680 | 0.10 | 2.4 | 4.1 |
| Comparative example 7 | 230 | Unmeasurable due to dissolution | 100 | Unmeasurable due to dissolution |
| Comparative example 8 | 440 | Unmeasurable due to dissolution | 68 | Unmeasurable due to dissolution |
| Comparative example 9 | 560 | Unmeasurable due to dissolution | 48.2 | Unmeasurable due to dissolution |
| Comparative example 1 | 1100 | 0.13 | 0 | 11.7 |

It is clearly noted that in Examples 44 through 56, the methanol solubility is smaller than with the uncrosslinked polymers of Comparative Example 7, 8 and 9; namely, the methanol tolerance is markedly improved. It is also noted that the ion conductivity is in the order substantially equivalent to that of the Nafion membrane in Comparative Example 1, but the methanol permeability is lower.

Example 57

As in Example 44, 4.86 g of Na type sulfonated polyetheretherketone synthesized in Synthesis Example 5 and 4.62 g of polyether ketone synthesized in Synthesis Example 8 were dissolved in 20 ml of DMSO. The solution mixture was cast, crosslinked and proton-exchanged in the same manner as in Example 44 except that crosslinking method was changed to the thermal crosslinking described in (viii), to prepare the ion conductive polymer membrane. Various physical properties of the membrane were measured as in Example 44. The ion-exchange equivalent weight, ion conductivity at 90° C., methanol solubility and methanol permeability were 450 g·eq$^{-1}$, 0.26S·cm$^{-1}$, 6.0 wt % and 3.1 μmol·cm$^{-2}$·min$^{-1}$, respectively.

Example 58

In a 200 ml five-necked reactor of equipped with a nitrogen-introducing tube, a thermometer, a reflux condenser and a stirrer, 4.34 g (19 mmols) of BisA, 0.24 g (2 mmols) of 3EP and 3.46 g (25 mmols) of potassium carbonate were weighed and charged. After 20 ml of DMAc and 30 ml of toluene were added to the mixture, the mixture was heated at 130° C. while stirring under a nitrogen atmosphere to remove water generated out of the system for 4 hours and then distill toluene off. Then, 4.91 g (10 mmols) of SDCDPS, 2.87 g (10 mmols) of DCDPS and 20 ml of DMAc were added to the mixture, and the reaction was carried out at 165° C. for further 20 hours to give a viscous polymer solution. After 60 ml of DMAc was added to the solution for diluting, the dilution was filtered through Celite. The polymer solution was discharged into 600 ml of toluene. The polymer powder precipitated was filtered and dried at 160° C. for 4 hours to give 9.69 g (yield, 89%) of the polymer powder. The reduced viscosity, glass transition temperature and 5% weight loss temperature of the polyether powder obtained were 0.82 dl/g (DMAc), 205° C. and 412° C., respectively.

The powdery polymer obtained was dissolved in DMAc, and the solution was cast on a glass substrate. After drying at 200° C. for 4 hours, the polyether membrane having sulfonic acid sodium salt group was obtained. The resulting membrane was crosslinked by the method described in (vi), and then proton-exchanged by the method described in (iv) to give the crosslinked polyether membrane having sulfonic acid group. The membrane obtained was very flexible and tough. The ion conductivity and methanol solubility of this membrane were measured by the procedures (vii) and (viii) described above. The measurement results are shown in Table 9.

Example 59-68

Various polyether powder was prepared by varying the kind and proportion of aromatic dihydroxy compounds, aromatic dihalide compounds having a protonic acid group and aromatic dihalide compounds. Cast membranes were prepared from the polymer powder obtained, and crosslinked by the method described in (vi). Furthermore, proton exchange was performed by the method described in (iv) to give crosslinked polyether membranes having sulfonic acid group. The results of synthesis are shown in Table 9, and the measurement results of various physical properties are shown together in Table 10.

TABLE 9

| Example | Sulfonated dihalide compound g(mmol) | Dihalide compound g(mmol) | Dihydroxyl compound g(mmol) | Compound having crosslinkable group g(mmol) | Ion-exchange equivalent weight g/eq a | Yield % | Reduced viscosity dl/g |
|---|---|---|---|---|---|---|---|
| 58 | SDCDPS 4.91(10) | DCDPS 2.87(10) | BisA 4.34(19) | 3EP 0.24(2) | 520 | 89 | 0.82 |
| 59 | SDCDPS 2.95(6) | DCDPS 4.02(14) | BisA 4.34(19) | 3EP 0.24(2) | 820 | 88 | 0.92 |
| 60 | SDCDPS 6.88(14) | DCDPS 1.72(6) | BisA 4.34(19) | 3EP 0.24(2) | 400 | 88 | 0.73 |
| 61 | SDCDPS 4.91(10) | DCDPS 2.87(10) | DHDPS 4.76(19) | 3EP 0.24(2) | 540 | 90 | 0.91 |
| 62 | SDCDPS 4.91(10) | DCDPS 2.87(10) | HQ 2.09(19) | 3EP 0.24(2) | 400 | 87 | 0.68 |
| 63 | SDCDPS 4.91(10) | DCDPS 2.87(10) | DHBP 3.54(19) | 3EP 0.24(2) | 480 | 92 | 0.92 |
| 64 | SDCDPS 4.91(10) | DCDPS 2.87(10) | BisF 4.53(19) | 3EP 0.24(2) | 500 | 90 | 0.84 |
| 65 | SDFDPS 4.58(10) | DCDPS 2.87(10) | BisA 4.34(19) | 3EP 0.24(2) | 520 | 89 | 0.85 |
| 66 | SDCDPS 4.91(10) | DFDPS 2.54(10) | BisA 4.34(19) | 3EP 0.24(2) | 520 | 84 | 0.88 |
| 67 | SFCDPS 4.58(10) | DFDPS 2.54(10) | BisA 4.34(19) | 3EP 0.24(2) | 520 | 89 | 0.88 |
| 68 | SDCDPS 4.91(10) | DCDPS 2.58(9) | BisA 4.57(20) | 4EFB 0.34(2) | 520 | 91 | 0.96 |
| Comp. example 2 | SDCDPS 4.91(10) | DCDPS 2.87(10) | BisA 4.57(20) | None | 550 | 93 | 1.02 |
| Comp. example 3 | SDCDPS 2.95(6) | DCDPS 4.02(14) | BisA 4.57(20) | None | 840 | 92 | 1.11 |
| Comp. example 4 | SDCDPS 2.95(2) | DCDPS 4.02(18) | BisA 4.57(20) | None | 1210 | 92 | 1.14 | a: Calculated value

TABLE 10

| Example | Glass transition temperature (° C.) | 5% weight loss temperature (° C.) | Conductivity (S/cm) (30° C./90° C.) | MeOH solubility (Wt %) |
|---|---|---|---|---|
| 58 | 205 | 412 | 0.073/0.232 | 2.2 |
| 59 | 201 | 406 | 0.010/0.139 | 0.4 |
| 60 | Not detected | 415 | 0.102/0.325 | 10.2 |
| 61 | 208 | 416 | 0.084/0.227 | 2.6 |
| 62 | Not detected | 401 | 0.098/0.264 | 8.0 |
| 63 | Not detected | 413 | 0.091/0.232 | 2.0 |
| 64 | 202 | 410 | 0.089/0.240 | 2.8 |
| 65 | 204 | 410 | 0.078/0.233 | 2.1 |
| 66 | 205 | 414 | 0.075/0.235 | 2.1 |
| 67 | 205 | 412 | 0.083/0.244 | 1.8 |
| 68 | 206 | 412 | 0.081/0.230 | 2.0 |
| Comparative example 2 | 204 | 412 | 0.070/0.247 | 100 |
| Comparative example 3 | 200 | 410 | 0.013/0.146 | 49 |
| Comparative example 4 | 198 | 407 | 0.003/0.019 | 0.7 |
| Comparative example 1 | 130 | Not measured | 0.020/0.131 | Not measured |

It clearly noted from Table 10 that in Examples 58 through 68, methanol tolerance is greatly improved, as compared to the uncrosslinked polyethers of Comparative Examples 2 and 3. It is also noted that the ion conductivity is equivalent to or superior to that of the Nafion membrane in Comparative Example 1, and sufficiently higher than 130° C. of the Nafion membrane, indicating that the heat resistance is markedly improved.

Example 9

In a 200 ml five-necked reactor equipped with a nitrogen-introducing tube, a thermometer, a reflux condenser and a stirrer, 4.22 g (10 mmols) of DFBP-2S, 2.18 g (10 mmols) of DFBP, 4.34 g (19 mmols) of BisA, 0.24 g (2 mmols) of 3EP and 3.46 g (25 mmols) of potassium carbonate were weighed and charged. After 40 ml of DMSO and 30 ml of toluene were added to the mixture, the mixture was heated at 130° C. while stirring under nitrogen atmosphere to remove water generated out of the system for 4 hours and then distill toluene off. Then, the reaction was carried out at 160° C. for further 20 hours to give a viscous polymer solution. After 60 ml of DMSO was added to the solution for diluting, the dilution was filtered through Celite. The polymer solution was discharged into 600 ml of toluene. The polymer powder precipitated was filtered and then dried at 160° C. for 4 hours to give 8.65 g (yield, 85%) of the polymer powder. The reduced viscosity of the polyether powder obtained was 0.76 dl/g (DMSO).

The powdery polymer obtained was dissolved in DMSO, and the solution was cast on a glass substrate. After drying at 200° C. for 4 hours, the polyether ketone membrane having sulfonic acid sodium salt was obtained. The resulting membrane was crosslinked by the method described in (vi), and then proton-exchanged by the method described in (iv) to give the crosslinked polyether ketone membrane having sulfonic acid group. The membrane obtained was very flexible and tough. Various physical properties of this membrane were measured by the procedures (vii), (viii) and (ix) described above. The measurement results are shown in Table 11.

Example 70

Polymerization and post-treatment were carried out under the same conditions as in Example 69 except that amounts of DFBP-2S and DFBP were 5.07 g (12 mmols) and 1.75 g (8 mmols) respectively. The polymer powder was obtained in 8.68 g (yield, 82%). The reduced viscosity of the polyether ketone powder obtained was 0.72 dl/g (DMSO). A cast membrane was prepared, thermally crosslinked and then proton-exchanged in the same manner as in Example 69. Various physical properties were measured in the same manner as in Example 69. The measurement results are shown in Table 11.

Example 71

Polymerization and post-treatment were carried out under the same conditions as in Example 69 except that 0.24 g (2 mmols) of 4EFP was used instead of 3EP, and 4.57 g (20 mmols) of BisA and 1.96 g (9 mmols) of DFBP were used. The polymer powder was obtained in 8.36 g (yield, 82%). The reduced viscosity of the polyether ketone powder obtained was 0.74 dl/g (DMSO). A cast membrane was prepared, thermally crosslinked and then proton-exchanged in the same manner as in Example 69. Various physical properties were measured in the same manner as in Example 69. The measurement results are shown in Table 11.

Example 72

Polymerization and post-treatment were carried out under the same conditions in the same manner as in Example 69 except that 1.54 g (5 mmols) of 2,2-bis(4-hydroxy-3-allylphenyl)propane was used instead of 3EP, and 3.42 g (15 mmols) of BisA was used. The polymer powder was obtained in 8.66 g (yield, 82%). The reduced viscosity of the polyether ketone powder obtained was 0.94 dl/g (DMSO). A cast membrane was prepared, thermally crosslinked and then proton-exchanged in the same manner as in Example 69. Various physical properties were measured in the same manner as in Example 69. The measurement results are shown in Table 11.

Example 73

In a 200 ml five-necked reactor equipped with a nitrogen-introducing tube, a thermometer and a stirrer, 9.32 g (24.0 mmols) of BDSA, 3.97 g (16.0 mmols) of 4,4'-diaminodiphenylsulfone and 35.7 g of DMAc were charged and dissolved while stirring at room temperature. Subsequently, 10.19 g (38 mmols) of NTDA and 0.39 g (4 mmols) of maleic anhydride were charged together with 20.0 g of DMAc, followed by stirring at room temperature for 24 hours. The reduced viscosity of the polyamic acid varnish obtained was 0.96 dl/g (DMAc).

A 30.0 wt % solution of the polyamic acid obtained was cast onto a glass plate. The cast glass plate was heated in an inert oven under normal pressure in a nitrogen atmosphere to remove DMAc, and to effect imidation and thermal crosslinking, by elevating the temperature to 280° C. over 4 hours and maintaining at 280° C. for 4 hours. The glass plate was dipped in water and thereby the membrane was peeled off. Proton exchange was carried out by the method described in (iv) above. The membrane obtained was very flexible and tough. Various physical properties of this membrane were measured as in Example 69. The results are shown in Table 11.

Example 74

A polyamic acid varnish was prepared under the same conditions as in Example 73 except that 0.69 g (4 mmols) of 3-ethynylphthalic anhydride was used in place of maleic anhydride and 20.7 g of DMAc was used for charging NTDA. The reduced viscosity of the polyamic acid varnish was 0.93 dl/g (DMAc).

The polyamic acid obtained was cast onto a glass plate, and then removal of DMAc, imidation and thermal crosslinking were carried out in the same manner as in Example 73. After the cast membrane was peeled off, proton exchange was carried out. Various physical properties were measured. The results are shown in Table 11.

Example 75

In a 200 ml five-necked reactor, 7.77 g (20.0 mmols) of BDSA, 120 ml of DMAc, 9.4 g of pyridine and 3.6 g of lithium chloride were charged and the diamine was dissolve. After the solution was cooled to −5° C., a solution of 5.84 g (19.0 mmols) of 3,3'-benzophenone-dicarboxylic acid chloride and 0.33 g (2 mmols) of 3-ethynylbenzoic acid chloride in 20 ml of DMAc was added dropwise to the solution. After the dropwise addition, the mixture was stirred at room temperature for 24 hours. The resulting solution was diluted with 50 ml of DMAc and the dilution was filtered through Celite. The filtrate was discharged into 500 ml of toluene. The polymer powder precipitated was filtered and dried at 150° C. for 4 hours to give 8.85 g (yield, 71%) of the polymer powder. The reduced viscosity of the polymer obtained was 0.73 dl/g (DMAc).

After 5.0 g of the polymer was dissolved in 20 ml of DMAc, the solution was cast onto a glass substrate. The cast glass substrate was heated in an inert oven in a nitrogen atmosphere under normal pressure to remove DMAc and effect thermal crosslinking by elevating the temperature to 280° C. over 4 hours and maintaining at 280° C. for 4 hours. Peeling of the membrane and proton exchange were carried out in the same manner as in Example 69. The respective measurements were performed on this membrane. The results are shown in Table 11.

Example 76

In a 200 ml reactor, 7.77 g (20.0 mmols) of BDSA, 4.25 g (20.0 mmols) of DABP, 18.8 g of pyridine and 100 ml of DMAc as a solvent were charged. A solution of 8.00 g (38.0 mmols) of anhydrous benzenetrimellitic acid chloride and 0.39 g (4 mmols) of maleic anhydride in 20 ml of DMAc was added dropwise to the mixture, followed by stirring for 24 hours at room temperature. The reaction solution obtained was filtered through Celite. The filtrate was concentrated to about 100 ml of total volume. The imidated and thermally crosslinked cast membrane was prepared and proton-exchanged in the same manner as in Example 73. The measurement results of ion conductivity, methanol solubility and methanol permeability are shown in Table 11.

Example 77

In a 200 ml five-necked reactor equipped with a nitrogen-introducing tube, a thermometer and a stirrer, 7.23 g (25 mmols) of 3,3'-diamino-4,4'-dihydroxy-biphenyl dihydrochloride and 120 g of polyphosphoric acid were charged, followed by stirring at 200° C. for an hour. Then, 6.49 g (24 mmols) of 4,4'-benzophenonedicarboxylic acid and 0.32 g (2 mmols) of 4-allylbenzoic acid were added, and the mixture was stirred at 200° C. for an hour. The reaction solution was discharged into 2000 ml of ion-exchanged water. The polymer precipitated was washed with water and methanol. The polymer was then dried at 160° C. for 4 hours to give 7.91 g (yield, 76%) of the polymer powder.

In a 100 ml five-necked reactor equipped with a nitrogen-introducing tube, a dropping funnel, a thermometer, and a stirrer, 6.00 g of this polymer was charged and dissolved in 40 ml of conc. sulfuric acid. 5 ml of chlorosulfonic acid was added dropwise to the mixture. After the addition, the mixture was stirred at room temperature for 6 hours. The reaction solution was poured onto 400 ml of ion-exchanged water and the polymer precipitated was washed with ion-exchanged water until the wash liquid became neutral. The polymer was dried at 100° C. for 6 hours in an inert oven under a nitrogen atmosphere to give 6.01 g of proton type sulfonated polybenzoxazole. The reduced viscosity of the polymer obtained was 0.68 dl/g (DMAc). The proton type sulfonated polybenzoxazole obtained was treated with sodium hydroxide to convert into the Na salt type sulfonated polybenzoxazole.

The solution of 5.0 g of the polymer dissolved in 18 ml of DMAc was cast onto a glass plate. The cast glass plate was heated in an inert oven in a nitrogen atmosphere under normal pressure to remove DMAc by elevating the temperature to 150° C. over 4 hours and maintaining at 150° C. for 4 hours. The membrane was thermally crosslinked by the method of (vi) and peeled off, and then proton-exchanged by the method of (iv). The measurement results of the membrane obtained are shown in Table 11.

Example 78

In a 300 ml five-necked reactor equipped with an oxygen-introducing tube, a thermometer and a stirrer, 6.71 g (50 mmols) of 2-allylphenol, 6.11 g (50 mmols) of 2,6-dimethylphenol, 170 ml of nitrobenzene, 1 g of CuCl and 5 g of MgSO$_4$ were charged and reacted for an hour while keeping at 30° C. After 100 ml of chloroform was added thereto, the mixture was filtered through Celite. The filtrate was discharged into 1000 ml of acidic methanol with hydrochloric acid. The polymer precipitated was washed with acidic methanol with hydrochloric acid and dried at 100° C. for 4 hours to give 11.22 g (yield, 89%) of the polymer powders.

In a 500 ml five-necked reactor equipped with a nitrogen-introducing tube, a thermometer, a reflux condenser and a stirrer, 6 g of the polymer obtained and 100 g of chloroform were charged, and 50 g of 10 wt % chlorosulfonic acid solution in chloroform was added dropwise to the mixture. The precipitate was separated by filtration and washed with dichloromethane. After drying at 100° C. for 6 hours in an inert oven under a nitrogen atmosphere, 5.92 g of proton type sulfonated polyphenylene oxide was obtained. The resulting proton type sulfonated polyphenylene oxide was treated with sodium hydroxide to convert into the Na salt type sulfonated polyphenylene oxide.

5.0 g of the polymer was dissolved in 18 ml of DMAc, and the solution was cast onto a glass plate. The cast glass plate was heated in an inert oven in a nitrogen atmosphere under normal pressure to remove DMAC by elevating the temperature to 150° C. over 4 hours and maintaining at 150° C. for 4 hours. The membrane was thermally crosslinked by the method of (vi) and peeled off, and then proton-exchanged by the method of (iv). The measurement results of the membrane obtained are shown in Table 11.

Example 79

Using 8.45 g (20 mmols) of DFBP-2S, 4.34 g (19 mmols) of BiSA, 0.24 g (2 mmols) of 3EP and 3.46 g (25 mmols) of potassium carbonate, polymerization and post-treatment were carried out otherwise under the same conditions as in Example 69. The polymer powder was obtained in 9.04 g (yield, 68%). The reduced viscosity of the polyether ketone powder obtained was 0.62 dl/g (DMSO).

A cast membrane was prepared from the polymer powder obtained, thermally crosslinked and then proton-exchanged in the same manner as in Example 69. The ion-exchange equivalent weight of the thermally crosslinked membrane was 320 g·eq$^{-1}$. Also, the methanol solubility was determined by the method of (viii) and found to be 28.5 wt %.

Comparative Example 10

Polymerization and post-treatment were carried out in the same manner as in Example 69 except that the amount of BisA was changed to 4.57 g (20 mmols) and the use of 3EP was omitted. The polymer powder was obtained in 8.25 g (yield, 81%). A cast membrane was prepared and proton-exchanged in the same manner as in Example 69. The measurement results of the ion conductivity, methanol solubility and methanol permeability are shown in Table 11, in combination with Comparative Example 5, 6 and 1.

TABLE 11

| Example | Ion-exchange equivalent weight (g · eq$^{-1}$) | Membrane thickness (μm) | Ion conductivity at 90° C. (S · cm$^{-1}$) | MeOH solubility (wt %) | MeOH permeability (μmol · cm$^{-2}$ · min$^{-1}$) |
|---|---|---|---|---|---|
| 69 | 490 | 52 | 0.20 | 6.1 | 4.1 |
| 70 | 420 | 48 | 0.28 | 11.5 | 7.1 |

TABLE 11-continued

| Example | Ion-exchange equivalent weight (g · eq$^{-1}$) | Membrane thickness (μm) | Ion conductivity at 90° C. (S · cm$^{-1}$) | MeOH solubility (wt %) | MeOH permeability (μmol · cm$^{-2}$ · min$^{-1}$) |
|---|---|---|---|---|---|
| 71 | 490 | 51 | 0.19 | 7.2 | 4.3 |
| 72 | 510 | 51 | 0.19 | 3.4 | 3.8 |
| 73 | 460 | 46 | 0.08 | 7.6 | 5.3 |
| 74 | 470 | 45 | 0.09 | 5.6 | 4.9 |
| 75 | 290 | 51 | 0.05 | 8.4 | 7.8 |
| 76 | 330 | 53 | 0.08 | 8.2 | 7.4 |
| 77 | 470 | 46 | 0.11 | 7.5 | 6.2 |
| 78 | 410 | 48 | 0.10 | 5.4 | 8.5 |
| Comparative example 10 | 420 | 51 | 0.27 | 38.7 | Unmeasurable due to dissolution |
| Comparative example 5 | 430 | 49 | 0.09 | 23.6 | 17.1 |
| Comparative example 6 | 270 | 48 | Unmeasurable due to dissolution | 58 | Unmeasurable due to dissolution |
| Comparative example 1 | 1100 | 50 | 0.13 | 0 | 11.7 |

It is clearly noted that in Example 69 through 78, the menthanol solubility is smaller than with the non-thermally crosslinked polymers of Comparative Examples 10, 5 and 6, namely, the methanol tolerance is markedly improved. It is also noted that the ion conductivity is in the order substantially equivalent to that of the Nafion membrane in Comparative Example 1, but the methanol permeability is lower.

Further by comparing the polyether resins of Examples 69 through 72 and the polyimides, polyamides and polyazoles having a sulfonic acid group of Examples 73 through 76, it is noted that when the same ion-exchange group is substantially equivalent, the crosslinkable polyethers provide a higher ion conductivity and are more preferred as the crosslinkable aromatic resin of the invention having a protonic acid group for fuel cells.

Also comparison of the photo-crosslinked sulfonated polyether ketone membrane prepared in Example 43 and the thermally crosslinked sulfonated polyether ketone membrane prepared in Example 79 reveals that the photo-crosslinked sulfonated polyether ketone membrane provides a lower methanol solubility and is more preferred as the crosslinkable aromatic resin having a protonic acid group for fuel cells of the invention.

Example 80

In a four-necked reactor equipped with a nitrogen-introducing tube, a thermometer, a reflux condenser and a stirrer, 2.84 g (0.013 mols) of DFBP, 2.96 g (0.007 mols) of DFBP-2S, 4.00 g (0.02 mols) of BisF and 3.46 g (0.025 mols) of potassium carbonate were charged. After 50 ml of DMSO and 40 ml of toluene were added to the mixture, the mixture was heated at 130° C. for 4 hours while stirring under a nitrogen atmosphere to remove water generated out of the system, and then toluene was distilled off. The reaction was carried out at 160° C. for further 8 hours to give a viscous polymer solution. During the reaction, 20 ml of DMAc was added. After the reaction, 30 ml of DMAc was added to the solution for diluting, the dilution was filtered.

The polymer solution was discharged into 600 ml of toluene and decantated with 600 ml of acetone. The polymer powder obtained was filtered and dried at 150° C. for 4 hours to give 4.95 g (yield, 92%) of the polymer powder. The reduced viscosity of the sulfonated polyether ketone powder obtained was 1.27 dl/g (DMSO, 35° C.). The glass transition temperature of the polymer was not observed until 400° C.

The powdery polymer obtained was dissolved in NMP, and the solution was cast on a glass substrate. After drying at 200° C. for 4 hours, a membrane of polyether ketone having sodium sulfonate group was obtained. The resulting membrane was very flexible and tough. The membrane of a polyether ketone having sodium sulfonate was crosslinked by exposing to light at 14000 mJ/cm$^2$ with a metal halide lump and then proton-exchanged by the method described in (iv) to obtain a membrane of polyether ketone having a protonic acid group. The result of measurement of ion conductivity by the method in (vii) above and the result of measurement of methanol permeability in (viii) above are shown in the Table 12. The resulting membrane was very flexible and tough.

When a piece of the polyether ketone membrane having sodium sulfonate obtained above was dipped in NMP, it was dissolved. On the other hand, it was confirmed that the photo-crosslinked membrane of polyether ketone having a protonic acid group was completely insolubilized in NMP and water, and was improved in chemical resistance and water resistance.

Example 81 and 82

Various polyether ketone membranes were prepared using aromatic dihydroxy compounds described in Example 80, and benzophenone compound having protonic acid group and benzophenone compound not having protonic acid group under different proportion. Properties of polyether ketone membranes obtained are shown in Table 12. The results of ion conductivity measurement of the polyether ketone membranes are shown in Table 13.

TABLE 12

| Example | Dihydroxy compound [g(mol)] | Protonic acid compound [g(mol)] | Benzophenone compound [g(mol)] | Yield [%] | Reduced Viscosity [dl/g] | Glass transition temperature [° C.] |
|---|---|---|---|---|---|---|
| 80 | Bis-F 4.00(0.020) | DFBP-2S 2.96(0.007) | DFBP 2.84(0.013) | 51 | 1.3 | Not detected |
| 81 | Bis-F 4.00(0.020) | DFBP-2S 4.22(0.010) | DFBP 2.18(0.010) | 55 | 1.2 | Not detected |
| 82 | Bis-F 4.00(0.020) | DFBP-2S 5.49(0.013) | DFBP 1.53(0.007) | 58 | 1.3 | Not detected |

TABLE 13

| Example | Conductivity [S/cm] (30° C./90° C.) | Methanol permeability [μmol/cm$^2$/min.] Calculated as 50 μm thickness |
|---|---|---|
| 80 | 0.024/0.152 | 1.5 |
| 81 | 0.062/0.275 | 4.6 |
| 82 | 0.110/0.301 | 6.2 |

It is clearly noted from Table 13 that in Example 80 through 82, the ion conductivity is in the order substantially equivalent to that of the Nafion membrane in Comparative Example 1 or in the level without any problems, and the methanol permeability is superior to that of the Nafion membrane. It is also noted that the glass transition temperature is much higher than 130° C. of the Nafion membrane, namely, the heat resistance is markedly improved.

INDUSTRIAL APPLICABILITY

The crosslinkable aromatic resin having a protonic acid group of the invention is a novel crosslinkable aromatic resin having a protonic acid group and containing a crosslinkable group which is not derived from the protonic acid group and can form a polymer network without forming any elimination component, and exhibits excellent ion conductivity, heat resistance, water resistance, adhesion property and low methanol permeability by crosslinking, and therefore is suitable for ion conductive polymer membrane and binder for fuel cells.

According to the present invention, there are provided ion conductive polymer membranes, binders and electrodes for fuel cell having high ion conductivity, and excellent heat resistance, water resistance and adhesion property, as well as fuel cells.

The polymer membrane of the invention provides improved resistance to fuel (solubility) and reduced fuel permeability by crosslinking. Thus, the fuel cells using the polymer membrane can prevent the fuel crossover (permeation of fuel from the anode to the cathode), can improve power generation efficiency and can provide high reliability.

What we claim is:

1. A crosslinkable aromatic resin having a protonic acid, which comprises that the crosslinkable aromatic resin contains a crosslinkable group, and that the crosslinkable group is not derived from the protonic acid group and can form a polymer network without forming any elimination component, and further that the crosslinkable group is at least one selected from the group consisting of i) a crosslinkable group composed of a $C_1$ to $C_{10}$ alkyl group bonded to the aromatic ring and a carbonyl group, ii) a carbon-carbon double bond, and iii) a carbon-carbon triple bond.

2. The crosslinkable aromatic resin having a protonic acid group according to claim 1, wherein the crosslinkable group comprises an alkyl group having 1 to 10 carbon atoms directly bonded to the aromatic ring and a carbonyl group.

3. The crosslinkable aromatic resin having a protonic acid group according to claim 2, wherein the crosslinkable aromatic resin contains a crosslinkable group comprising an alkyl group having 1 to 10 carbon atoms directly bonded to the aromatic ring and a carbonyl group, and a protonic acid group, and can be crosslinked by light, heat and/or electron rays.

4. The crosslinkable aromatic resin having a protonic acid group according to claim 2, wherein the crosslinkable aromatic resin having a protonic acid group is an aromatic resin having a carbonyl group, an alkyl group having 1 to 10 carbon atoms directly bonded to the aromatic ring, and a protonic acid group, and being selected from the group consisting of aromatic polyethers, aromatic polyamides, aromatic polyimides, aromatic polyamideimides and aromatic polyazoles.

5. The crosslinkable aromatic resin having a protonic acid group according to claim 2, wherein the crosslinkable aromatic resin having a protonic acid group is a photo-crosslinkable polyether ketone containing a protonic acid group and an aromatic ring to which an alkyl group having 1 to 10 carbon atoms.

6. The crosslinkable aromatic resin having a protonic acid group according to claim 2, wherein the crosslinkable aromatic resin having a protonic acid group is an aromatic polyetherketone comprising, based on the total repeating structural units, 10 to 100% by mol of the repeating structural unit represented by the following formula (6) below, and 0 to 90% by mol of the repeating structural unit represented by the following formula (7) below, in which at least one of $R^1$ to $R^{10}$ is —$C_mH_{2m+1}$ (wherein m is an integer of 1 to 10) and at least one of $X^1$ to $X^{10}$ is a protonic acid group:

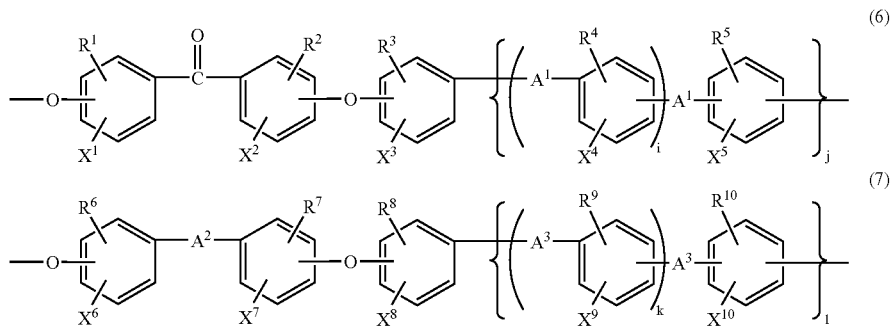

(6)

(7)

[in formulas (6) and (7), each of $R^1$ to $R$ independently represents H or —$C_mH_{2m+1}$ (wherein m is an integer of 1 to 10), each of $X^1$ to $X^{10}$ independently represents H or a protonic acid group; each of $A^1$ to $A^3$ independently represents a direct bond, —$CH_2$—, —$C(CH_3)_2$—, —$C(CF_3)_2$—, —O—, —$SO_2$— or —CO—; each of i, j, k and l independently represents 0 or 1; and the hydrogen atom bonded to the aromatic rings in the formula (6) and (7) may be substituted with —$C_mH_{2m+1}$ (wherein m is an integer of 1 to 10), a protonic acid group, Cl, F or $CF_3$.]

7. The crosslinkable aromatic resin having a protonic acid group according to claim 2, wherein the crosslinkable aromatic resin having a protonic acid group is an aromatic polyetherketone comprising, based on the total repeating structural units, 10 to 100% by mol of the repeating structural unit represented by the following formula (6') below, and
0 to 90% by mol of the repeating structural unit represented by the following formula (7') below, in which at least one of $B^1$ to $B^3$ is a group represented by the formula: —$CH(C_xH_{x+1})\{C(C_yH_{y+1})(C_{y'}H_{y'+1})\}_\alpha\{C(C_zH_{z+1})(C_{z'}H_{z'+1})\}_\beta$—, wherein x is an integer of 0 to 9, each of y, y', z and z' is independently an integer of 0 to 8, each of α and β is independently of 0 or 1 and x+y+y'+z+z'+α+β≦9, and at least one of $X^1$ to $X^{10}$ is a protonic acid group:

z and z' is independently an integer of 0 to 8, each of α and β is independently of 0 or 1 and x+y+y'+z+z'+α+β≦9; each of i, j, k and l independently represents 0 or 1; and the hydrogen atom bonded to the aromatic rings in the formula (6') and (7') may be substituted with —$C_mH_{2m+1}$ (wherein m is an integer of 1 to 10), a protonic acid group, Cl, F or $CF_3$.]

8. The crosslinkable aromatic resin having a protonic acid group according to claim 2, wherein the crosslinkable aromatic resin having a protonic acid group comprises a carbonyl group-containing resin having a carbonyl group, and a resin containing an alkyl group having 1 to 10 carbon atoms directly bonded to the aromatic ring, and at least one of the carbonyl group-containing resin and the resin containing an alkyl group has a protonic acid group.

9. The crosslinkable aromatic resin having a protonic acid group according to claim 8, wherein each of the carbonyl group-containing resin and the resin containing an alkyl group independently is an aromatic resin selected from the group consisting of aromatic polyethers, aromatic polyamides, aromatic polyimides, aromatic polyamideimides and aromatic polyazoles.

10. The crosslinkable aromatic resin having a protonic acid group according to claim 8, wherein the crosslinkable aromatic resin having a protonic acid group comprises, based on the total repeating structural units,

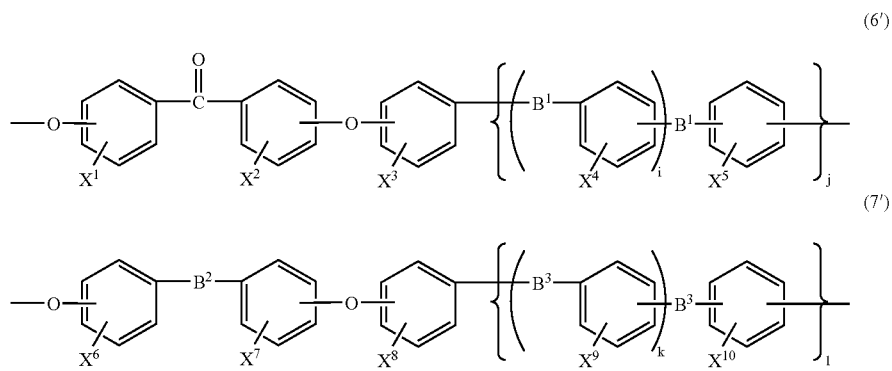

(6')

(7')

[in formulas (6') and (7'), each of $X^1$ to $X^{10}$ independently represents H or a protonic acid group; each of $B^1$ to $B^3$ independently represents a direct bond, —$C(CF_3)_2$—, —$SO_2$—, —CO— or a group represented by the formula: —$CH(C_xH_{x+1})\{C(C_yH_{y+1})(C_{y'}H_{y'+1})\}_\alpha\{C(C_zH_{z+1})(C_{z'}H_{z'+1})\}_\beta$—, wherein x is an integer of 0 to 9, each of y, y', 20 to 80% by weight of the resin containing 10 to 100% by mol of the repeating structural unit represented by the following formula (6), and, 20 to 80% by weight of the resin containing 10 to 100% by mol of the repeating structural unit represented by the following formula (7), wherein at least one of $R^6$ to $R^{10}$ is $-C_mH_{2m+1}$ (wherein m is an integer of 1 to 10) and at least one of $X^1$ to $X^{10}$ is a protonic acid group:

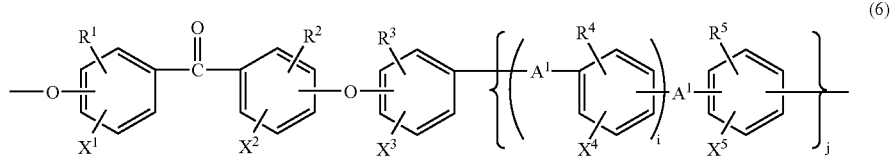

(6)

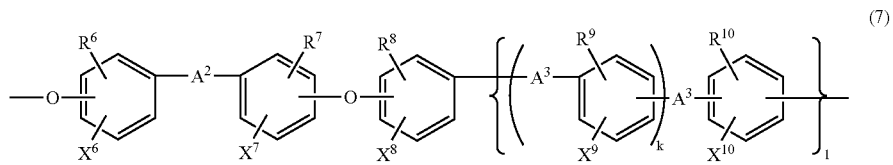

(7)

[in formula (6) and (7), each of $R^1$ to $R^{10}$ independently represents H or $-C_mH_{2m+1}$ (wherein m is an integer of 1 to 10), each of $X^1$ to $X^{10}$ independently represents H or a protonic acid group; each of $A^1$ to $A^3$ independently represents a direct bond, $-CH_2-$, $-C(CH_3)_2-$, $-C(CF_3)_2-$, $-O-$, $-SO_2-$ or $-CO-$; each of i, j, k and l independently represents 0 or 1; and the hydrogen atom bonded to the aromatic rings in the formula (6) and (7) may be substituted with $-C_mH_{2m+1}$ (wherein m is an integer of 1 to 10), a protonic acid group, Cl, F or $CF_3$.]

11. The crosslinkable aromatic resin having a protonic acid group according to claim 8, wherein the crosslinkable aromatic resin having a protonic acid group comprises, based on the total repeating structural units, 20 to 80% by weight of the resin containing 10 to 100% by mol of the repeating structural unit represented by the following formula (6'), and, 20 to 80% by weight of the resin containing 10 to 100% by mol of the repeating structural unit represented by the following formula (7'), wherein at least one of $B^1$ to $B^3$ is a group represented by the formula: $-CH(C_xH_{x+1})\{C(C_yH_{y+1})(C_{y'}H_{y'+1})\}_\alpha\{C(C_zH_{z+1})(C_{z'}H_{z'+1})\}_\beta-$, wherein x is an integer of 0 to 9, each of y, y', z and z' is independently an integer of 0 to 8, each of $\alpha$ and $\beta$ is independently of 0 or 1 and $x+y+y'+z+z'+\alpha+\beta \leq 9$, and at least one of $X^1$ to $X^{10}$ is a protonic acid group:

[in formula (6') and (7'), each of $X^1$ to $X^{10}$ independently represents H or a protonic acid group; each of $B^1$ to $B^3$ independently represents a direct bond, $-C(CF_3)_2-$, $-SO_2-$, $-CO-$, or a group represented by the formula: $-CH(C_xH_{x+1})\{C(C_yH_{y+1})(C_{y'}H_{y'+1})\}_\alpha\{C(C_zH_{z+1})(C_{z'}H_{z'+1})\}_\beta-$, wherein x is an integer of 0 to 9, each of y, y', z and z' is independently an integer of 0 to 8, each of $\alpha$ and $\beta$ is independently of 0 or 1 and $x+y+y'+z+z'+\alpha+\beta \leq 9$; each of i, j, k and l independently represents 0 or 1; and the hydrogen atom bonded to the aromatic rings in the formula (6') and (7') may be substituted with $-C_mH_{2m+1}$ (wherein m is an integer of 1 to 10), a protonic acid group, Cl, F or $CF_3$.]

12. The crosslinkable aromatic resin having a protonic acid group according to claim 1, wherein the crosslinkable aromatic resin having a protonic acid group is an aromatic resin having a carbon-carbon double bond or a carbon-carbon triple bond, which is selected from the group consisting of aromatic polyethers, aromatic polyamides, aromatic polyimides, aromatic polyamideimides and aromatic polyazoles.

13. The crosslinkable aromatic resin having a protonic acid group according to claim 1, wherein the crosslinkable group is a carbon-carbon double bond or a carbon-carbon triple bond.

14. The crosslinkable aromatic resin having a protonic acid group according to claim 13, wherein the crosslinkable aromatic resin having a protonic acid group is an aromatic resin having a carbon-carbon double bond or a carbon-carbon triple bond, which is selected from the group con-

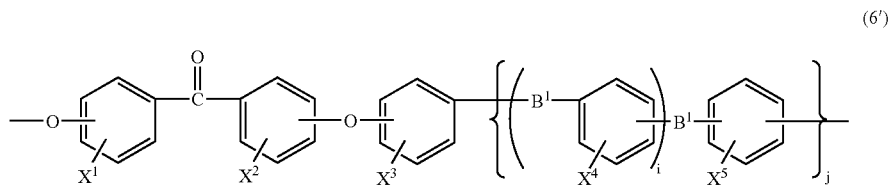

(6')

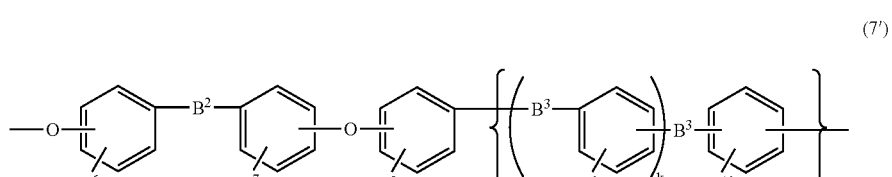

(7')

sisting of aromatic polyethers, aromatic polyamides, aromatic polyimides, aromatic polyamideimides and aromatic polyazoles.

15. The crosslinkable aromatic resin having a protonic acid group according to claim 13, wherein the crosslinkable aromatic resin having a protonic acid group comprises an aromatic resin containing 20 to 100% by mol, based on the total repeating structural units, of the repeating structural unit represented by the following formula (34), wherein at least one of $R^{11}$ to $R^{15}$ is —$C_mH_{2m}$—CH=CH—R or —$C_mH_{2m}$—C≡C—R (wherein m is an integer of 0 to 10, and R is H or phenyl) and at least one of $X^{11}$ to $X^{15}$ is a protonic acid group:

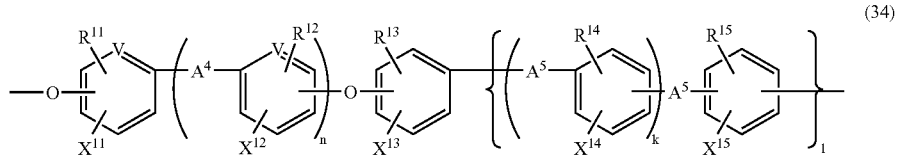

(34)

[wherein each of $R^{11}$ to $R^{15}$ independently represents H, —$C_mH_{2m}$—CH=CH—R or —$C_mH_{2m}$—C≡C—R (wherein m is an integer of 0 to 10, and R is H or phenyl); V independently represents CH, C—CN or N; each of $X^{11}$ to $X^{15}$ independently represents H or a protonic acid group; each of $A^4$ and $A^5$ independently represents a direct bond, —$CH_2$—, —$C(CH_3)_2$—, —$C(CF_3)_2$—, —O—, —$SO_2$— or —CO—; each of k, l and n independently represents 0 or 1; the hydrogen atom bonded to the aromatic rings in formula (34) may be substituted with —$C_mH_{2m}$—CH=CH—R or —$C_mH_{2m}$—C≡C—R (wherein m is an integer of 0 to 10, and R is H or phenyl), a protonic acid group, Cl, F or $CF_3$].

16. The crosslinkable aromatic resin having a protonic acid group according to claim 13, wherein the crosslinkable aromatic resin having a protonic acid group comprises 20 to 100% by mol, based on the total repeating structural units, of the repeating structural unit shown by the following formula (35), wherein at least one of $X^{16}$ to $X^{20}$ is a protonic acid group and the molecular end is —$R^a$—CH=CH—$R^b$ or —$R^a$—C≡C—$R^b$ (wherein $R^a$ is phenylene and $R^b$ is H or phenyl:

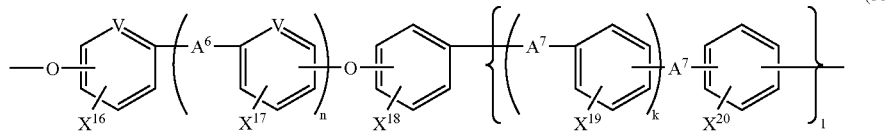

(35)

[wherein each of $X^{16}$ to $X^{20}$ independently represents H or a protonic acid group; V independently represents CH, C—CN or N; each of $A^6$ and $A^7$ independently represents a direct bond, —$CH_2$—, —$C(CH_3)_2$—, —$C(CF_3)_2$—, —O—, —$SO_2$— or —CO—; each of k, l and n independently represents 0 or 1; the hydrogen atoms bonded to the aromatic rings in formula (35) may be substituted with a protonic acid group, Cl, F or $CF_3$].

17. The crosslinkable aromatic resin having a protonic acid group according to claim 1, wherein the protonic acid group is —$C_nH_{2n}$—$SO_3Y$ (wherein n is an integer of 0 to 10; and Y is H, Na or K).

18. A crosslinked product, which is obtained by crosslinking the crosslinkable aromatic resin having a protonic acid group defined in claim 1.

19. A polymer membrane, which is obtained using the crosslinkable aromatic resin having a protonic acid group defined in claim 1.

20. An ion conductive polymer membrane for fuel cells, which is obtained by crosslinking the polymer membrane defined in claim 19.

21. The ion conductive polymer membrane for fuel cells according to claim 20, wherein the ion-exchange equivalent weight is not greater than 1000 g/mol and the methanol solubility is less than 15% by weight.

22. An ion conductive binder for fuel cells, which contains the crosslinkable aromatic resin having a protonic acid group defined in claim 1.

23. A composition for forming electrodes comprising the binder defined in claim 22 and electrode materials.

24. An electrode, which is obtained by using the binder defined in claim 22.

25. A fuel cell, which is obtained by using the polymer membrane defined in claim 19.

26. A fuel cell, which is obtained by using the binder defined in claim 22.

27. A fuel cell, which is obtained by using the electrode defined in claim 24.

28. A crosslinked product, which is obtained by crosslinking the crosslinkable aromatic resin having a protonic acid group defined in claim 17.

29. A polymer membrane, which is obtained using the crosslinkable aromatic resin having a protonic acid group defined in claim 17.

30. An ion conductive binder for fuel cells, which contains the crosslinkable aromatic resin having a protonic acid group defined in claim 17.

31. An electrode, which is obtained by using the binder defined in claim 30.

32. A fuel cell, which is obtained by using the polymer membrane defined in claim 29.

33. A fuel cell, which is obtained by using the binder defined in claim 30.

34. A fuel cell, which is obtained by using the electrode defined in claim 31.

* * * * *